United States Patent
Abdallah

(10) Patent No.: US 10,521,239 B2
(45) Date of Patent: Dec. 31, 2019

(54) MICROPROCESSOR ACCELERATED CODE OPTIMIZER

(71) Applicant: Intel Corporation, Santa Clara, CA (US)

(72) Inventor: Mohammad Abdallah, Folsom, CA (US)

(73) Assignee: INTEL CORPORATION, Santa Clara, CA (US)

(*) Notice: Subject to any disclaimer, the term of this patent is extended or adjusted under 35 U.S.C. 154(b) by 433 days.

(21) Appl. No.: 15/283,836

(22) Filed: Oct. 3, 2016

(65) Prior Publication Data
US 2017/0024219 A1   Jan. 26, 2017

Related U.S. Application Data

(62) Division of application No. 14/360,282, filed as application No. PCT/US2011/061957 on Nov. 22, 2011, now abandoned.

(51) Int. Cl.
*G06F 9/38* (2018.01)
*G06F 9/30* (2018.01)

(52) U.S. Cl.
CPC ........ *G06F 9/3887* (2013.01); *G06F 9/30145* (2013.01); *G06F 9/38* (2013.01); *G06F 9/3838* (2013.01)

(58) Field of Classification Search
None
See application file for complete search history.

(56) References Cited

U.S. PATENT DOCUMENTS

| | | |
|---|---|---|
| 727,487 A | 5/1903 | Swan |
| 4,075,704 A | 2/1978 | O'Leary |
| 4,245,344 A | 1/1981 | Richter |
| 4,356,550 A | 10/1982 | Katzman et al. |

(Continued)

FOREIGN PATENT DOCUMENTS

| | | |
|---|---|---|
| CN | 1214666 A | 4/1999 |
| CN | 1305150 A | 7/2001 |

(Continued)

OTHER PUBLICATIONS

First Examination Report from foreign counterpart Indian Patent Application No. 51/KOLNP/2012, dated Jul. 30, 2018, 7 pages.

(Continued)

*Primary Examiner* — John M Lindlof
(74) *Attorney, Agent, or Firm* — Nicholson De Vos Webster & Elliott, LLP

(57) ABSTRACT

A method for accelerating code optimization a microprocessor. The method includes fetching an incoming microinstruction sequence using an instruction fetch component and transferring the fetched macroinstructions to a decoding component for decoding into microinstructions. Optimization processing is performed by reordering the microinstruction sequence into an optimized microinstruction sequence comprising a plurality of dependent code groups. The optimized microinstruction sequence is output to a microprocessor pipeline for execution. A copy of the optimized microinstruction sequence is stored into a sequence cache for subsequent use upon a subsequent hit optimized microinstruction sequence.

20 Claims, 23 Drawing Sheets

(56) References Cited

U.S. PATENT DOCUMENTS

| | | |
|---|---|---|
| 4,414,624 A | 11/1983 | Summer, Jr. et al. |
| 4,524,415 A | 6/1985 | Mills, Jr. et al. |
| 4,527,237 A | 7/1985 | Frieder et al. |
| 4,577,273 A | 3/1986 | Hopper et al. |
| 4,597,061 A | 6/1986 | Cline et al. |
| 4,600,986 A | 7/1986 | Scheuneman et al. |
| 4,633,434 A | 12/1986 | Scheuneman |
| 4,682,281 A | 7/1987 | Woffinden et al. |
| 4,727,487 A | 2/1988 | Masui et al. |
| 4,816,991 A | 3/1989 | Watanabe et al. |
| 4,835,680 A | 5/1989 | Hogg et al. |
| 4,920,477 A | 4/1990 | Colwell et al. |
| 4,930,066 A | 5/1990 | Yokota |
| 4,943,909 A | 7/1990 | Huang |
| 5,197,130 A | 3/1993 | Chen et al. |
| 5,294,897 A | 3/1994 | Notani et al. |
| 5,317,705 A | 5/1994 | Gannon et al. |
| 5,317,754 A | 5/1994 | Blandy et al. |
| 5,339,398 A | 8/1994 | Shah et al. |
| 5,404,470 A | 4/1995 | Miyake |
| 5,469,376 A | 11/1995 | Abdallah |
| 5,471,593 A | 11/1995 | Branigin |
| 5,509,130 A | 4/1996 | Trauben et al. |
| 5,517,651 A | 5/1996 | Huck et al. |
| 5,524,090 A | 6/1996 | Iwamura |
| 5,548,742 A | 8/1996 | Wang et al. |
| 5,559,986 A | 9/1996 | Alpert et al. |
| 5,574,878 A | 11/1996 | Onodera et al. |
| 5,581,725 A | 12/1996 | Nakayama |
| 5,590,084 A | 12/1996 | Miyano et al. |
| 5,634,068 A | 5/1997 | Nishtala et al. |
| 5,649,136 A | 7/1997 | Shen et al. |
| 5,675,759 A | 10/1997 | Shebanow et al. |
| 5,699,537 A | 12/1997 | Sharangpani et al. |
| 5,710,902 A | 1/1998 | Sheaffer et al. |
| 5,724,565 A | 3/1998 | Dubey et al. |
| 5,751,982 A | 5/1998 | Morley |
| 5,752,260 A | 5/1998 | Liu |
| 5,754,818 A | 5/1998 | Mohamed |
| 5,761,476 A | 6/1998 | Martell |
| 5,787,494 A | 7/1998 | Delano et al. |
| 5,793,941 A | 8/1998 | Pencis et al. |
| 5,802,602 A | 9/1998 | Rahman et al. |
| 5,806,085 A | 9/1998 | Berliner |
| 5,813,031 A | 9/1998 | Chou et al. |
| 5,819,088 A | 10/1998 | Reinders |
| 5,829,028 A | 10/1998 | Lynch et al. |
| 5,835,951 A | 11/1998 | McMahan |
| 5,852,738 A | 12/1998 | Bealkowski et al. |
| 5,860,146 A | 1/1999 | Vishin et al. |
| 5,864,657 A | 1/1999 | Stiffler |
| 5,872,985 A | 2/1999 | Kimura |
| 5,881,277 A | 3/1999 | Bondi et al. |
| 5,901,294 A | 5/1999 | Tran et al. |
| 5,903,750 A | 5/1999 | Yeh et al. |
| 5,905,509 A | 5/1999 | Jones et al. |
| 5,911,057 A | 6/1999 | Shiell |
| 5,918,251 A | 6/1999 | Yamada et al. |
| 5,956,753 A | 9/1999 | Glew et al. |
| 5,974,506 A | 10/1999 | Sicola et al. |
| 5,978,906 A | 11/1999 | Tran |
| 5,983,327 A | 11/1999 | Achilles et al. |
| 6,016,533 A | 1/2000 | Tran |
| 6,016,540 A | 1/2000 | Zaidi et al. |
| 6,021,484 A | 2/2000 | Park |
| 6,065,105 A | 5/2000 | Zaidi et al. |
| 6,073,230 A | 6/2000 | Pickett et al. |
| 6,075,938 A | 6/2000 | Bugnion et al. |
| 6,085,315 A | 7/2000 | Fleck et al. |
| 6,088,780 A | 7/2000 | Yamada et al. |
| 6,092,172 A | 7/2000 | Nishimoto et al. |
| 6,101,577 A | 8/2000 | Tran |
| 6,108,769 A | 8/2000 | Chinnakonda et al. |
| 6,115,809 A | 9/2000 | Mattson, Jr. et al. |
| 6,134,634 A | 10/2000 | Marshall, Jr. et al. |
| 6,138,226 A | 10/2000 | Yoshioka et al. |
| 6,157,998 A | 12/2000 | Rupley, II et al. |
| 6,167,490 A | 12/2000 | Levy et al. |
| 6,170,051 B1 | 1/2001 | Dowling |
| 6,178,482 B1 | 1/2001 | Sollars |
| 6,185,660 B1 | 2/2001 | Mulla et al. |
| 6,205,545 B1 | 3/2001 | Shah et al. |
| 6,209,085 B1 | 3/2001 | Hammond et al. |
| 6,212,542 B1 | 4/2001 | Kahle et al. |
| 6,212,613 B1 | 4/2001 | Belair |
| 6,216,215 B1 | 4/2001 | Palanca et al. |
| 6,226,732 B1 | 5/2001 | Pei et al. |
| 6,247,097 B1 | 6/2001 | Sinharoy |
| 6,253,316 B1 | 6/2001 | Tran et al. |
| 6,256,727 B1 | 7/2001 | McDonald |
| 6,256,728 B1 | 7/2001 | Witt et al. |
| 6,260,131 B1 | 7/2001 | Kikuta et al. |
| 6,260,138 B1 | 7/2001 | Harris |
| 6,269,439 B1 | 7/2001 | Hanaki |
| 6,272,616 B1 | 8/2001 | Fernando et al. |
| 6,272,662 B1 | 8/2001 | Jadav et al. |
| 6,275,917 B1 | 8/2001 | Okada |
| 6,282,583 B1 | 8/2001 | Pincus et al. |
| 6,282,638 B1 | 8/2001 | Dowling |
| 6,308,323 B1 | 10/2001 | Douniwa |
| 6,321,298 B1 | 11/2001 | Hubis |
| 6,327,650 B1 | 12/2001 | Bapst et al. |
| 6,332,189 B1 | 12/2001 | Baweja et al. |
| 6,339,822 B1 | 1/2002 | Miller |
| 6,341,324 B1 | 1/2002 | Caulk, Jr. et al. |
| 6,345,357 B1 | 2/2002 | Sato |
| 6,360,311 B1 | 3/2002 | Zandveld et al. |
| 6,408,367 B2 | 6/2002 | Achilles et al. |
| 6,437,789 B1 | 8/2002 | Tidwell et al. |
| 6,449,671 B1 | 9/2002 | Patkar et al. |
| 6,457,120 B1 | 9/2002 | Sinharoy |
| 6,473,833 B1 | 10/2002 | Arimilli et al. |
| 6,490,673 B1 | 12/2002 | Heishi et al. |
| 6,502,187 B1 | 12/2002 | Miyagawa |
| 6,529,928 B1 | 3/2003 | Resnick et al. |
| 6,542,984 B1 | 4/2003 | Keller et al. |
| 6,557,083 B1 | 4/2003 | Sperber et al. |
| 6,557,095 B1 | 4/2003 | Henstrom |
| 6,594,755 B1 | 7/2003 | Nuechterlein et al. |
| 6,604,187 B1 | 8/2003 | McGrath et al. |
| 6,609,189 B1 | 8/2003 | Kuszmaul et al. |
| 6,615,340 B1 | 9/2003 | Wilmot, II |
| 6,658,549 B2 | 12/2003 | Wilson et al. |
| 6,668,316 B1 | 12/2003 | Gorshtein et al. |
| 6,681,395 B1 | 1/2004 | Nishi |
| 6,704,860 B1 | 3/2004 | Moore |
| 6,721,874 B1 | 4/2004 | Le et al. |
| 6,728,866 B1 | 4/2004 | Kahle et al. |
| 6,775,761 B2 | 8/2004 | Wang et al. |
| 6,829,698 B2 | 12/2004 | Arimilli et al. |
| 6,850,531 B1 | 2/2005 | Rao et al. |
| 6,882,177 B1 | 4/2005 | Reddy et al. |
| 6,907,600 B2 | 6/2005 | Neiger et al. |
| 6,912,644 B1 | 6/2005 | O'Connor et al. |
| 6,920,530 B2 | 7/2005 | Musumeci |
| 6,944,744 B2 | 9/2005 | Ahmed et al. |
| 6,948,172 B1 | 9/2005 | D'Souza |
| 6,950,927 B1 | 9/2005 | Apisdorf et al. |
| 6,954,846 B2 | 10/2005 | Leibholz et al. |
| 6,985,591 B2 | 1/2006 | Graunke |
| 6,988,183 B1 * | 1/2006 | Wong .................. G06F 9/30174<br>712/208 |
| 7,007,108 B2 | 2/2006 | Emerson et al. |
| 7,020,879 B1 | 3/2006 | Nemirovsky et al. |
| 7,047,322 B1 | 5/2006 | Bauman et al. |
| 7,111,145 B1 | 9/2006 | Chen et al. |
| 7,117,347 B2 | 10/2006 | Col et al. |
| 7,139,855 B2 | 11/2006 | Armstrong et al. |
| 7,143,273 B2 | 11/2006 | Miller et al. |
| 7,149,872 B2 | 12/2006 | Rozas et al. |
| 7,150,021 B1 | 12/2006 | Vajjhala et al. |
| 7,171,535 B2 | 1/2007 | Naoi |
| 7,203,824 B2 | 4/2007 | Bean et al. |
| 7,206,925 B1 | 4/2007 | Jacobson et al. |

(56) References Cited

U.S. PATENT DOCUMENTS

| | | |
|---|---|---|
| 7,213,106 B1 | 5/2007 | Koster et al. |
| 7,213,248 B2 | 5/2007 | Arimilli et al. |
| 7,231,106 B2 | 6/2007 | Basavanhally et al. |
| 7,257,695 B2 | 8/2007 | Jiang et al. |
| 7,278,030 B1 | 10/2007 | Chen et al. |
| 7,284,092 B2 | 10/2007 | Nunamaker et al. |
| 7,290,261 B2 | 10/2007 | Burky et al. |
| 7,313,775 B2 | 12/2007 | Casey et al. |
| 7,343,476 B2 | 3/2008 | Floyd et al. |
| 7,373,637 B2 | 5/2008 | DeWitt et al. |
| 7,380,096 B1 | 5/2008 | Rozas et al. |
| 7,383,427 B2 | 6/2008 | Yamazaki |
| 7,398,347 B1 | 7/2008 | Pechanek et al. |
| 7,406,581 B2 | 7/2008 | Southwell et al. |
| 7,418,579 B2 | 8/2008 | Guibert et al. |
| 7,418,582 B1 | 8/2008 | Iacobovici et al. |
| 7,441,110 B1 | 10/2008 | Puzak et al. |
| 7,493,475 B2 | 2/2009 | Colavin |
| 7,539,879 B2 | 5/2009 | Terechko et al. |
| 7,546,420 B1 | 6/2009 | Shar et al. |
| 7,577,820 B1 | 8/2009 | Wentzlaff et al. |
| 7,613,131 B2 | 11/2009 | Decasper et al. |
| 7,617,384 B1 | 11/2009 | Coon et al. |
| 7,627,735 B2 | 12/2009 | Espasa et al. |
| 7,634,637 B1 | 12/2009 | Lindholm et al. |
| 7,647,483 B2 | 1/2010 | Bates et al. |
| 7,680,988 B1 | 3/2010 | Nickolls et al. |
| 7,681,019 B1 | 3/2010 | Favor |
| 7,707,397 B2 | 4/2010 | Henry et al. |
| 7,707,578 B1 | 4/2010 | Zedlewski et al. |
| 7,711,929 B2 | 5/2010 | Burky et al. |
| 7,716,460 B2 | 5/2010 | Stempel et al. |
| 7,743,238 B2 | 6/2010 | Biles |
| 7,757,065 B1 | 7/2010 | Jourdan et al. |
| 7,770,161 B2 | 8/2010 | Mitran et al. |
| 7,783,868 B2 | 8/2010 | Ukai |
| 7,783,869 B2 | 8/2010 | Grandou et al. |
| 7,809,925 B2 | 10/2010 | Mejdrich et al. |
| 7,848,129 B1 | 12/2010 | Deshpande et al. |
| 7,856,530 B1 | 12/2010 | Mu |
| 7,861,055 B2 | 12/2010 | Pong |
| 7,861,060 B1 | 12/2010 | Nickolls et al. |
| 7,877,582 B2 | 1/2011 | Gschwind et al. |
| 7,913,058 B2 | 3/2011 | Rozas et al. |
| 7,925,869 B2 | 4/2011 | Kelsey et al. |
| 8,044,951 B1 | 10/2011 | Brown et al. |
| 8,046,775 B2 | 10/2011 | Kang et al. |
| 8,082,420 B2 | 12/2011 | Comparan et al. |
| 8,108,545 B2 | 1/2012 | Arimilli et al. |
| 8,108,625 B1 | 1/2012 | Coon et al. |
| 8,145,844 B2 | 3/2012 | Bruce |
| 8,145,880 B1 | 3/2012 | Cismas et al. |
| 8,145,882 B1 | 3/2012 | Kishore et al. |
| 8,200,949 B1 | 6/2012 | Tarjan et al. |
| 8,219,996 B1 | 7/2012 | Morris |
| 8,230,423 B2 | 7/2012 | Frigo et al. |
| 8,239,656 B2 | 8/2012 | Rozas et al. |
| 8,301,847 B2 | 10/2012 | Dantzig et al. |
| 8,316,435 B1 | 11/2012 | Varadhan et al. |
| 8,327,115 B2 | 12/2012 | Abdallah |
| 8,438,366 B2 | 5/2013 | Akizuki et al. |
| 8,522,253 B1 | 8/2013 | Rozas et al. |
| 8,539,486 B2 | 9/2013 | Cain, III et al. |
| 8,645,965 B2 | 2/2014 | Zimmer et al. |
| 8,756,329 B2 | 6/2014 | Reynolds et al. |
| 8,868,838 B1 | 10/2014 | Glasco et al. |
| 8,930,674 B2 | 1/2015 | Avudaiyappan et al. |
| 9,021,240 B2 | 4/2015 | Alexander et al. |
| 9,047,178 B2 | 6/2015 | Talagala et al. |
| 9,135,003 B2 | 9/2015 | Suh et al. |
| 9,575,762 B2 | 2/2017 | Abdallah |
| 9,811,342 B2 | 11/2017 | Abdallah et al. |
| 9,811,377 B2 | 11/2017 | Abdallah et al. |
| 9,823,930 B2 | 11/2017 | Abdallah et al. |
| 9,858,080 B2 | 1/2018 | Abdallah |
| 10,140,138 B2 | 11/2018 | Abdallah et al. |
| 10,198,266 B2 | 2/2019 | Abdallah |
| 2001/0004755 A1 | 6/2001 | Levy et al. |
| 2001/0016901 A1 | 8/2001 | Topham |
| 2001/0032303 A1 | 10/2001 | Pechanek et al. |
| 2001/0049782 A1 | 12/2001 | Hsu et al. |
| 2002/0029308 A1 | 3/2002 | Babaian et al. |
| 2002/0062435 A1 | 5/2002 | Nemirovsky et al. |
| 2002/0069326 A1 | 6/2002 | Richardson et al. |
| 2002/0082824 A1 | 6/2002 | Neiger et al. |
| 2002/0083312 A1 | 6/2002 | Sinharoy |
| 2002/0099913 A1 | 7/2002 | Steely et al. |
| 2002/0126657 A1 | 9/2002 | Frouin et al. |
| 2002/0129085 A1 | 9/2002 | Kubala et al. |
| 2002/0174321 A1 | 11/2002 | John et al. |
| 2002/0188833 A1 | 12/2002 | Henry et al. |
| 2003/0035422 A1 | 2/2003 | Hill |
| 2003/0065887 A1 | 4/2003 | Maiyuran et al. |
| 2003/0088752 A1 | 5/2003 | Harman |
| 2003/0093776 A1 | 5/2003 | Hilton |
| 2003/0101322 A1 | 5/2003 | Gardner |
| 2003/0101444 A1 | 5/2003 | Wu et al. |
| 2003/0126408 A1 | 7/2003 | Vajapeyam et al. |
| 2003/0131335 A1 | 7/2003 | Hamlin |
| 2003/0149862 A1 | 8/2003 | Kadambi |
| 2003/0154363 A1 | 8/2003 | Soltis et al. |
| 2003/0163642 A1 | 8/2003 | Borkenhagen et al. |
| 2003/0169626 A1 | 9/2003 | Burk et al. |
| 2003/0200396 A1 | 10/2003 | Musumeci |
| 2003/0200412 A1 | 10/2003 | Peinado et al. |
| 2003/0202530 A1 | 10/2003 | Jenkins et al. |
| 2003/0225938 A1 | 12/2003 | Glasco et al. |
| 2003/0226001 A1 | 12/2003 | Moyer et al. |
| 2003/0229864 A1 | 12/2003 | Watkins |
| 2003/0233394 A1 | 12/2003 | Rudd et al. |
| 2004/0034762 A1 | 2/2004 | Kacevas |
| 2004/0044850 A1 | 3/2004 | George et al. |
| 2004/0064668 A1 | 4/2004 | Kjos et al. |
| 2004/0073909 A1 | 4/2004 | Arimilli et al. |
| 2004/0078538 A1 | 4/2004 | Dutt et al. |
| 2004/0093483 A1 | 5/2004 | Nguyen et al. |
| 2004/0098567 A1 | 5/2004 | Hansen et al. |
| 2004/0103251 A1 | 5/2004 | Alsup |
| 2004/0117593 A1 | 6/2004 | Uhlig et al. |
| 2004/0117594 A1 | 6/2004 | Vanderspek |
| 2004/0122887 A1 | 6/2004 | Macy |
| 2004/0138857 A1 | 7/2004 | Souza et al. |
| 2004/0139441 A1 | 7/2004 | Kaburaki et al. |
| 2004/0143727 A1 | 7/2004 | McDonald |
| 2004/0158822 A1 | 8/2004 | Sandham et al. |
| 2004/0172523 A1 | 9/2004 | Merchant et al. |
| 2004/0187123 A1 | 9/2004 | Tremblay et al. |
| 2004/0193857 A1 | 9/2004 | Miller et al. |
| 2004/0202158 A1 | 10/2004 | Takeno et al. |
| 2004/0205296 A1 | 10/2004 | Bearden |
| 2004/0215886 A1 | 10/2004 | Cargnoni et al. |
| 2004/0216105 A1 | 10/2004 | Burky et al. |
| 2004/0216120 A1 | 10/2004 | Burky et al. |
| 2004/0225872 A1 | 11/2004 | Bonanno et al. |
| 2005/0005085 A1 | 1/2005 | Miyanaga |
| 2005/0027961 A1 | 2/2005 | Zhang |
| 2005/0044547 A1 | 2/2005 | Gipp |
| 2005/0055504 A1 | 3/2005 | Hass et al. |
| 2005/0060457 A1 | 3/2005 | Olukotun |
| 2005/0066131 A1 | 3/2005 | Biles et al. |
| 2005/0108480 A1 | 5/2005 | Correale, Jr. et al. |
| 2005/0108715 A1 | 5/2005 | Kanai et al. |
| 2005/0114603 A1 | 5/2005 | Buti et al. |
| 2005/0120191 A1 | 6/2005 | Akkary et al. |
| 2005/0120194 A1 | 6/2005 | Kissell |
| 2005/0132145 A1 | 6/2005 | Dybsetter et al. |
| 2005/0154867 A1 | 7/2005 | DeWitt et al. |
| 2005/0204118 A1 | 9/2005 | Jen et al. |
| 2005/0210457 A1 | 9/2005 | Guilford |
| 2005/0216920 A1 | 9/2005 | Tewari et al. |
| 2005/0251639 A1 | 11/2005 | Vishin et al. |
| 2005/0251649 A1 | 11/2005 | Yamazaki |
| 2005/0262270 A1 | 11/2005 | Latorre et al. |
| 2005/0289299 A1 | 12/2005 | Nunamaker et al. |

(56) References Cited

U.S. PATENT DOCUMENTS

| | | |
|---|---|---|
| 2005/0289530 A1 | 12/2005 | Robison |
| 2006/0004964 A1 | 1/2006 | Conti et al. |
| 2006/0026381 A1 | 2/2006 | Doi et al. |
| 2006/0026408 A1 | 2/2006 | Morris et al. |
| 2006/0036516 A1 | 2/2006 | Glebe |
| 2006/0080380 A1 | 4/2006 | Aizu et al. |
| 2006/0094446 A1 | 5/2006 | Duan |
| 2006/0095720 A1 | 5/2006 | Biles et al. |
| 2006/0143390 A1 | 6/2006 | Kottapalli |
| 2006/0161421 A1 | 7/2006 | Kissell |
| 2006/0161921 A1 | 7/2006 | Kissell |
| 2006/0179257 A1 | 8/2006 | Chu et al. |
| 2006/0179281 A1 | 8/2006 | Jensen et al. |
| 2006/0179289 A1 | 8/2006 | Floyd et al. |
| 2006/0190707 A1 | 8/2006 | McIlvaine et al. |
| 2006/0212687 A1 | 9/2006 | Chen et al. |
| 2006/0230243 A1 | 10/2006 | Cochran et al. |
| 2006/0230253 A1 | 10/2006 | Codrescu et al. |
| 2006/0230409 A1 | 10/2006 | Frigo et al. |
| 2006/0236074 A1 | 10/2006 | Williamson et al. |
| 2006/0236080 A1 | 10/2006 | Doing et al. |
| 2006/0242365 A1 | 10/2006 | Ali et al. |
| 2006/0242384 A1 | 10/2006 | Ahmed et al. |
| 2006/0256641 A1 | 11/2006 | Johnstone |
| 2006/0277365 A1 | 12/2006 | Pong |
| 2006/0282839 A1 | 12/2006 | Hankins et al. |
| 2007/0006231 A1 | 1/2007 | Wang et al. |
| 2007/0074005 A1 | 3/2007 | Abernathy et al. |
| 2007/0186050 A1 | 8/2007 | Luick |
| 2007/0198665 A1 | 8/2007 | De et al. |
| 2007/0214343 A1 | 9/2007 | Lindholm et al. |
| 2007/0226722 A1 | 9/2007 | Chou |
| 2007/0262270 A1 | 11/2007 | Huang et al. |
| 2008/0016507 A1 | 1/2008 | Thomas et al. |
| 2008/0040724 A1 | 2/2008 | Kang et al. |
| 2008/0046666 A1 | 2/2008 | Termaine et al. |
| 2008/0052432 A1 | 2/2008 | Wilson et al. |
| 2008/0077813 A1 | 3/2008 | Keller et al. |
| 2008/0091880 A1 | 4/2008 | Vishin |
| 2008/0104598 A1 | 5/2008 | Chang |
| 2008/0109611 A1 | 5/2008 | Liu et al. |
| 2008/0126643 A1 | 5/2008 | Higuchi |
| 2008/0126771 A1 | 5/2008 | Chen et al. |
| 2008/0148237 A1 | 6/2008 | Jiang et al. |
| 2008/0184211 A1 | 7/2008 | Nickolls et al. |
| 2008/0195844 A1 | 8/2008 | Shen et al. |
| 2008/0215865 A1 | 9/2008 | Hino et al. |
| 2008/0225987 A1 | 9/2008 | Fazzi et al. |
| 2008/0235500 A1 | 9/2008 | Davis et al. |
| 2008/0250227 A1 | 10/2008 | Linderman et al. |
| 2008/0250232 A1 | 10/2008 | Nakashima |
| 2008/0256278 A1 | 10/2008 | Thomas et al. |
| 2008/0256330 A1 | 10/2008 | Wang et al. |
| 2008/0270758 A1 | 10/2008 | Ozer et al. |
| 2008/0270774 A1 | 10/2008 | Singh et al. |
| 2008/0282037 A1 | 11/2008 | Kusachi et al. |
| 2008/0320476 A1 | 12/2008 | Wingard et al. |
| 2009/0019264 A1 | 1/2009 | Correale, Jr. et al. |
| 2009/0031104 A1 | 1/2009 | Vorbach et al. |
| 2009/0070554 A1 | 3/2009 | Wang et al. |
| 2009/0113170 A1 | 4/2009 | Abdallah |
| 2009/0119457 A1 | 5/2009 | Latorre et al. |
| 2009/0138659 A1 | 5/2009 | Lauterbach |
| 2009/0138670 A1 | 5/2009 | Mutlu et al. |
| 2009/0150647 A1 | 6/2009 | Mejdrich et al. |
| 2009/0150890 A1* | 6/2009 | Yourst .................. G06F 8/445 |
| | | 718/102 |
| 2009/0157980 A1 | 6/2009 | Bruce |
| 2009/0158017 A1 | 6/2009 | Mutlu et al. |
| 2009/0164733 A1 | 6/2009 | Kim et al. |
| 2009/0164766 A1 | 6/2009 | Suggs et al. |
| 2009/0165007 A1 | 6/2009 | Aghajanyan |
| 2009/0172344 A1 | 7/2009 | Grochowski et al. |
| 2009/0240919 A1 | 9/2009 | Alexander et al. |
| 2009/0241084 A1 | 9/2009 | Malley et al. |
| 2009/0249026 A1 | 10/2009 | Smelyanskiy et al. |
| 2009/0251476 A1 | 10/2009 | Jiao et al. |
| 2009/0282101 A1 | 11/2009 | Lim et al. |
| 2009/0287912 A1 | 11/2009 | Sendag |
| 2009/0307450 A1 | 12/2009 | Lee |
| 2009/0313462 A1 | 12/2009 | Emma et al. |
| 2009/0328053 A1 | 12/2009 | Dice |
| 2010/0058033 A1 | 3/2010 | Abernathy et al. |
| 2010/0064121 A1 | 3/2010 | Alexander et al. |
| 2010/0082912 A1 | 4/2010 | Lesartre et al. |
| 2010/0088443 A1 | 4/2010 | Riocreux et al. |
| 2010/0100690 A1 | 4/2010 | Rajamani, Sr. et al. |
| 2010/0100704 A1 | 4/2010 | Hill et al. |
| 2010/0100707 A1 | 4/2010 | Mejdrich et al. |
| 2010/0115167 A1 | 5/2010 | Tardieux et al. |
| 2010/0115244 A1 | 5/2010 | Jensen et al. |
| 2010/0138607 A1 | 6/2010 | Hughes et al. |
| 2010/0154042 A1 | 6/2010 | Miyamoto et al. |
| 2010/0161948 A1* | 6/2010 | Abdallah ............ G06F 9/30043 |
| | | 712/228 |
| 2010/0169578 A1 | 7/2010 | Nychka et al. |
| 2010/0169611 A1 | 7/2010 | Chou et al. |
| 2010/0205603 A1 | 8/2010 | Merten et al. |
| 2010/0211746 A1 | 8/2010 | Tsukishiro |
| 2010/0280996 A1 | 11/2010 | Gross, IV et al. |
| 2010/0286976 A1 | 11/2010 | Gao et al. |
| 2010/0299671 A1 | 11/2010 | Kinsey |
| 2010/0306503 A1 | 12/2010 | Henry et al. |
| 2010/0325394 A1 | 12/2010 | Golla et al. |
| 2010/0332805 A1 | 12/2010 | Blasco et al. |
| 2011/0010521 A1 | 1/2011 | Wang et al. |
| 2011/0055479 A1 | 3/2011 | West et al. |
| 2011/0067016 A1 | 3/2011 | Mizrachi et al. |
| 2011/0082980 A1 | 4/2011 | Gschwind et al. |
| 2011/0082983 A1 | 4/2011 | Koktan |
| 2011/0093857 A1 | 4/2011 | Sydow et al. |
| 2011/0119660 A1 | 5/2011 | Tanaka |
| 2011/0153955 A1 | 6/2011 | Herrenschmidt et al. |
| 2011/0225588 A1 | 9/2011 | Pollock et al. |
| 2012/0005462 A1 | 1/2012 | Hall et al. |
| 2012/0023318 A1 | 1/2012 | Xing et al. |
| 2012/0042105 A1 | 2/2012 | Maeda et al. |
| 2012/0042126 A1 | 2/2012 | Krick et al. |
| 2012/0066483 A1 | 3/2012 | Boury et al. |
| 2012/0089812 A1 | 4/2012 | Smith |
| 2012/0096204 A1 | 4/2012 | Auerbach et al. |
| 2012/0198209 A1 | 8/2012 | Abdallah et al. |
| 2012/0246450 A1 | 9/2012 | Abdallah |
| 2012/0246657 A1 | 9/2012 | Abdallah |
| 2012/0278593 A1 | 11/2012 | Clark et al. |
| 2013/0019047 A1 | 1/2013 | Podvalny et al. |
| 2013/0036296 A1 | 2/2013 | Hickey et al. |
| 2013/0046934 A1 | 2/2013 | Nychka et al. |
| 2013/0086417 A1 | 4/2013 | Sivaramakrishnan et al. |
| 2013/0097369 A1 | 4/2013 | Talagala et al. |
| 2013/0138888 A1 | 5/2013 | Barreh et al. |
| 2013/0238874 A1 | 9/2013 | Avudaiyappan et al. |
| 2013/0283286 A1 | 10/2013 | Lee et al. |
| 2013/0304991 A1 | 11/2013 | Boettcher et al. |
| 2013/0311759 A1 | 11/2013 | Abdallah |
| 2013/0339671 A1 | 12/2013 | Williams, III et al. |
| 2013/0346699 A1 | 12/2013 | Walker |
| 2014/0032844 A1 | 1/2014 | Avudaiyappan et al. |
| 2014/0032845 A1 | 1/2014 | Avudaiyappan et al. |
| 2014/0032856 A1 | 1/2014 | Avudaiyappan |
| 2014/0075168 A1 | 3/2014 | Abdallah |
| 2014/0108730 A1 | 4/2014 | Avudaiyappan et al. |
| 2014/0123145 A1 | 5/2014 | Barrow-Williams et al. |
| 2014/0156947 A1 | 6/2014 | Avudaiyappan |
| 2014/0181833 A1 | 6/2014 | Bird et al. |
| 2014/0281242 A1 | 9/2014 | Abdallah et al. |
| 2014/0281411 A1 | 9/2014 | Abdallah |
| 2014/0281412 A1 | 9/2014 | Abdallah |
| 2014/0281416 A1 | 9/2014 | Abdallah |
| 2014/0281426 A1 | 9/2014 | Abdallah et al. |
| 2014/0281427 A1 | 9/2014 | Abdallah |
| 2014/0281428 A1 | 9/2014 | Abdallah et al. |
| 2014/0281436 A1 | 9/2014 | Abdallah |
| 2014/0282592 A1 | 9/2014 | Abdallah |

(56) References Cited

U.S. PATENT DOCUMENTS

| | | |
|---|---|---|
| 2014/0282601 A1 | 9/2014 | Abdallah |
| 2014/0317387 A1 | 10/2014 | Abdallah |
| 2014/0344554 A1 | 11/2014 | Abdallah |
| 2014/0373022 A1 | 12/2014 | Chan |
| 2015/0039859 A1 | 2/2015 | Abdallah |
| 2015/0046683 A1 | 2/2015 | Abdallah |
| 2015/0046686 A1 | 2/2015 | Abdallah |
| 2015/0186144 A1 | 7/2015 | Abdallah |
| 2016/0041908 A1 | 2/2016 | Avudaiyappan |
| 2016/0041913 A1 | 2/2016 | Avudaiyappan |
| 2016/0041930 A1 | 2/2016 | Avudaiyappan |
| 2016/0154653 A1 | 6/2016 | Abdallah |
| 2016/0210145 A1 | 7/2016 | Abdallah |
| 2016/0210176 A1 | 7/2016 | Abdallah |
| 2016/0371188 A1 | 12/2016 | Abdallah et al. |

FOREIGN PATENT DOCUMENTS

| | | | |
|---|---|---|---|
| CN | 1451115 A | | 10/2003 |
| CN | 1214666 C | | 8/2005 |
| CN | 1713137 A | | 12/2005 |
| CN | 1774709 A | | 5/2006 |
| CN | 1841314 A | | 10/2006 |
| CN | 1841332 A | | 10/2006 |
| CN | 1848095 A | | 10/2006 |
| CN | 1881223 A | | 12/2006 |
| CN | 101114218 | | 1/2008 |
| CN | 101151594 A | | 3/2008 |
| CN | 101241428 | | 8/2008 |
| CN | 101344840 | | 1/2009 |
| CN | 101449256 A | | 6/2009 |
| CN | 101582025 | | 11/2009 |
| CN | 101627365 | | 1/2010 |
| CN | 101916180 A | | 12/2010 |
| CN | 102105864 A | | 6/2011 |
| EP | 0596636 A2 | | 5/1994 |
| EP | 0706133 A2 | | 4/1996 |
| EP | 2616928 A2 | | 7/2013 |
| GB | 2343270 A | | 5/2000 |
| JP | 2000330790 A | | 11/2000 |
| KR | 20010053622 | | 6/2001 |
| KR | 1020010050794 | | 6/2001 |
| KR | 20100003309 A | | 1/2010 |
| TW | 200707284 | | 3/1995 |
| TW | 539996 B | | 7/2003 |
| TW | 544626 B | | 8/2003 |
| TW | 200401187 A | | 1/2004 |
| TW | 200405201 A | | 4/2004 |
| TW | 591530 B | | 6/2004 |
| TW | 200422949 A | | 11/2004 |
| TW | I233545 B | | 6/2005 |
| TW | I281121 B | | 5/2007 |
| TW | 200813766 A | | 3/2008 |
| TW | 200844853 A | | 11/2008 |
| TW | 315488 | | 10/2009 |
| TW | 200941339 A | | 10/2009 |
| TW | 200949690 A | | 12/2009 |
| TW | I329437 B | | 8/2010 |
| TW | I331282 B | | 10/2010 |
| TW | I352288 B | | 11/2011 |
| TW | 201227520 A | | 7/2012 |
| TW | 201241744 A | | 10/2012 |
| TW | 201305819 A | | 2/2013 |
| WO | 9750031 A1 | | 12/1997 |
| WO | 9919793 A1 | | 4/1999 |
| WO | 0125921 A1 | | 4/2001 |
| WO | 2004114128 A2 | | 12/2004 |
| WO | 2007027671 A2 | | 3/2007 |
| WO | 2008021434 A1 | | 2/2008 |
| WO | 2008061154 A2 | | 5/2008 |
| WO | 2009012296 A2 | | 1/2009 |
| WO | 2009101563 A1 | | 8/2009 |
| WO | 2010049585 A1 | | 5/2010 |
| WO | 2012135031 A2 | | 10/2012 |
| WO | 2012135050 A2 | | 10/2012 |

OTHER PUBLICATIONS

Non-Final Office Action from U.S. Appl. No. 15/853,323, dated Aug. 28, 2018, 115 pages.
Notice of Allowance from U.S. Appl. No. 15/408,311, dated Aug. 28, 2018, 138 pages.
Notice of Allowance from U.S. Appl. No. 13/824,013, dated Sep. 19, 2018, 6 pages.
Notice of Allowance from U.S. Appl. No. 15/408,269, dated Sep. 24, 2018, 137 pages.
Final Office Action from U.S. Appl. No. 14/360,280, dated Aug. 10, 2017, 103 pages.
Non-Final Office Action from U.S. Appl. No. 15/082,359, dated Aug. 11, 2017, 108 pages.
Non-final Office Action from U.S. Appl. No. 15/354,742, dated Aug. 25, 2017, 152 pages.
Non-final Office Action from U.S. Appl. No. 15/357,943, dated Aug. 25, 2017, 111 pages.
Notice of Allowance from U.S. Appl. No. 13/428,438, dated Aug. 7, 2017, 42 pages.
Notice of Allowance from U.S. Appl. No. 14/213,135, dated Aug. 3, 2017, 103 pages.
Notice of Allowance from U.S. Appl. No. 14/216,493, dated Aug. 4, 2017, 95 pages.
Final Office Action from U.S. Appl. No. 14/212,203, dated Sep. 12, 2017, 84 pages.
Final Office Action from U.S. Appl. No. 14/212,533, dated Sep. 8, 2017, 69 pages.
Non-Final Office Action from U.S. Appl. No. 15/354,857, dated Sep. 12, 2017, 111 pages.
Notice of Allowance from foreign counterpart Korean Patent Application No. 10-2015-7029262, dated Aug. 31, 2017, 3 pages.
Notice of Allowance from U.S. Appl. No. 14/213,730, dated Aug. 31, 2017, 96 pages.
Notice on Grant of Patent Right for Invention from foreign counterpart China Application No. 201180076244.2, dated Aug. 28, 2017, 4 pages.
Office Action and Search Report from foreign counterpart Taiwan Patent Application No. 100142885, dated Jan. 23, 2017, 12 pages.
Third Office Action from foreign counterpart China Patent Application No. 201280024054.0, dated Jul. 28, 2017, 8 pages.
Final Office Action from U.S. Appl. No. 13/475,708, dated Jun. 9, 2016, 35 pages.
Final Office Action from U.S. Appl. No. 13/475,708, dated May 8, 2015, 23 pages.
Final Office Action from U.S. Appl. No. 13/475,739, dated Feb. 4, 2015, 12 pages.
Final Office Action from U.S. Appl. No. 13/475,739, dated Nov. 23, 2015, 28 pages.
Final Office Action from U.S. Appl. No. 14/194,589, dated Apr. 19, 2016, 7 pages.
Final Office Action from U.S. Appl. No. 14/212,203, dated Dec. 13, 2016, 20 pages.
Final Office Action from U.S. Appl. No. 14/212,533, dated Jan. 4, 2017, 27 pages.
Final Office Action from U.S. Appl. No. 14/213,115, dated Feb. 3, 2015, 11 pages.
Final Office Action from U.S. Appl. No. 14/213,115, dated Mar. 7, 2016, 18 pages.
Final Office Action from U.S. Appl. No. 14/213,218, dated Jul. 6, 2016, 24 pages.
Final Office Action from U.S. Appl. No. 14/213,218, dated Jul. 22, 2015, 16 pages.
Final Office Action from U.S. Appl. No. 14/213,692, dated Jan. 20, 2016, 18 pages.
Final Office Action from U.S. Appl. No. 14/213,854, dated Nov. 9, 2015, 19 pages.
Final Office Action from U.S. Appl. No. 14/214,045, dated Aug. 29, 2016, 14 pages.
Final Office Action from U.S. Appl. No. 14/214,176, dated Aug. 29, 2016, 17 pages.
Final Office Action from U.S. Appl. No. 14/214,280, dated Mar. 6, 2017, 12 pages.

(56) References Cited

OTHER PUBLICATIONS

Final Office Action from U.S. Appl. No. 14/214,280, dated Mar. 11, 2016, 18 pages.
Final Office Action from U.S. Appl. No. 14/214,280, dated Oct. 24, 2016, 20 pages.
Final Office Action from U.S. Appl. No. 14/216,493, dated Aug. 30, 2016, 21 pages.
Final Office Action from U.S. Appl. No. 14/360,282, dated Feb. 16, 2017, 10 pages.
Final Office Action from U.S. Appl. No. 14/360,284, dated Mar. 1, 2017, 10 pages.
First Office Action and Search report from foreign counterpart China Patent Application No. 201180076248.0, dated Mar. 17, 2016, 25 pages.
First Office Action from foreign counterpart China Patent Application No. CN201280034725, dated Oct. 26, 2015, 26 pages.
First Office Action from foreign counterpart China Patent Application No. CN201280034739, dated Nov. 3, 2015, 39 pages.
First Office Action from foreign counterpart China Patent Application No. CN201310589048, dated Feb. 2, 2016, 8 pages.
First Office Action from foreign counterpart Chinese Patent Application No. 201280024054.0, dated May 30, 2016, 24 pages.
First Office Action from foreign counterpart Chinese patent application No. 201280024095, dated May 26, 2016, 32 pages.
Franklin et al., "The Expandable Split Window Paradigm for Exploiting Fine-Grain Parallelism," ACM Sigarch Computer Architecture News, ACM Special Interest Group on Computer Architecture, vol. 20 (2), 1992, 10 pages.
Garmany J., "The Power of Indexing," archieved on Mar. 9, 2009, 7 pages.
Grant of Patent for Korean Application No. 10-2014-7016763, dated Oct. 31, 2016, 2 pages.
Grant of Patent for Korean Application No. 10-2015-7028745, dated Nov. 30, 2016, 2 pages.
Intention to Grant a patent for European Application No. 07811845, dated Mar. 31, 2016, 58 pages.
Intention to Grant a patent for European Application No. 12150513, dated Mar. 15, 2016, 59 pages.
International Preliminary Report on Patentability and for Application No. PCT/US2007/084710, dated May 19, 2009, 4 pages.
International Preliminary Report on Patentability and Written Opinion for Application No. PCT/US2007/066536, dated Oct. 14, 2008, 6 pages.
International Preliminary Report on Patentability and Written Opinion for Application No. PCT/US2012/038711, dated Nov. 20, 2013, 5 pages.
International Preliminary Report on Patentability and Written Opinion for Application No. PCT/US2012/038713, dated Nov. 20, 2013, 5 pages.
International Preliminary Report on Patentability for Application No. PCT/US2011/051992, dated Mar. 28, 2013, 8 pages.
International Preliminary Report on Patentability for Application No. PCT/US2011/061953, dated Jun. 5, 2014, 7 pages.
International Preliminary Report on Patentability for Application No. PCT/US2011/061957, dated Jun. 5, 2014, 7 pages.
International Preliminary Report on Patentability for Application No. PCT/US2012/030383, dated Oct. 10, 2013, 6 pages.
International Preliminary Report on Patentability for Application No. PCT/US2012/030409, dated Oct. 10, 2013, 6 pages.
International Preliminary Report on Patentability for Application No. PCT/US2012/30360, dated Oct. 10, 2013, 6 pages.
International Preliminary Report on Patentability for Application No. PCT/US2014/024276, dated Sep. 24, 2015, 6 pages.
International Preliminary Report on Patentability for Application No. PCT/US2014/024608, dated Sep. 24, 2015, 8 pages.
International Preliminary Report on Patentability for Application No. PCT/US2014/024722, dated Sep. 24, 2015, 6 pages.
International Preliminary Report on Patentability for Application No. PCT/US2014/024775, dated Sep. 24, 2015, 6 pages.
International Search Report and Written Opinion for Application No. PCT/US2007/084710, dated May 22, 2008, 6 pages.
International Search Report and Written Opinion for Application No. PCT/US2011/051992, dated Mar. 28, 2012, 11 pages.
International Search Report and Written Opinion for Application No. PCT/US2011/061953, dated Jul. 24, 2012, 8 pages.
Final Office Action from U.S. Appl. No. 15/354,742, dated Nov. 29, 2017, 20 pages.
Final Office Action from U.S. Appl. No. 15/354,857, dated Nov. 28, 2017, 23 pages.
Fourth Office Action and Search report from foreign counterpart China Patent Application No. 201180076248.0, dated Nov. 9, 2017, 38 pages. (Translation available only for office action).
Non-Final Office Action from U.S. Appl. No. 14/360,280, dated Dec. 14, 2017, 25 pages.
Notice of Allowance and Search Report from foreign counterpart Taiwan Patent Application No. 103109479, dated Nov. 30, 2017, 4 pages. (Translation available only for Search report).
Notice of Allowance from foreign counterpart Korean Patent Application No. 10-2017-7002379, dated Dec. 20, 2017, 3 pages.
Notice of Allowance from foreign counterpart Korean Patent Application No. 10-2017-7002473, dated Dec. 20, 2017, 6 pages.
Notice of Allowance from U.S. Appl. No. 13/475,708, dated Nov. 27, 2017, 24 pages.
Notice of Allowance from U.S. Appl. No. 14/216,859, dated Dec. 1, 2017, 113 pages.
Notice of Allowance from U.S. Appl. No. 15/019,920, dated Dec. 6, 2017, 24 pages.
Notice of Allowance from U.S. Appl. No. 15/082,867, dated Dec. 22, 2017, 25 pages.
Notice on Grant of Patent Right for Invention from foreign counterpart Chinese Patent Application No. 201280024054.0, dated Dec. 1, 2017, 4 pages.
Second Office Action from foreign counterpart China Patent Application No. 201480024463.X, dated Nov. 14, 2017, 34 pages.
Non-Final Office Action from U.S. Appl. No. 15/408,323, dated Oct. 9, 2018, 144 pages.
Non-Final Office Action from U.S. Appl. No. 15/866,323, dated Oct. 1, 2018, 121 pages.
Notice of Allowance from U.S. Appl. No. 14/213,135, dated Oct. 3, 2018, 34 pages.
Notice of Allowance from U.S. Appl. No. 14/360,284, dated Oct. 12, 2018, 45 pages.
Notice of Allowance from U.S. Appl. No. 15/712,017, dated Oct. 3, 2018, 16 pages.
Second Office Action from foreign counterpart Chinese Patent Application No. 201480024528.0, dated Oct. 8, 2018, 3 pages.
Advisory Action from U.S. Appl. No. 14/212,203, dated Apr. 5, 2018, 8 pages.
Communication pursuant to Article 94(3) EPC for Application No. 14770976.0, dated Mar. 16, 2018, 4 pages.
Non-Final Office Action from U.S. Appl. No. 15/862,496, dated Apr. 5, 2018, 151 pages.
Notice of Allowance from U.S. Appl. No. 14/216,493, dated Apr. 2, 2018, 22 pages.
Communication pursuant to Article 94(3) EPC for Application No. 11876128.7, dated Feb. 5, 2018, 9 pages.
Communication pursuant to Article 94(3) EPC for Application No. 11876130.3, dated Feb. 5, 2018, 9 pages.
Communication pursuant to Article 94(3) EPC for Application No. 11876314.3, dated Feb. 5, 2018, 8 pages.
Communication pursuant to Article 94(3) EPC for Application No. 12789667.8, dated Feb. 21, 2018, 4 pages.
Corrected Notice of Allowance from U.S. Appl. No. 15/357,943, dated Apr. 2, 2018, 4 pages.
First Office Action and Search Report from foreign counterpart Chinese Patent Application No. 201480024832.5, dated Feb. 6, 2018, 15 pages. (Translation available only for office action).
Intention to grant from foreign counterpart European Patent Application No. 12788989.7, dated Feb. 23, 2018, 47 pages.
Notice of Allowance from U.S. Appl. No. 15/082,359, dated Mar. 21, 2018, 9 pages.

(56) References Cited

OTHER PUBLICATIONS

Notice of Allowance from U.S. Appl. No. 15/219,063, dated Mar. 19, 2018, 28 pages.
Notice on Grant of Patent Right for Invention from foreign counterpart Chinese Patent Application No. 201180076248.1, dated Feb. 27, 2018, 6 pages.
Notice on Grant of Patent Right for Invention from foreign counterpart Chinese Patent Application No. 201280024012.7, dated Mar. 12, 2018, 4 pages.
International Search Report and Written Opinion for Application No. PCT/US2011/061957, dated Jul. 20, 2012, 8 pages.
International Search Report and Written Opinion for Application No. PCT/US2012/030383, dated Oct. 25, 2012, 8 pages.
International Search Report and Written Opinion for Application No. PCT/US2012/030409, dated Oct. 12, 2012, 7 pages.
International Search Report and Written opinion for Application No. PCT/US2012/038711, dated Nov. 28, 2012, 7 pages.
International Search Report and Written Opinion for Application No. PCT/US2012/038713, dated Oct. 29, 2012, 7 pages.
International Search Report and Written Opinion for Application No. PCT/US2012/30360, dated Oct. 29, 2012, 7 pages.
International Search Report and Written Opinion for Application No. PCT/US2014/024276, dated Jul. 31, 2014, 7 pages.
International Search Report and Written Opinion for Application No. PCT/US2014/024608, dated Jul. 31, 2014, 9 pages.
International Search Report and Written Opinion for Application No. PCT/US2014/024722, dated Jun. 27, 2014, 7 pages.
International Search Report and Written Opinion for Application No. PCT/US2014/024775, dated Jun. 2, 2014, 7 pages.
International Search Report for Application No. PCT/US2007/066536, dated Jul. 30, 2008, 2 pages.
Jacobson et al., "Path-based Next Trace Prediction," IEEE, 1997, pp. 14-23.
Kozyrakis et al., "A New Direction for Computer Architecture Research," IEEE, Nov. 1, 1998, vol. 31 (11), pp. 24-32.
Mogul J.C., et al., "Potential Benefits of Delta Encoding and Data Compression for HTTP," Oct. 1, 1997, ACM, SIGCOMM '97, pp. 181-194.
Nagarajan et al., "A Design Space Evaluation of Grid Processor Architectures," 34th ACM/IEEE International Symposium, Piscataway, NJ, Dec. 1-5, 2001, pp. 40-51.
Nanda A.K., et al., "The Misprediction Recovery Cache," International Journal of Parallel Programming, Plenum Publishing Corporation, 1998, vol. 26 (4), pp. 383-415.
Non-Final Office Action from U.S. Appl. No. 12/296,919, dated Apr. 7, 2011, 8 pages.
Non-Final Office Action from U.S. Appl. No. 12/296,919, dated Jun. 14, 2010, 7 pages.
Non-Final Office Action from U.S. Appl. No. 12/296,919, dated Mar. 7, 2012, 7 pages.
Non-Final Office Action from U.S. Appl. No. 12/514,303, dated Jun. 27, 2013, 7 pages.
Non-Final Office Action from U.S. Appl. No. 12/514,303, dated May 10, 2012, 9 pages.
Non-Final Office Action from U.S. Appl. No. 13/428,438, dated Apr. 24, 2014, 15 pages.
Non-Final Office Action from U.S. Appl. No. 13/428,438, dated May 1, 2015, 12 pages.
Non-Final Office Action from U.S. Appl. No. 13/428,440, dated Jun. 18, 2014, 16 pages.
Non-Final Office Action from U.S. Appl. No. 13/428,440, dated May 4, 2015, 13 pages.
Non-Final Office Action from U.S. Appl. No. 13/428,452, dated Apr. 23, 2015, 11 pages.
Non-Final Office Action from U.S. Appl. No. 13/428,452, dated Apr. 28, 2014, 21 pages.
Non-Final Office Action from U.S. Appl. No. 13/475,708, dated Feb. 11, 2015, 27 pages.
Non-Final Office Action from U.S. Appl. No. 13/475,708, dated Feb. 12, 2016, 37 pages.
Non-Final Office Action from U.S. Appl. No. 13/475,739, dated May 21, 2015, 14 pages.
Non-Final Office Action from U.S. Appl. No. 13/475,739, dated Sep. 2, 2014, 15 pages.
Non-Final Office Action from U.S. Appl. No. 13/691,609, dated Jan. 15, 2014, 5 pages.
Non-Final Office Action from U.S. Appl. No. 13/691,609, dated Sep. 5, 2013, 11 pages.
Non-Final Office Action from U.S. Appl. No. 14/194,589, dated Nov. 19, 2015, 12 pages.
Non-Final Office Action from U.S. Appl. No. 14/212,203, dated Mar. 24, 2017, 68 pages.
Non-Final Office Action from U.S. Appl. No. 14/212,203, dated Sep. 8, 2016, 52 pages.
Non-Final Office Action from U.S. Appl. No. 14/212,533, dated Sep. 22, 2016, 52 pages.
Non-Final Office Action from U.S. Appl. No. 14/213,115, dated Oct. 19, 2015, 24 pages.
Non-Final Office Action from U.S. Appl. No. 14/213,115, dated Sep. 22, 2014, 19 pages.
Non-Final Office Action from U.S. Appl. No. 14/213,218, dated Apr. 22, 2015, 22 pages.
Non-Final Office Action from U.S. Appl. No. 14/213,218, dated Feb. 2, 2016, 17 pages.
Non-final Office Action from U.S. Appl. No. 14/213,692, dated Aug. 24, 2015, 30 pages.
Non-final Office Action from U.S. Appl. No. 14/213,692, dated Jun. 13, 2016, 17 pages.
Non-Final Office Action from U.S. Appl. No. 14/213,854, dated Apr. 29, 2016, 13 pages.
Non-Final Office Action from U.S. Appl. No. 14/213,854, dated Jun. 19, 2015, 23 pages.
Non-Final Office Action from U.S. Appl. No. 14/214,045, dated Apr. 1, 2016, 61 pages.
Non-Final Office Action from U.S. Appl. No. 14/214,045, dated Dec. 19, 2016, 88 pages.
Non-Final Office Action from U.S. Appl. No. 14/214,176, dated Jan. 6, 2017, 36 pages.
Non-Final Office Action from U.S. Appl. No. 14/214,176, dated Mar. 25, 2016, 25 pages.
Non-Final Office Action from U.S. Appl. No. 14/214,280, dated Jan. 6, 2017, 14 pages.
Abandonment from U.S. Appl. No. 13/824,013, mailed Mar. 3, 2015, 1 page.
Advisory Action from U.S. Appl. No. 12/296,919, dated Aug. 26, 2011, 3 pages.
Alimohammad et al., "Modeling of FPGA Local/global Interconnect Resources and Derivation of Minimal Test Configuration," 2002, IEEE, Proceedings of the 17th IEEE International Symposium on Defect and Fault Tolerance in VLSI Systems, DFT'02, pp. 1-9.
Barham P., et al., "Xen and the Art of Virtualization," Proceedings of the ACM Symposium on Operating Systems Principles, XP002298786, Oct. 2003, pp. 164-177.
Communication pursuant to Article 94(3) EPC for European Application No. 070864410, dated Mar. 16, 2012, 4 pages.
Communication pursuant to Article 94(3) EPC for European Application No. 070864410, dated Nov. 14, 2012, 4 pages.
Communication pursuant to Article 94(3) EPC for European Application No. 07811845, dated Apr. 16, 2014, 5 pages.
Communication pursuant to Article 94(3) EPC for European Application No. 07811845, dated Dec. 21, 2015, 3 pages.
Communication pursuant to Article 94(3) EPC for European Application No. 07811845, dated Feb. 3, 2014, 5 pages.
Communication pursuant to Article 94(3) EPC for European Application No. 07811845, dated Feb. 16, 2011, 6 pages.
Communication pursuant to Article 94(3) EPC for European Application No. 07811845, dated Jan. 27, 2012, 7 pages.
Communication pursuant to Article 94(3) EPC for European Application No. 12150513, dated Apr. 16, 2013, 5 pages.
Communication pursuant to Article 94(3) EPC for European Application No. 12150513, dated Dec. 21, 2015, 4 pages.

(56) References Cited

OTHER PUBLICATIONS

Communication pursuant to Article 94(3) EPC for European Application No. 12150513, dated May 9, 2014, 8 pages.
Communication pursuant to Article 94(3) EPC for European Application No. 12174228, dated Jun. 11, 2013, 3 pages.
Communication pursuant to Article 94(3) EPC for European Application No. 12764627, dated Oct. 4, 2016, 4 pages.
Communication pursuant to Rules 161(2) and 162 EPC for Application No. 12763717, dated Nov. 22, 2013, 3 pages.
Communication pursuant to Rules 70(2) and 70a(2) EPC for Application No. 12763717, dated Oct. 10, 2014, 1 page.
Communication pursuant to Rules 70(2) and 70a(2) EPC for European Application No. 11876314.3, dated Jul. 1, 2016, 1 page.
Cooperman G., "Cache Basics," 2003, pp. 1-3, URL: http://www.ccs.neu.edu/course/com3200/parent/NOTES/cache-basics.html.
Decision to Grant a Patent for European Application No. 07811845, dated Jun. 16, 2016, 2 pages.
Decision to Grant a Patent for European Application No. 12150513, dated Jun. 16, 2016, 2 pages.
Decision to Grant a Patent for European Application No. 12174228, dated Dec. 13, 2013, 5 pages.
Decision to Grant a Patent for Korean Application No. KR1020137027843, dated Apr. 29, 2016, 2 pages.
Decision to Grant a Patent for Korean Patent Application No. 20137027842, dated Mar. 31, 2016, 2 pages.
Decision to Grant a Patent from foreign counterpart Korean Patent Application No. 20137033565, dated Apr. 29, 2016, 2 pages.
Decision to Grant a Patent from foreign counterpart Korean Patent Application No. 20137033566, dated Apr. 29, 2016, 2 pages.
Examination Report for European Application No. 12763717, dated Nov. 28, 2016, 5 pages.
Extended European Search Report for Application No. 07811845.2, dated Nov. 2, 2009, 7 pages.
Extended European Search Report for Application No. 07864410, dated Feb. 19, 2010, 8 pages.
Extended European Search Report for Application No. 11876314.3, dated Jun. 14, 2016, 6 pages.
Extended European Search Report for Application No. 12150513, dated Jun. 19, 2012, 8 pages.
Extended European Search Report for Application No. 12174228, dated Oct. 16, 2012, 4 pages.
Extended European Search Report for Application No. 12174229, dated Jul. 4, 2014, 10 pages.
Extended European Search Report for Application No. 12174229, dated Oct. 10, 2012, 7 pages.
Extended European Search Report for Application No. 12788989, dated May 12, 2016, 9 pages.
Extended European Search Report for Application No. 12789667, dated Feb. 26, 2016, 7 pages.
Extended European Search Report for Application No. 14769450.9, dated Feb. 21, 2017, 16 pages.
Extended European Search Report for Application No. 16196777.3, dated Mar. 20, 2017, 6 pages.
Extended European Search Report for Application No. EP110826042, dated Jan. 24, 2014, 6 pages.
Extended European Search Report for Application No. EP11876128, dated Jun. 21, 2016, 8 pages.
Extended European Search Report for Application No. EP12763717, dated Sep. 24, 2014, 5 pages.
Extended European Search Report for Application No. EP12764627, dated Jul. 10, 2014, 5 pages.
Extended European Search Report for Application No. EP12764838, dated Jul. 10, 2014, 5 pages.
Final Office Action from U.S. Appl. No. 12/296,919, dated Jun. 14, 2011, 7 pages.
Final Office Action from U.S. Appl. No. 12/296,919, dated Oct. 22, 2010, 7 pages.
Final Office Action from U.S. Appl. No. 12/514,303, dated Jan. 24, 2013, 11 pages.
Final Office Action from U.S. Appl. No. 13/428,438, dated Dec. 24, 2014, 17 pages.
Final Office Action from U.S. Appl. No. 13/428,440, dated Dec. 24, 2014, 19 pages.
Final Office Action from U.S. Appl. No. 13/428,452, dated Dec. 24, 2014, 20 pages.
Non-Final Office Action from U.S. Appl. No. 14/214,280, dated Jun. 16, 2016, 12 pages.
Non-Final Office Action from U.S. Appl. No. 14/214,280, dated Sep. 18, 2015, 18 pages.
Non-Final Office Action from U.S. Appl. No. 14/215,633, dated Oct. 22, 2015, 18 pages.
Non-final Office Action from U.S. Appl. No. 14/216,493, dated Apr. 4, 2016, 26 pages.
Non-Final Office Action from U.S. Appl. No. 14/216,493, dated Mar. 29, 2017, 18 pages.
Non-Final Office Action from U.S. Appl. No. 14/360,282, dated Oct. 21, 2016, 13 pages.
Non-final Office Action from U.S. Appl. No. 14/360,284, dated Oct. 21, 2016, 32 pages.
Non-final Office Action from U.S. Appl. No. 15/257,593, dated Apr. 7, 2017, 37 pages.
Notice of Allowance from foreign counterpart Chinese Patent Application No. 200780046679, dated Feb. 6, 2017, 8 pages.
Notice of Allowance from foreign counterpart Korean Patent Application No. 20137027841, dated Mar. 31, 2016, 2 pages.
Notice of Allowance from U.S. Appl. No. 12/296,919, dated Jul. 27, 2012, 6 pages.
Notice of Allowance from U.S. Appl. No. 12/514,303, dated Oct. 25, 2013, 12 pages.
Notice of Allowance from U.S. Appl. No. 13/428,438, dated Aug. 10, 2016, 9 pages.
Notice of Allowance from U.S. Appl. No. 13/428,438, dated Dec. 29, 2016, 9 pages.
Notice of Allowance from U.S. Appl. No. 13/428,438, dated Mar. 4, 2016, 14 pages.
Notice of Allowance from U.S. Appl. No. 13/428,438, dated Nov. 6, 2015, 9 pages.
Notice of Allowance from U.S. Appl. No. 13/428,440, dated Feb. 26, 2016, 10 pages.
Notice of Allowance from U.S. Appl. No. 13/428,440, dated Mar. 10, 2017, 52 pages.
Notice of Allowance from U.S. Appl. No. 13/428,440, dated Nov. 16, 2016, 9 pages.
Notice of Allowance from U.S. Appl. No. 13/428,440, dated Nov. 20, 2015, 9 pages.
Notice of Allowance from U.S. Appl. No. 13/428,452, dated Oct. 21, 2015, 9 pages.
Notice of Allowance from U.S. Appl. No. 13/475,708, dated Mar. 17, 2017, 55 pages.
Notice of Allowance from U.S. Appl. No. 13/475,708, dated Oct. 13, 2016, 17 pages.
Notice of Allowance from U.S. Appl. No. 13/475,739, dated Aug. 3, 2016, 11 pages.
Notice of Allowance from U.S. Appl. No. 13/475,739, dated Mar. 25, 2016, 25 pages.
Notice of Allowance from U.S. Appl. No. 13/691,609, dated Aug. 6, 2014, 11 pages.
Notice of Allowance from U.S. Appl. No. 13/691,609, dated Feb. 23, 2015, 16 pages.
Notice of Allowance from U.S. Appl. No. 14/194,589, dated Jul. 27, 2016, 7 pages.
Notice of Allowance from U.S. Appl. No. 14/213,115, dated Jun. 27, 2016, 9 pages.
Notice of Allowance from U.S. Appl. No. 14/213,115, dated Oct. 3, 2016, 20 pages.
Notice of Allowance from U.S. Appl. No. 14/213,692, dated Dec. 23, 2016, 19 pages.
Notice of Allowance from U.S. Appl. No. 14/213,854, dated Oct. 7, 2016, 19 pages.
Notice of Allowance from U.S. Appl. No. 14/215,633, dated Mar. 23, 2017, 17 pages.

(56) References Cited

OTHER PUBLICATIONS

Notice of Allowance from U.S. Appl. No. 14/215,633, dated May 23, 2016, 9 pages.
Notice of Allowance from U.S. Appl. No. 14/215,633, dated Sep. 29, 2016, 13 pages.
Notification of Reason for Refusal from Foreign Counterpart Korean Patent Application No. 10-2013-7027842, dated Sep. 18, 2015, 7 pages.
Notification of Reason for Refusal from foreign counterpart Korean Patent Application No. 20137027841, dated Sep. 18, 2015, 10 pages.
Notification of Reason for Refusal from foreign counterpart Korean Patent Application No. 20137033565, dated Sep. 30, 2015, 6 pages.
Notification of Reason for Refusal from foreign counterpart Korean Patent Application No. 20137033566, dated Sep. 30, 2015, 9 pages.
Notification of Reason for Refusal from foreign counterpart Korean Patent Application No. KR1020137027843, dated Sep. 30, 2015, 8 pages.
Notification of Reason for Refusal from Korean Application No. 10-2014-7016763, dated Apr. 29, 2016, 11 pages.
Notification of Reason for Refusal from Korean Application No. 10-2015-7028745, dated May 23, 2016, 8 pages.
Notification to Grant Patent Right for Invention from foreign counterpart China Patent Application No. CN201280034725, dated Aug. 12, 2016, 3 pages.
Notification to Grant Patent Right for Invention from foreign counterpart China Patent Application No. CN201310589048, dated May 5, 2016, 3 pages.
Nuth et al., "The Named-State Register File: Implementation and Performance," High-Performance Computer Architecture, First IEEE Symposium, 1995, 10 pages.
Office Action from foreign counterpart Chinese Patent Application No. 200780046679, dated May 21, 2013, 14 pages.
Office Action from foreign counterpart Chinese patent application No. 201280024012, dated Feb. 3, 2017, 20 pages.
Office Action from foreign counterpart Chinese patent application No. 201280024095, dated Feb. 4, 2017, 31 pages.
Office Action from foreign counterpart European Patent Application No. EP12764838, dated Oct. 4, 2016, 4 pages.
Office Action from foreign counterpart Taiwan Patent Application No. 20140109479 dated Nov. 28, 2016, 7 pages.
Abandonment from U.S. Appl. No. 14/212,203, mailed Jul. 26, 2018, 2 pages.
Abandonment from U.S. Appl. No. 14/212,533, mailed Jun. 19, 2018, 3 pages.
Abandonment from U.S. Appl. No. 14/360,282, mailed May 25, 2018, 2 pages.
Abandonment from U.S. Appl. No. 15/354,857, mailed Jul. 30, 2018, 2 pages.
Corrected Notice of Allowance from U.S. Appl. No. 15/219,063, dated Jun. 28, 2018, 8 pages.
Final Office Action from U.S. Appl. No. 14/360,280, dated Jul. 24, 2018, 24 pages.
Non-Final Office Action from U.S. Appl. No. 15/712,017, dated May 7, 2018, 127 pages.
Notice of Allowance from U.S. Appl. No. 13/824,013, dated Jul. 23, 2018, 15 pages.
Notice of Allowance from U.S. Appl. No. 14/216,493, dated Aug. 1, 2018, 14 pages.
Notice of Allowance from U.S. Appl. No. 15/408,255, dated Jul. 25, 2018, 136 pages.
Notice of Preliminary Rejection from foreign counterpart Korean Patent Application No. 10-2018-7003058, dated Jun. 4, 2018, 10 pages.
Final Office Action from U.S. Appl. No. 14/360,282, dated Oct. 4, 2017, 22 pages.
Final Office Action from U.S. Appl. No. 15/219,063, dated Nov. 20, 2017, 27 pages.
Notice of Allowance from foreign counterpart Korean Patent Application No. 10-2016-7017150, dated Oct. 30, 2017, 3 pages.
Notice of Allowance from U.S. Appl. No. 14/213,692, dated Sep. 28, 2017, 112 pages.
Notice of Allowance from U.S. Appl. No. 14/214,045, dated Oct. 6, 2017, 137 pages.
Notice of Allowance from U.S. Appl. No. 14/214,176, dated Oct. 19, 2017, 25 pages.
Notice of Allowance from U.S. Appl. No. 14/215,633, dated Oct. 4, 2017, 15 pages.
Notice of Allowance from U.S. Appl. No. 14/733,827, dated Sep. 22, 2017, 30 pages.
Notice of Allowance from U.S. Appl. No. 15/257,593, dated Oct. 11, 2017, 95 pages.
Notice on Grant of Patent Right for Invention from foreign counterpart Chinese Patent Application No. 201280024095.X, dated Nov. 7, 2017, 6 pages.
Third Office Action from foreign counterpart Chinese Patent Application No. 201280024012.7, dated Nov. 6, 2017, 8 pages.
Extended European Search Report for Application No. 14769411.1, dated Apr. 5, 2017, 8 pages.
Final Office Action from U.S. Appl. No. 14/213,730, dated May 11, 2016, 14 pages.
Final Office Action from U.S. Appl. No. 14/216,859, dated Jun. 9, 2016, 16 pages.
First Office Action from foreign counterpart China Patent Application No. 201280024012.7, dated May 30, 2016, 21 pages.
International Preliminary Report on Patentability for Application No. PCT/US2014/024677, dated Sep. 24, 2015, 7 pages.
International Preliminary Report on Patentability for Application No. PCT/US2014/024828, dated Sep. 24, 2015, 8 pages.
International Search Report and Written Opinion for Application No. PCT/US2014/024677, dated Jun. 30, 2014, 9 pages.
International Search Report and Written Opinion for Application No. PCT/US2014/024828, dated Jul. 28, 2014, 9 pages.
Non-Final Office Action from U.S. Appl. No. 14/212,533, dated Apr. 20, 2017, 116 pages.
Non-Final Office Action from U.S. Appl. No. 14/213,730, dated Jan. 7, 2016, 27 pages.
Non-Final Office Action from U.S. Appl. No. 14/216,859, dated Jan. 28, 2016, 33 pages.
Notice of Allowance from U.S. Appl. No. 13/428,438, dated Apr. 13, 2017, 62 pages.
Notice of Allowance from U.S. Appl. No. 13/428,440, dated Apr. 20, 2017, 46 pages.
Notice of Allowance from U.S. Appl. No. 14/213,730, dated Oct. 27, 2016, 16 pages.
Notice of Allowance from U.S. Appl. No. 14/214,045, dated Apr. 18, 2017, 88 pages.
Notice of Allowance from U.S. Appl. No. 14/216,859, dated Jan. 24, 2017, 17 pages.
Notification of Reason for Refusal from foreign counterpart Korean Patent Application No. KR1020157029107, dated Oct. 13, 2016, 11 pages.
Partial Supplementary European Search Report for Application No. EP14770976.0, dated Mar. 24, 2017, 7 pages.
Advisory Action from U.S. Appl. No. 14/360,282, dated Jan. 23, 2018, 2 pages.
Corrected Notice of Allowance from U.S. Appl. No. 13/475,708, dated Feb. 14, 2018, 27 pages.
Corrected Notice of Allowance from U.S. Appl. No. 13/475,708, dated Feb. 26, 2018, 31 pages.
Corrected Notice of Allowance from U.S. Appl. No. 15/357,943, dated Feb. 13, 2018, 4 pages.
Final Office Action from U.S. Appl. No. 15/082,359, dated Jan. 31, 2018, 22 pages.
First Office Action and Search Report from foreign counterpart Chinese Patent Application No. 201480024528.0, dated Jan. 26, 2018, 19 pages.
Non-Final Office Action from U.S. Appl. No. 13/824,013, dated Feb. 7, 2018, 141 pages.
Notice of Allowance from U.S. Appl. No. 15/357,943, dated Jan. 16, 2018, 16 pages.
Partial SupplementaryEuropean Search Report for Application No. 14769450.9, dated Oct. 11, 2016, 8 pages.

(56) References Cited

OTHER PUBLICATIONS

Restriction Requirement from U.S. Appl. No. 12/296,919, dated Feb. 8, 2011, 4 pages.
Restriction Requirement from U.S. Appl. No. 12/514,303, dated Oct. 15, 2012, 4 pages.
Restriction Requirement from U.S. Appl. No. 14/360,282, dated Jul. 28, 2016, 4 pages.
Rixner et al., "Register Organization for Media Processing," IEEE, 2000.
Rotenberg E., et al.,"Trace Cache: a Low Latency Approach to High Bandwidth Instruction Fetching," Apr. 11, 1996, 48 pages.
Santos et al., "The 2D-VLIW Architecture," Mar. 2006, 13 pages.
Search Report for Chinese Application No. CN201280024012, dated May 19, 2016, 2 pages.
Second Office Action from foreign counterpart China Patent Application No. 201180076248.0, dated Oct. 20, 2016, 25 pages.
Second Office Action from foreign counterpart China Patent Application No. CN201280034725, dated Apr. 14, 2016, 8 pages.
Second Office Action from foreign counterpart China Patent Application No. CN201280034739, dated Jun. 23, 2016, 44 pages.
Second Office Action from foreign counterpart Chinese Patent Application No. 201280024054.0, dated Dec. 26, 2016, 11 pages.
Second Office Action with search report from foreign counterpart Chinese Patent Application No. 201180076244, dated Nov. 18, 2016, 21 pages (Translation available only for Office Action).
Summons to attend Oral Proceedings for European Application No. 070864410, mailed Apr. 3, 2013, 3 pages.
Third Office Action from foreign counterpart Chinese Patent Application No. 201280034739, dated Dec. 27, 2016, 18 pages.
Wallace S., et al.,"Multiple Branch and Block Prediction," Third International symposium on High-Performance Computer Architecture, IEEE, Feb. 1997, pp. 94-103.
Written Opinion for Application No. PCT/US2007/066536, dated Jul. 30, 2008, 5 pages.
Ye J., et al.,"A New Recovery Mechanism in Superscalar Microprocessors by Recovering Critical Misprediction,"IEICE Transactions on Fundamentals of Electronics, Communications and Computer Sciences, 2011, vol. E94-A (12), pp. 2639-2648.
Yeh T., et al.,"Increasing the Instruction Fetch Rate Via Multiple Branch Prediction and a Branch Address Cache," 7th International Conference on Supercomputing, ACM, 1993, pp. 67-76.
Advisory Action from U.S. Appl. No. 14/214,280, dated May 15, 2017, 3 pages.
Communication pursuant to Article 94(3) EPC for European Application No. 12788989.7, dated Jun. 22, 2017, 6 pages.
Decision to grant a patent from foreign counterpart Korean Patent Application No. 10-2014-7016774, dated Jul. 25, 2016, 2 pages.
Decision to Grant a Patent from foreign counterpart Korean Patent Application No. KR1020157029107, dated Apr. 25, 2017, 2 pages.
Extended European Search Report for Application No. 14770976.0, dated Jul. 3, 2017, 9 pages.
Extended European Search Report for Application No. EP11876130, dated Jun. 1, 2016, 7 pages.
Final Office Action from U.S. Appl. No. 14/213,135, dated Oct. 26, 2015, 20 pages.
Final Office Action from U.S. Appl. No. 14/216,493, dated May 22, 2017, 17 pages.
First Office Action and Search Report from foreign counterpart China Patent Application No. 201480024463.X, dated Apr. 1, 2017, 31 pages. (Translation available only for office action).
First Office Action and Search report from foreign counterpart Chinese Patent Application No. 201180076244.2, dated Mar. 22, 2016, 18 pages (Translation available only for Office Action).
First Office Action from foreign counterpart China Patent Application No. 201180076245.7, dated Mar. 21, 2016, 10 pages.
Intel "Programming on Intel® Platform," The edition team of Intel® Software College course book, Shanghai Jiao Tong University Press, published Jan. 31, 2011, pp. 175-180.
International Preliminary Report on Patentability for Application No. PCT/US2011/061940, dated Jun. 5, 2014, 6 pages.
International Search Report and Written Opinion for Application No. PCT/US2011/061940, dated Jul. 20, 2012, 8 pages.
Non-Final Office Action from U.S. Appl. No. 14/213,135, dated May 14, 2015, 23 pages.
Non-Final Office Action from U.S. Appl. No. 14/213,135, dated May 31, 2016, 14 pages.
Non-Final Office Action from U.S. Appl. No. 14/360,280, dated Feb. 23, 2017, 34 pages.
Non-Final Office Action from U.S. Appl. No. 14/360,282, dated Jun. 22, 2017, 97 pages.
Non-Final Office Action from U.S. Appl. No. 14/733,827, dated Apr. 28, 2017, 99 pages.
Non-Final Office Action from U.S. Appl. No. 15/219,063, dated May 30, 2017, 102 pages.
Notice of Allowance from U.S. Appl. No. 13/475,708, dated Jun. 16, 2017, 51 pages.
Notice of Allowance from U.S. Appl. No. 13/475,708, dated Jun. 30, 2017, 53 pages.
Notice of Allowance from U.S. Appl. No. 14/213,135, dated Oct. 17, 2016, 17 pages.
Notice of Allowance from U.S. Appl. No. 14/213,218, dated Jun. 16, 2017, 89 pages.
Notice of Allowance from U.S. Appl. No. 14/214,176, dated May 10, 2017, 88 pages.
Notice of Allowance from U.S. Appl. No. 14/214,280, dated Jun. 29, 2017, 86 pages.
Notice of Allowance from U.S. Appl. No. 14/215,633, dated Jun. 30, 2017, 83 pages.
Notice of Allowance from U.S. Appl. No. 14/360,284, dated Jun. 14, 2017, 100 pages.
Notice of Allowance from U.S. Appl. No. 15/019,920, dated Jul. 14, 2017, 100 pages.
Notice of Allowance from U.S. Appl. No. 15/082,867, dated Jul. 7, 2017, 98 pages.
Notice of Final Rejection from foreign counterpart Korean Patent Application No. 10-2015-7029262, dated May 23, 2017, 7 pages.
Notice of Preliminary Rejection from foreign counterpart Korean Patent Application No. 10-2016-7017150, dated Apr. 20, 2017, 5 pages.
Notification of Reason for Refusal from foreign counterpart Korean Patent Application No. 10-2014-7016774, dated Jan. 28, 2016, 4 pages.
Notification of Reason for Refusal from foreign counterpart Korean Patent Application No. 10-2015-7029262, dated Oct. 17, 2016, 12 pages.
Notification of Reason for Refusal from foreign counterpart Korean Patent Application No. 10-2017-7002379, dated May 26, 2017, 6 pages.
Notification of Reason for Refusal from foreign counterpart Korean Patent Application No. 10-2017-7002473, dated May 26, 2017, 7 pages.
Notification to Grant Patent Right for Invention from foreign counterpart China Patent Application No. 201180076245.7, dated Nov. 2, 2016, 3 pages.
Office Action and Search Report from foreign counterpart Taiwan Patent Application No. 101117854, dated Mar. 30, 2017, 7 pages.
Third Office Action and Search report from foreign counterpart China Patent Application No. 201180076248.0, dated May 2, 2017, 27 pages.
Third Office Action from foreign counterpart Chinese Patent Application No. 201180076244.2, dated May 2, 2017, 20 pages.
Sassone, et al.; Dynamic Strands: Collapsing Speculative Dependence Chains for Reducing Pipeline Communication; Microarchitecture, 2004. Micro-37 2004; 37th International Symposium O N Portland, OR, USA Dec. 4-8, 2004, Piscataway, NJ, USA, IEEE.
Shiliang Hu et al: "An Approach for Implementing Efficient Superscalar CISC Processors", High-Performance Computer Architecture, 2006. The Twelfth International Symposium on Austin, Texas Feb. 11-15, 2006, Piscataway, NJ, USA, IEEE, Feb. 11, 2006 (Feb. 11, 2006), pp. 40-51.
Communication pursuant to Article 94(3) EPC for Application No. 12174229.0, dated Dec. 20, 2018, 5 pages.

(56) References Cited

OTHER PUBLICATIONS

Communication pursuant to Article 94(3) EPC for Application No. 14769411.1, dated Dec. 7, 2018, 7 pages.
Communication pursuant to Article 94(3) EPC for Application No. 11876130.3, dated Jan. 15, 2019, 11 pages.
Communication pursuant to Article 94(3) EPC for Application No. 11876130.3, dated Oct. 29, 2018, 7 pages.
Communication pursuant to Article 94(3) EPC for Application No. 11876314.3, dated Oct. 19, 2018, 5 pages.
Communication pursuant to Article 94(3) EPC for Application No. 11876314.3, dated Sep. 24, 2018, 6 pages.
Non-Final Office Action from U.S. Appl. No. 15/354,742, dated Dec. 4, 2018, 54 pages.
Notice of Allowance from U.S. Appl. No. 15/853,323, dated Jan. 15, 2019, 15 pages.
Notice of Allowance from U.S. Appl. No. 15/862,496, dated Nov. 2, 2018, 23 pages.
Notice of Allowance from U.S. Appl. No. 13/824,013, dated Nov. 13, 2018, 12 pages.
Notice of Allowance from foreign counterpart Korean Patent Application No. 10-2018-7003058, dated Dec. 31, 2018, 3 pages.
Notice of Allowance from U.S. Appl. No. 15/706,056, dated Dec. 28, 2018, 138 pages.
Office Action and Search Report from foreign counterpart Taiwan Patent Application No. 106127331, dated Nov. 23, 2018, 13 pages.
Abandonment from U.S. Appl. No. 14/360,280, mailed Apr. 4, 2019, 2 pages.
Abandonment from U.S. Appl. No. 15/866,323, mailed Apr. 29, 2019, 2 pages.
Advisory Action from U.S. Appl. No. 15/408,323, dated May 20, 2019, 3 pages.
Allowance Decision of Examination from foreign counterpart Taiwan Patent Application No. 106127331, dated Apr. 9, 2019, 3 pages.
Communication pursuant to Article 94(3) EPC for European Application No. 14770976.0, dated Feb. 18, 2019, 4 pages.
Communication Pursuant to Article 94(3) EPC for Application No. 14769450.9, dated May 17, 2019, 12 pages.
Communication Pursuant to Article 94(3) EPC for European Application No. 16196777.3, dated Feb. 28, 2019, 5 pages.
Communication Pursuant to Article 94(3) EPC for European Application No. 12763717.1 dated Mar. 22, 2019, 7 pages.
Corrected Notice of Allowance from U.S. Appl. No. 15/354,742, dated Jun. 21, 2019, 38 pages.
Corrected Notice of Allowance from U.S. Appl. No. 15/354,742, dated May 22, 2019, 32 pages.
Final Office Action from U.S. Appl. No. 15/408,323, dated Feb. 28, 2019, 18 pages.
Non-Final Office Action from U.S. Appl. No. 16/166,010, dated Jul. 1, 2019, 97 pages.
Non-Final Office Action from U.S. Appl. No. 15/806,189, dated May 1, 2019, 145 pages.
Non-Final Office Action from U.S. Appl. No. 15/944,655, dated May 15, 2019, 135 pages.
Notice of Allowance from U.S. Appl. No. 15/354,742, dated Mar. 26, 2019, 24 pages.
Notice of Preliminary Rejection from foreign counterpart Korean Patent Application No. 10-2017-7003623, dated Mar. 29, 2019, 5 pages.
Notice of Reason for Refusal from foreign counterpart Korean Patent Application No. KR20177020829, dated May 20, 2019, 11 pages.
Requirement for Restriction/Election from U.S. Appl. No. 15/884,280, dated Jun. 17, 2019, 5 pages.
Second Office Action from foreign counterpart Chinese Patent Application No. 201480024832.5, dated Apr. 2, 2019, 10 pages.

* cited by examiner

MICROPROCESSOR ACCELERATED CODE OPTIMIZER

This application is a divisional of to U.S. application Ser. No. 14/360,282, which is the national stage of International Application No. PCT/US2011/061957 filed Nov. 22, 2011, which are hereby incorporated by reference.

This application is related to U.S. Publication No. 2010/0161948, titled, "PARALLEL PROCESSING OF A SEQUENTIAL PROGRAM USING HARDWARE GENERATED THREADS AND THEIR INSTRUCTION GROUPS EXECUTING ON PLURAL EXECUTION UNITS AND ACCESSING REGISTER FILE SEGMENTS USING DEPENDENCY INHERITANCE VECTORS ACROSS MULTIPLE ENGINES" (now U.S. Pat. No. 8,677,105 issued Mar. 18, 2014), which is the national stage of International Application No. PCT/US07/84710 filed Nov. 14, 2007, which are hereby incorporated by reference.

This application is related to U.S. Publication No. 2009/0113170, titled, "PLURAL MATRICES OF EXECUTION UNITS FOR PROCESSING MATRICES OF ROW DEPENDENT INSTRUCTIONS IN SINGLE CLOCK CYCLE IN SUPER OR SEPARATE MODE" (now U.S. Pat. No. 8,327,115 issued Dec. 4, 2012), which is the national stage of International Application No. PCT/US2007/066536 filed Apr. 12, 2007, which are hereby incorporated by reference.

This application is related to U.S. Provisional Application No. 61/384,198, titled, "SINGLE CYCLE MULTI-BRANCH PREDICTION INCLUDING SHADOW CACHE FOR EARLY FAR BRANCH PREDICTION," filed Sep. 17, 2010, which is hereby incorporated by reference.

This application is related to U.S. Provisional Application No. 61/467,944, titled, "EXECUTING INSTRUCTION SEQUENCE CODE BLOCKS BY USING VIRTUAL CORES INSTANTIATED BY PARTITIONABLE ENGINES," filed Mar. 25, 2011, which is hereby incorporated by reference.

FIELD OF THE INVENTION

The present invention is generally related to digital computer systems, more particularly, to a system and method for selecting instructions comprising an instruction sequence.

BACKGROUND OF THE INVENTION

Processors are required to handle multiple tasks that are either dependent or totally independent. The internal state of such processors usually consists of registers that might hold different values at each particular instant of program execution. At each instant of program execution, the internal state image is called the architecture state of the processor.

When code execution is switched to run another function (e.g., another thread, process or program), then the state of the machine/processor has to be saved so that the new function can utilize the internal registers to build its new state. Once the new function is terminated then its state can be discarded and the state of the previous context will be restored and execution resumes. Such a switch process is called a context switch and usually includes 10's or hundreds of cycles especially with modern architectures that employ large number of registers (e.g., 64, 128, 256) and/or out of order execution.

In thread-aware hardware architectures, it is normal for the hardware to support multiple context states for a limited number of hardware-supported threads. In this case, the hardware duplicates all architecture state elements for each supported thread. This eliminates the need for context switch when executing a new thread. However, this still has multiple draw backs, namely the area, power and complexity of duplicating all architecture state elements (i.e., registers) for each additional thread supported in hardware. In addition, if the number of software threads exceeds the number of explicitly supported hardware threads, then the context switch must still be performed.

This becomes common as parallelism is needed on a fine granularity basis requiring a large number of threads. The hardware thread-aware architectures with duplicate context-state hardware storage do not help non-threaded software code and only reduces the number of context switches for software that is threaded. However, those threads are usually constructed for coarse grain parallelism, and result in heavy software overhead for initiating and synchronizing, leaving fine grain parallelism, such as function calls and loops parallel execution, without efficient threading initiations/auto generation. Such described overheads are accompanied with the difficulty of auto parallelization of such codes using state of the art compiler or user parallelization techniques for non-explicitly/easily parallelized/threaded software codes.

SUMMARY OF THE INVENTION

In one embodiment the present invention is implemented as a method for accelerating code optimization in a microprocessor. The method includes fetching an incoming macroinstruction sequence using an instruction fetch component and transferring the fetched macroinstructions to a decoding component for decoding into microinstructions. Optimization processing is performed by reordering the microinstruction sequence into an optimized microinstruction sequence comprising a plurality of dependent code groups. The optimized microinstruction sequence is output to a microprocessor pipeline for execution. A copy of the optimized microinstruction sequence is stored into a sequence cache for subsequent use upon a subsequent hit to the optimized microinstruction sequence.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1:
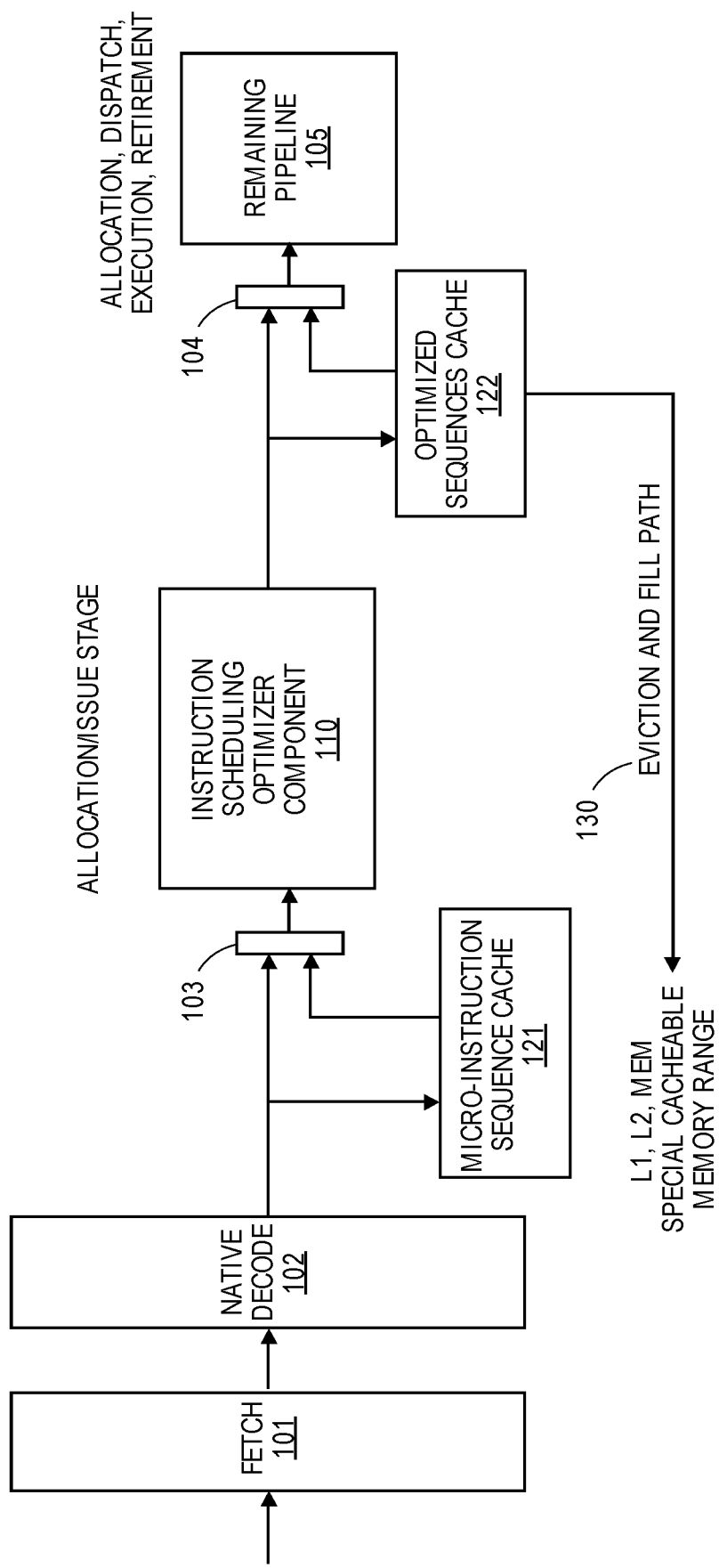
FIG. 1 shows an overview diagram of an allocation/issue stage of a microprocessor in accordance with one embodiment of the present invention.

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals of a computer readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "writing" or "storing" or "replicating" or the like, refer to the action and processes of a computer system, or similar electronic computing device that manipulates and transforms data represented as physical (electronic) quantities within the computer system's registers and memories and other computer readable media into other data similarly represented as physical quantities within the computer system memories or registers or other such information storage, transmission or display devices.

In one embodiment the present invention is implemented as a method for accelerating code optimization in a microprocessor. The method includes fetching an incoming microinstruction sequence using an instruction fetch component and transferring the fetched macroinstructions to a decoding component for decoding into microinstructions. Optimization processing is performed by reordering the microinstruction sequence into an optimized microinstruction sequence comprising a plurality of dependent code groups. The optimized microinstruction sequence is output to a microprocessor pipeline for execution. A copy of the optimized microinstruction sequence is stored into a sequence cache for subsequent use upon a subsequent hit to the optimized microinstruction sequence.

FIG. 1 shows an overview diagram of an allocation/issue stage of a microprocessor 100 in accordance with one embodiment of the present invention. As illustrated in FIG. 1, the microprocessor 100 includes a fetch component 101, a native decode component 102, and instruction scheduling and optimizing component 110 and the remaining pipeline 105 of the microprocessor.

In the FIG. 1 embodiment, macroinstructions are fetched by a fetch component 101 and decoded into native microinstructions by the native decode component 102, which then provides the microinstructions to a microinstruction cache 121 and the instruction scheduling and optimizer component 110. In one embodiment, the fetched macroinstructions comprise a sequence of instructions that is assembled by predicting certain branches.

The macroinstruction sequence is decoded into a resulting microinstruction sequence by the native decode component 102. This microinstruction sequence is then transmitted to the instruction scheduling and optimizing component 110 through a multiplexer 103. The instruction scheduling and optimizer component functions by performing optimization processing by, for example, reordering certain instructions of the microinstruction sequence for more efficient execution. This results in an optimized microinstruction sequence that is then transferred to the remaining pipeline 105 (e.g., the allocation, dispatch, execution, and retirement stages, etc.) through the multiplexer 104. The optimized microinstruction sequence results in a faster and more efficient execution of the instructions.

In one embodiment, the macroinstructions can be instructions from a high level instruction set architecture, while the microinstructions are low level machine instructions. In another embodiment, the macroinstructions can be guest instructions from a plurality of different instruction set architectures (e.g., CISC like, x86, RISC like, MIPS, SPARC, ARM, virtual like, JAVA, and the like), while the microinstructions are low level machine instructions or instructions of a different native instruction set architecture. Similarly, in one embodiment, the macroinstructions can be native instructions of an architecture, and the microinstructions can be native microinstructions of that same architecture that have been reordered and optimized. For example X86 macro instructions and X86 micro-coded microinstructions.

In one embodiment, to accelerate the execution performance of code that is frequently encountered (e.g., hot code), copies of frequently encountered microinstruction sequences are cached in the microinstruction cache 121 and copies of frequently encountered optimized microinstruction sequences are cached within the sequence cache 122. As code is fetched, decoded, optimized, and executed, certain optimized microinstruction sequences can be evicted or fetched in accordance with the size of the sequence cache through the depicted eviction and fill path 130. This eviction and fill path allows for transfers of optimized microinstruction sequences to and from the memory hierarchy of the microprocessor (e.g., L1 cache, L2 cache, a special cacheable memory range, or the like).

It should be noted that in one embodiment, the microinstruction cache 121 can be omitted. In such an embodiment, the acceleration of hot code is provided by the storing of optimized microinstruction sequences within the sequence cache 122. For example, the space saved by omitting microinstruction cache 121 can be used to implement a larger sequence cache 122, for example.

Figure 2:
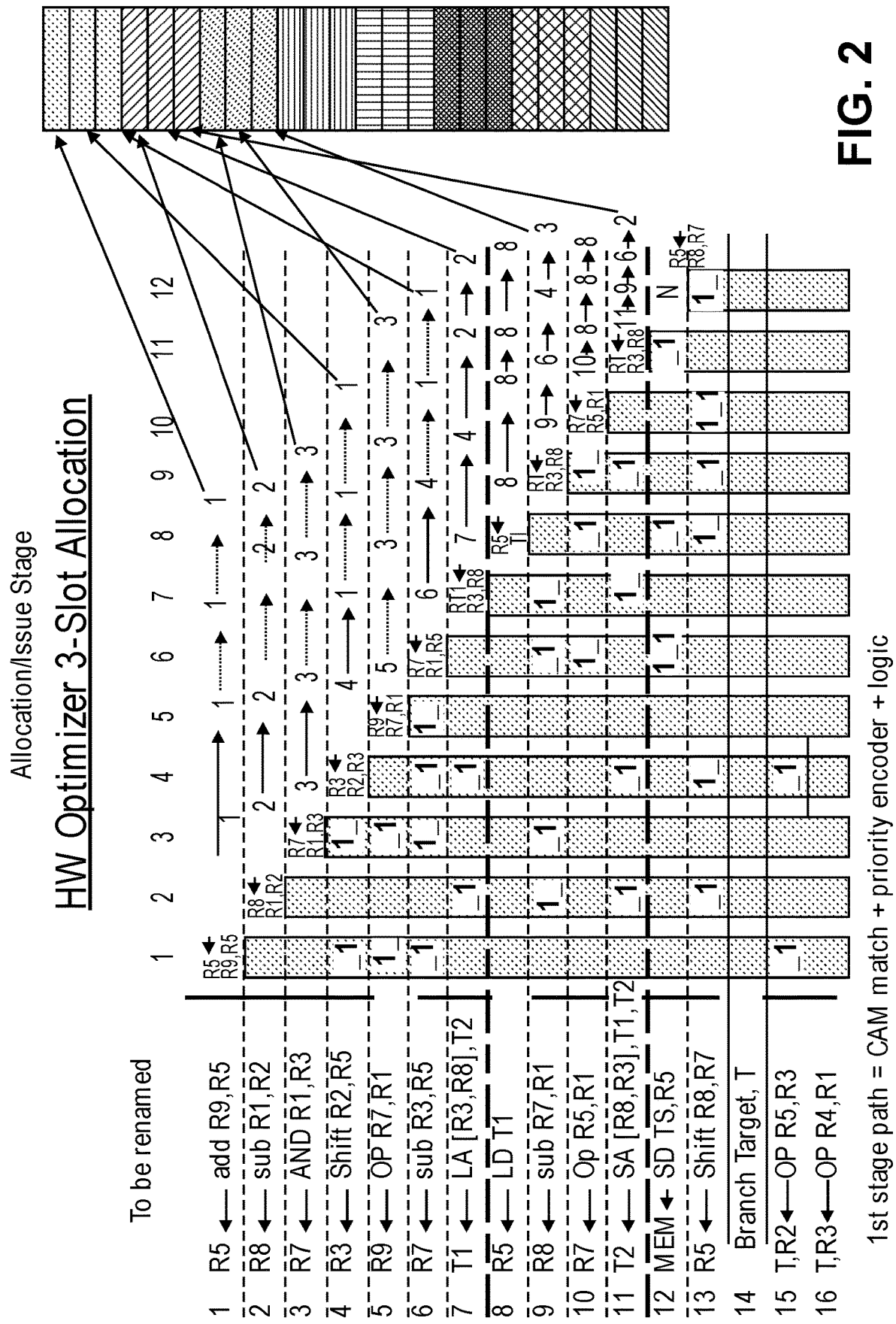
FIG. 2 shows an overview diagram illustrating an optimization process in accordance with one embodiment of the present invention.

FIG. 2 shows an overview diagram illustrating an optimization process in accordance with one embodiment of the present invention. The left-hand side of FIG. 2 shows an incoming microinstruction sequence as received from, for example, the native decode component 102 or the microinstruction cache 121. Upon first receiving these instructions, they are not optimized.

One objective of the optimization process is to locate and identify instructions that depend upon one another and move them into their respective dependency groups so that they can execute more efficiently. In one embodiment, groups of dependent instructions can be dispatched together so that they can execute more efficiently since their respective sources and destinations are grouped together for locality. It should be noted that this optimization processing can be used in both an out of order processor as well as an in order processor. For example, within an in order processor, instructions are dispatched in-order. However, they can be moved around so that dependent instructions are placed in respective groups so that groups can then execute independently, as described above.

For example, the incoming instructions include loads, operations and stores. For example, instruction 1 comprises an operation where source registers (e.g., register 9 and register 9) are added and the result stored in register 5. Hence, register 5 is a destination and register 9 and register 5 are sources. In this manner, the sequence of 16 instructions includes destination registers and source registers, as shown.

The FIG. 2 embodiment implements the reordering of instructions to create dependency groups where instructions that belong to a group are dependent upon one another. To accomplish this, an algorithm is executed that performs hazard checks with respect to the loads and stores of the 16 incoming instructions. For example, stores cannot move past earlier loads without dependency checks. Stores cannot pass earlier stores. Loads cannot pass earlier stores without dependency checks. Loads can pass loads. Instructions can pass prior path predicted branches (e.g., dynamically constructed branches) by using a renaming technique. In the case of non-dynamically predicted branches, movements of instructions need to consider the scopes of the branches. Each of the above rules can be implemented by adding virtual dependency (e.g., by artificially adding virtual sources or destinations to instructions to enforce the rules).

Referring still to FIG. 2, as described above, an objective of the optimization process is to locate dependent instructions and move them into a common dependency group. This process must be done in accordance with the hazard checking algorithm. The optimization algorithm is looking for instruction dependencies. The instruction dependencies further comprise true dependencies, output dependencies and anti-dependencies.

The algorithm begins by looking for true dependencies first. To identify true dependencies, each destination of the 16 instruction sequence is compared against other subsequent sources which occur later in the 16 instruction sequence. The subsequent instructions that are truly dependent on an earlier instruction are marked "_1" to signify their true dependence. This is shown in FIG. 2 by the instruction numbers that proceed from left to right over the 16 instruction sequence. For example, considering instruction number 4, the destination register R3 is compared against the subsequent instructions'sources, and each subsequent source is marked "_1" to indicate that instruction's true dependence. In this case, instruction 6, instruction 7, instruction 11, and instruction 15 are marked "_1".

The algorithm then looks for output dependencies. To identify output dependencies, each destination is compared against other subsequent instructions' destinations. And for each of the 16 instructions, each subsequent destination that matches is marked "1_" (e.g., sometimes referred to as a red one).

The algorithm then looks for anti-dependencies. To identify anti-dependencies, for each of the 16 instructions, each source is compared with earlier instructions'sources to identify matches. If a match occurs, the instruction under consideration marks its self "1_" (e.g., sometimes referred to as a red one).

In this manner, the algorithm populates a dependency matrix of rows and columns for the sequence of 16 instructions. The dependency matrix comprises the marks that indicate the different types of dependencies for each of the 16 instructions. In one embodiment, the dependency matrix is populated in one cycle by using CAM matching hardware and the appropriate broadcasting logic. For example, destinations are broadcasted downward through the remaining instructions to be compared with subsequent instructions'sources (e.g., true dependence) and subsequent instructions' destinations (e.g., output dependence), while destinations can be broadcasted upward through the previous instructions to be compared with prior instructions'sources (e.g., anti dependence).

The optimization algorithm uses the dependency matrix to choose which instructions to move together into common dependency groups. It is desired that instructions which are truly dependent upon one another be moved to the same group. Register renaming is used to eliminate anti-dependencies to allow those anti-dependent instructions to be moved. The moving is done in accordance with the above described rules and hazard checks. For example, stores cannot move past earlier loads without dependency checks. Stores cannot past earlier stores. Loads cannot pass earlier stores without dependency checks. Loads can pass loads. Instructions can pass prior path predicted branches (e.g., dynamic the constructed branches) by using a renaming technique. In the case of non-dynamically predicted branches, movements of instructions need to consider the scopes of the branches.

In one embodiment, a priority encoder can be implemented to determine which instructions get moved to be grouped with other instructions. The priority encoder would function in accordance with the information provided by the dependency matrix.

Figure 3:
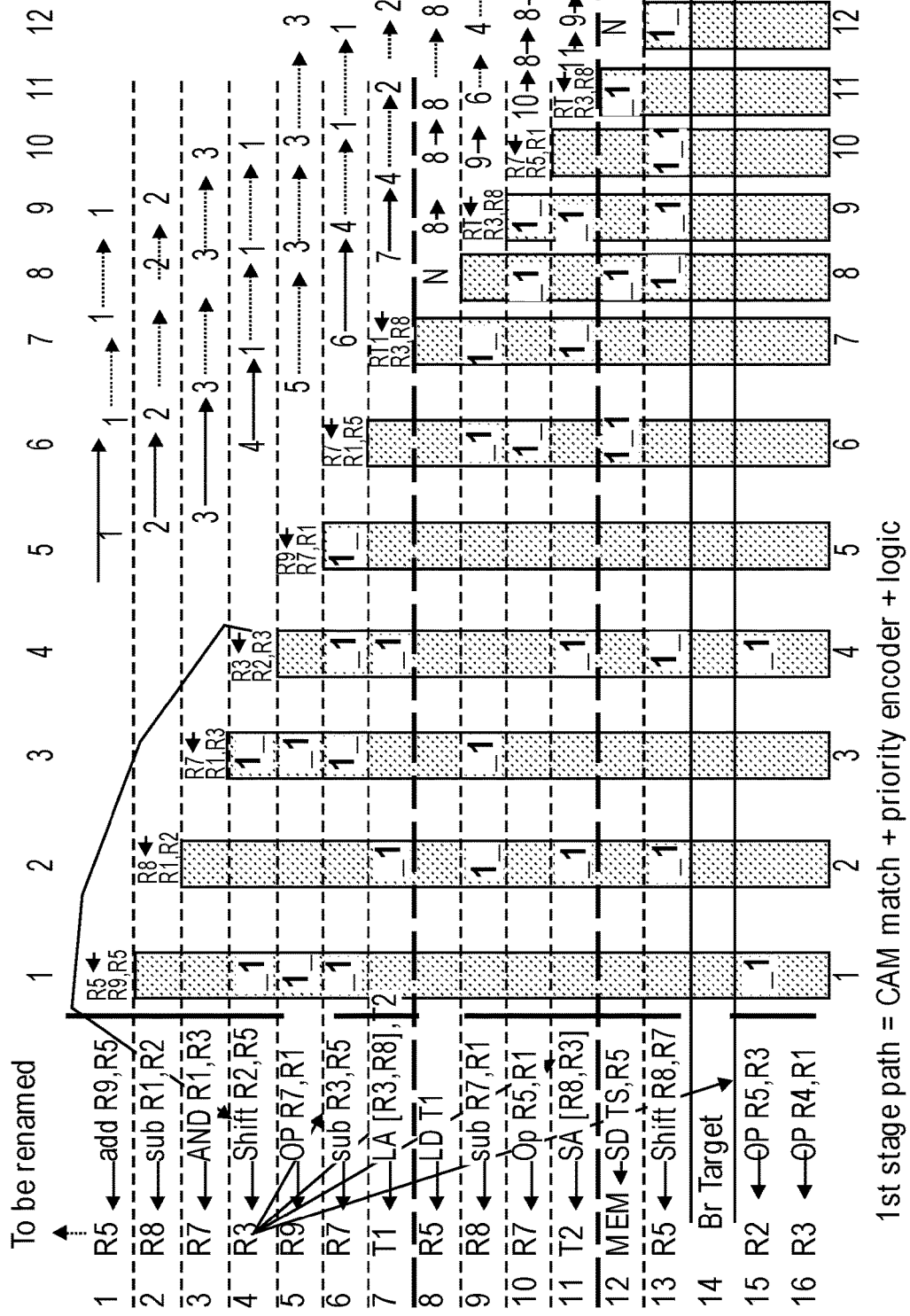
FIG. 3 shows a multistep optimization process in accordance with one embodiment of the present invention.
Figure 4:
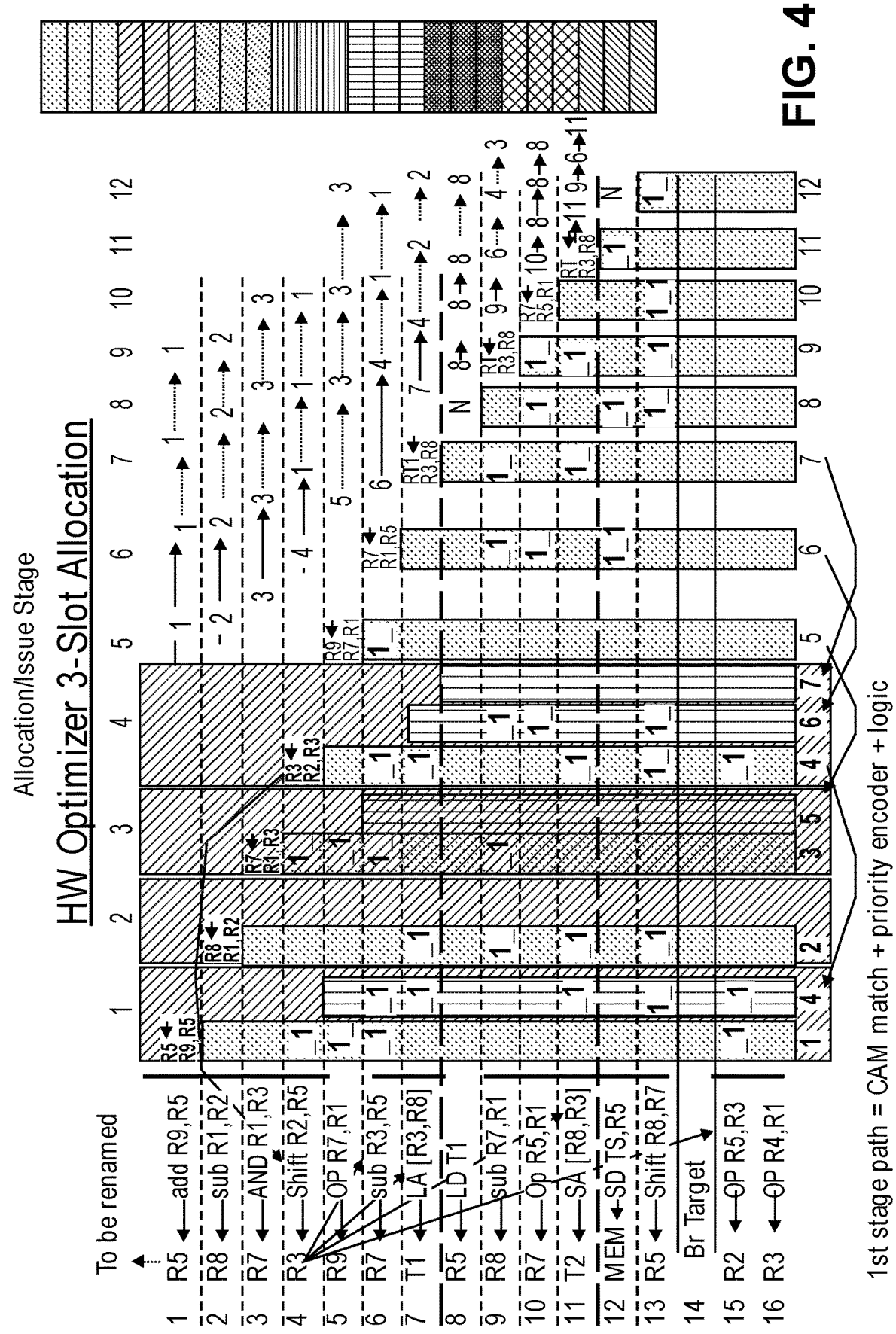
FIG. 4 shows a multistep optimization and instruction moving process in accordance with one embodiment of the present invention.

FIG. 3 and FIG. 4 show a multistep optimization process in accordance with one embodiment of the present invention. In one embodiment, the optimization process is iterative, in that after instructions are moved in a first pass by moving their dependency column, the dependency matrix is repopulated and examined again for new opportunities to move instructions. In one embodiment, this dependency matrix population process is repeated three times. This is shown in FIG. 4, which show instructions that have been moved and then examined again looking for opportunities to move other instructions. The sequence of numbers on the right hand side of each of the 16 instructions shows the group that the instruction was in that it began the process with and the group that the instruction was in at the finish of the process, with the intervening group numbers in between. For example, FIG. 4 shows how instruction 6 was initially in group 4 but was moved to be in group 1.

In this manner, FIGS. 2 through 4 illustrate the operation of an optimization algorithm in accordance with one embodiment of the present invention. It should be noted that although FIGS. 2 through 4 illustrate an allocation/issue stage, this functionality can also be implemented in a local scheduler/dispatch stage.

Figure 5:
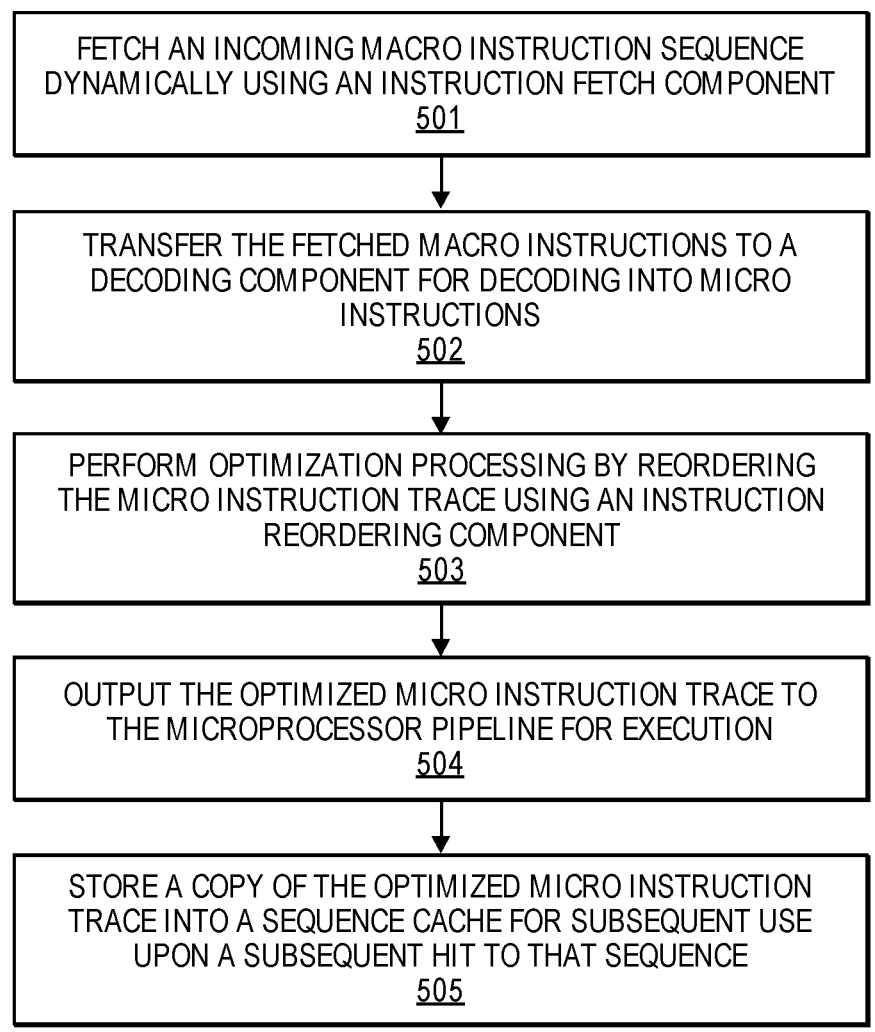
FIG. 5 shows a flowchart of the steps of an exemplary hardware optimization process in accordance with one embodiment of the present invention.

FIG. 5 shows a flowchart of the steps of an exemplary hardware optimization process 500 in accordance with one embodiment of the present invention. As depicted in FIG. 5, the flowchart shows the operating steps of a optimization process as implemented in an allocation/issue stage of a microprocessor in accordance with one embodiment of the present invention.

Process 500 begins in step 501, where an incoming macroinstruction sequence is fetched using an instruction fetch component (e.g., fetch component 20 from FIG. 1). As described above, the fetched instructions comprise a sequence that is assembled by predicting certain instruction branches.

In step 502, the fetched macroinstructions are transferred to a decoding component for decoding into microinstructions. The macroinstruction sequence is decoded into a microinstruction sequence in accordance with the branch predictions. In one embodiment, the microinstruction sequence is then stored into a microinstruction cache.

In step 503, optimization processing is then conducted on the microinstruction sequence by reordering the microinstructions comprising sequence into dependency groups. The reordering is implemented by an instruction reordering component (e.g., the instruction scheduling and optimizer component 110). This process is described in the FIGS. 2 through 4.

In step 504, the optimized microinstruction sequence is an output to the microprocessor pipeline for execution. As described above, the optimized microinstruction sequence is forwarded to the rest of the machine for execution (e.g., remaining pipeline 105).

And subsequently, in step 505, a copy of the optimized microinstruction sequence is stored into a sequence cache for subsequent use upon a subsequent hit to that sequence. In this manner, the sequence cache enables access to the optimized microinstruction sequences upon subsequent hits on those sequences, thereby accelerating hot code.

Figure 6:
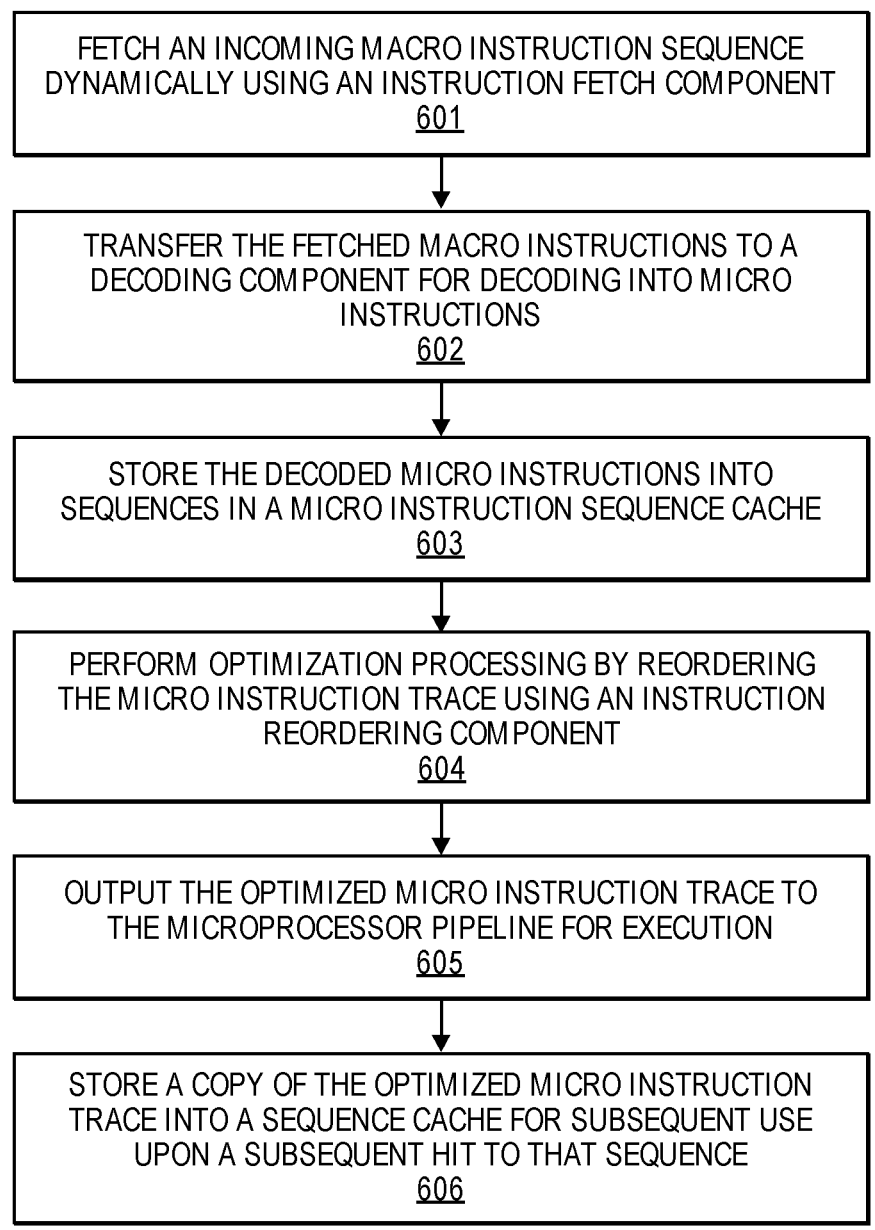
FIG. 6 shows a flowchart of the steps of an alternative exemplary hardware optimization process in accordance with one embodiment of the present invention.

FIG. 6 shows a flowchart of the steps of an alternative exemplary hardware optimization process 600 in accordance with one embodiment of the present invention. As depicted in FIG. 6, the flowchart shows the operating steps of a optimization process as implemented in an allocation/issue stage of a microprocessor in accordance with an alternative embodiment of the present invention.

Process 600 begins in step 601, where an incoming macroinstruction sequence is fetched using an instruction fetch component (e.g., fetch component 20 from FIG. 1). As described above, the fetched instructions comprise a sequence that is assembled by predicting certain instruction branches.

In step 602, the fetched macroinstructions are transferred to a decoding component for decoding into microinstructions. The macroinstruction sequence is decoded into a microinstruction sequence in accordance with the branch predictions. In one embodiment, the microinstruction sequence is then stored into a microinstruction cache.

In step 603, the decoded micro instructions are stored into sequences in a micro instruction sequence cache. Sequences in the micro instruction cache are formed to start in accordance with basic block boundaries. These sequences are not optimized at this point.

In step 604, optimization processing is then conducted on the microinstruction sequence by reordering the microinstructions comprising sequence into dependency groups. The reordering is implemented by an instruction reordering component (e.g., the instruction scheduling and optimizer component 110). This process is described in the FIGS. 2 through 4.

In step 605, the optimized microinstruction sequence is an output to the microprocessor pipeline for execution. As described above, the optimized microinstruction sequence is forwarded to the rest of the machine for execution (e.g., remaining pipeline 105).

And subsequently, in step 606, a copy of the optimized microinstruction sequence is stored into a sequence cache for subsequent use upon a subsequent hit to that sequence. In this manner, the sequence cache enables access to the optimized microinstruction sequences upon subsequent hits on those sequences, thereby accelerating hot code.

Figure 7:
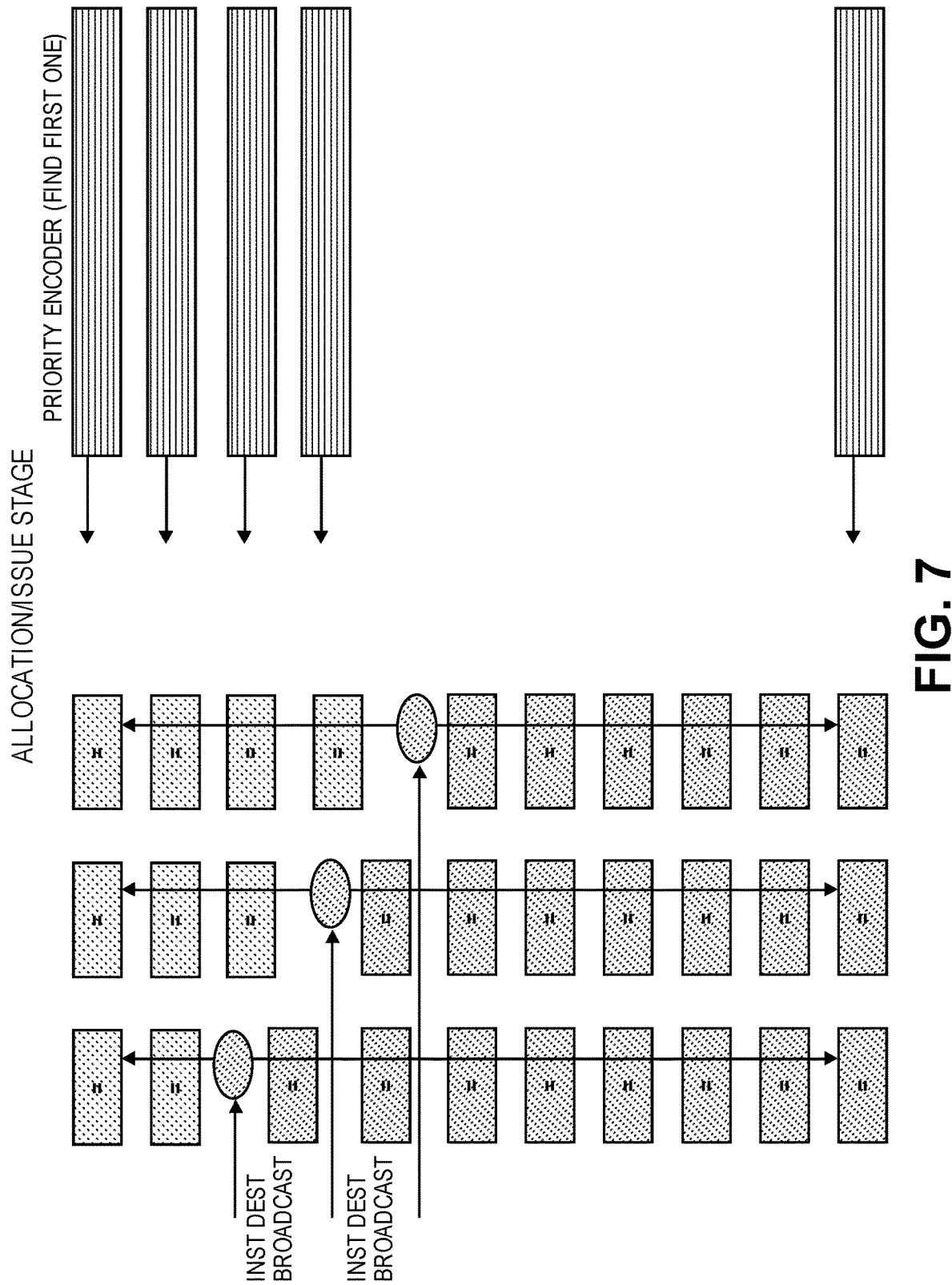
FIG. 7 shows a diagram showing the operation of the CAM matching hardware and the priority encoding hardware of the allocation/issue stage in accordance with one embodiment of the present invention.

FIG. 7 shows a diagram showing the operation of the CAM matching hardware and the priority encoding hardware of the allocation/issue stage in accordance with one embodiment of the present invention. As depicted in FIG. 7, destinations of the instructions are broadcast into the CAM array from the left. Three exemplary instruction destinations are shown. The lighter shaded CAMs (e.g. green) are for true dependency matches and output dependency matches, and thus the destinations are broadcast downward. The darker shaded CAMs (e.g. blue) anti-dependency matches, and thus the destinations are broadcast upward. These matches populate a dependency matrix, as described above. Priority encoders are shown on the right, and they function by scanning the row of CAMS to find the first match, either a "_1" or a "1_". As described above in the discussions of FIGS. 2-4, the process can be implemented to be iterative. For example, if a "_1" is blocked by a "1_", then that destination can be renamed and moved.

Figure 8:
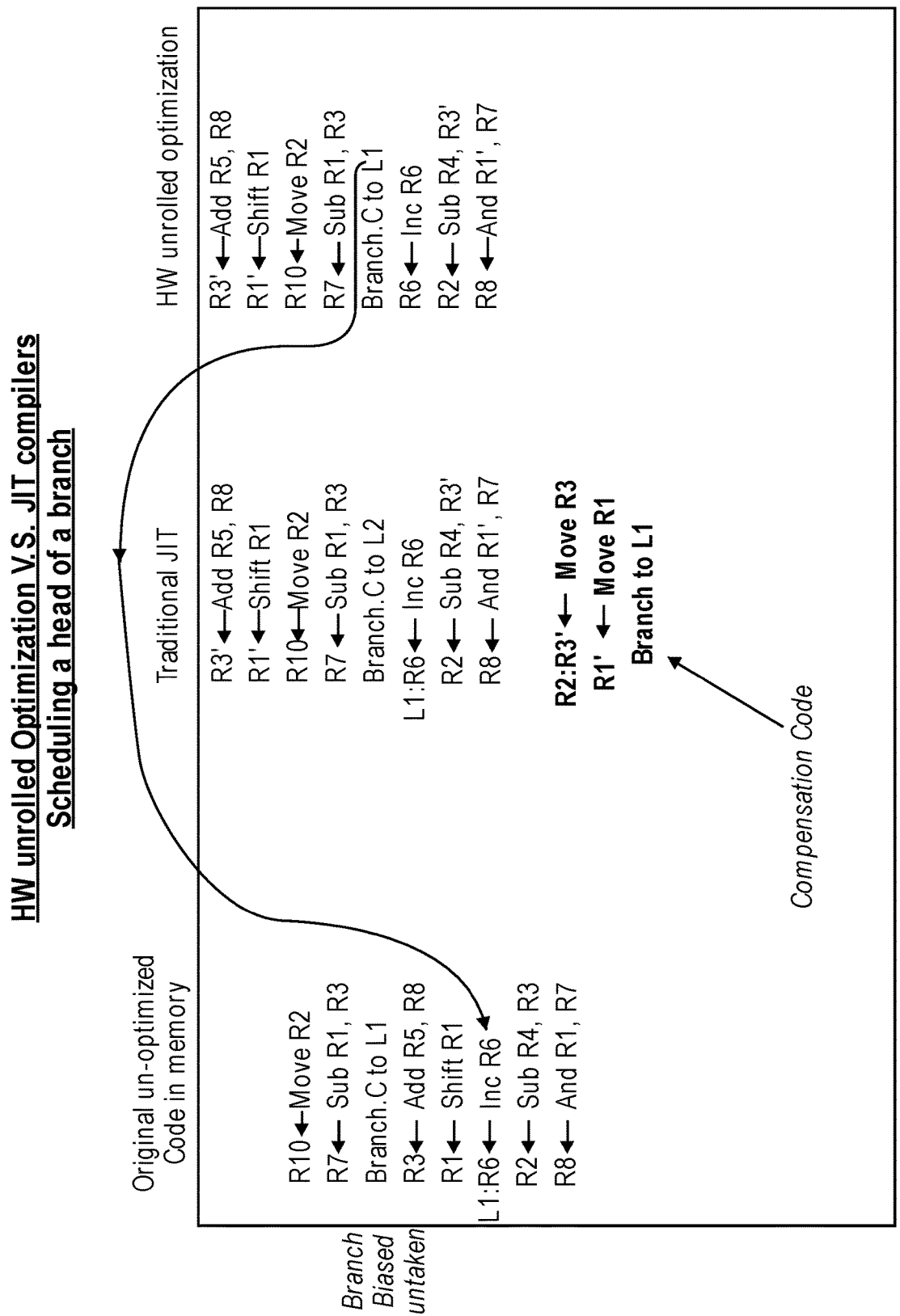
FIG. 8 shows a diagram illustrating optimized scheduling ahead of a branch in accordance with one embodiment of the present invention.

FIG. 8 shows a diagram illustrating optimized scheduling instructions ahead of a branch in accordance with one embodiment of the present invention. As illustrated in FIG. 8, a hardware optimized example is depicted alongside a traditional just-in-time compiler example. The left-hand side of FIG. 8 shows the original un-optimized code including the branch biased untaken, "Branch C to L1". The middle column of FIG. 8 shows a traditional just-in-time compiler optimization, where registers are renamed and instructions are moved ahead of the branch. In this example, the just-in-time compiler inserts compensation code to account for those occasions where the branch biased decision is wrong (e.g., where the branch is actually taken as opposed to untaken). In contrast, the right column of FIG. 8 shows the hardware unrolled optimization. In this case, the registers are renamed and instructions are moved ahead of the branch. However, it should be noted that no compensation code is inserted. The hardware keeps track of whether branch biased decision is true or not. In case of wrongly predicted branches, the hardware automatically rolls back it's state in order to execute the correct instruction sequence. The hardware optimizer solution is able to avoid the use of compensation code because in those cases where the branch is miss predicted, the hardware jumps to the original code in memory and executes the correct sequence from there, while flushing the miss predicted instruction sequence.

Figure 9:
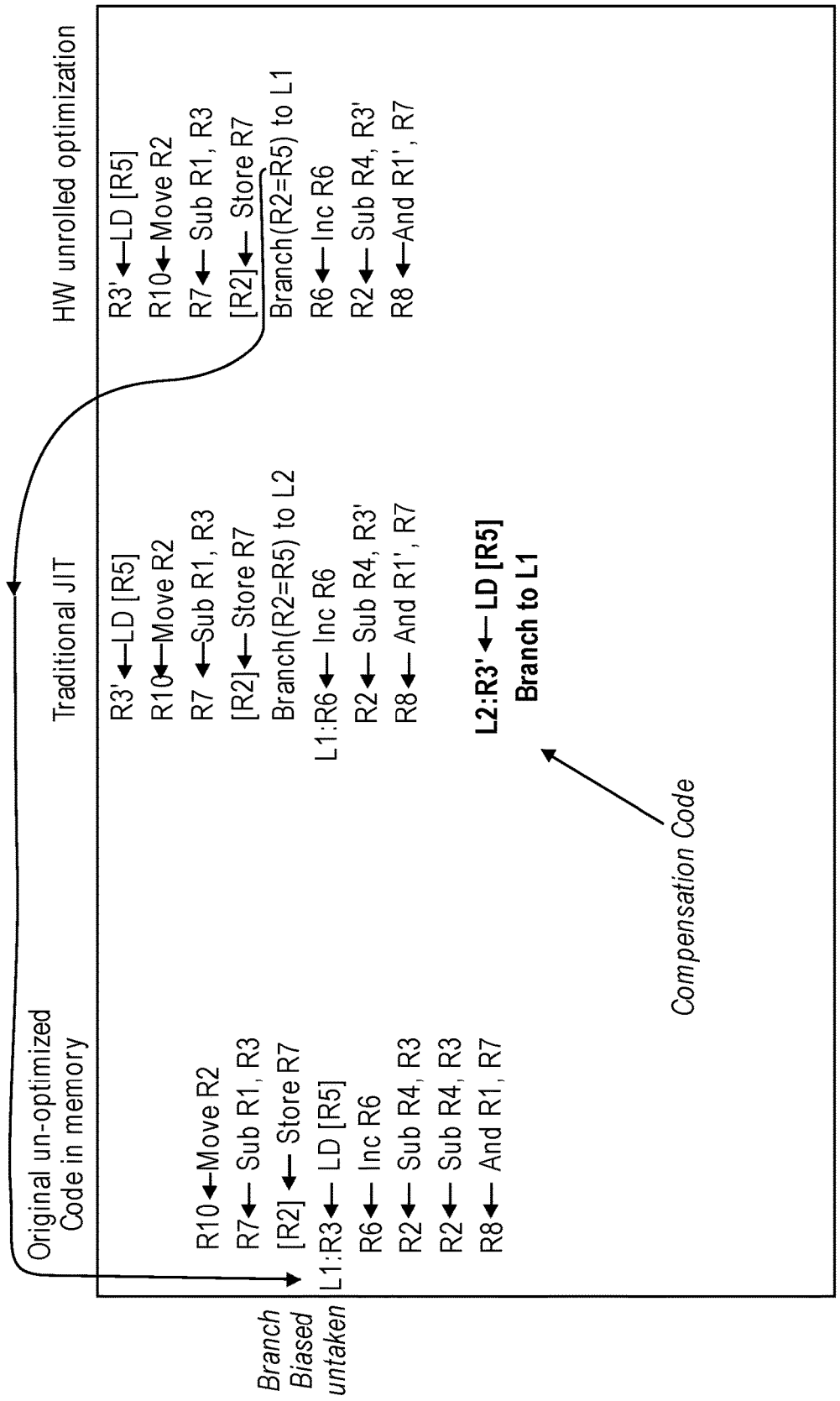
FIG. 9 shows a diagram illustrating optimized scheduling ahead of a store in accordance with one embodiment of the present invention.

FIG. 9 shows a diagram illustrating optimized scheduling a load ahead of a store in accordance with one embodiment of the present invention. As illustrated in FIG. 9, a hardware optimized example is depicted alongside a traditional just-in-time compiler example. The left-hand side of FIG. 9 shows the original un-optimized code including the store, "R3←LD [R5]". The middle column of FIG. 9 shows a traditional just-in-time compiler optimization, where registers are renamed and the load is moved ahead of the store. In this example, the just-in-time compiler inserts compensation code to account for those occasions where the address of the load instruction aliases the address of the store instruction (e.g., where the load movement ahead of the store is not appropriate). In contrast, the right column of FIG. 9 shows the hardware unrolled optimization. In this case, the registers are renamed and the load is also moved ahead of the store. However, it should be noted that no compensation code is inserted. In a case where moving the load ahead of the store is wrong, the hardware automatically rolls back it's state in order to execute the correct instruction sequence. The hardware optimizer solution is able to avoid the use of compensation code because in those cases where the address alias-check branch is miss predicted, the hardware jumps to the original code in memory and executes the correct sequence from there, while flushing the miss predicted instruction sequence. In this case, the sequence assumes no aliasing. It should be noted that in one embodiment, the functionality diagrammed in FIG. 9 can be implemented by instruction scheduling and optimizer component 110 of FIG. 1. Similarly, it should be noted that in one embodiment, the functionality diagrammed in FIG. 9 can be implemented by the software optimizer 1000 described in FIG. 10 below.

Additionally, with respect to dynamically unrolled sequences, it should be noted that instructions can pass prior path predicted branches (e.g., dynamically constructed branches) by using renaming. In the case of non-dynamically predicted branches, movements of instructions should consider the scopes of the branches. Loops can be unrolled to the extent desired and optimizations can be applied across the whole sequence. For example, this can be implemented by renaming destination registers of instructions moving across branches. One of the benefits of this feature is the fact that no compensation code or extensive analysis of the scopes of the branches is needed. This feature thus greatly speeds up and simplifies the optimization process.

Additional information concerning branch prediction and the assembling of instruction sequences can be found in commonly assigned U.S. patent application Ser. No. 61/384, 198, titled "SINGLE CYCLE MULTI-BRANCH PREDICTION INCLUDING SHADOW CACHE FOR EARLY FAR BRANCH PREDICTION" by Mohammad A. Abdallah, filed on Sep. 17, 2010, which is incorporated herein in its entirety.

Figure 10:
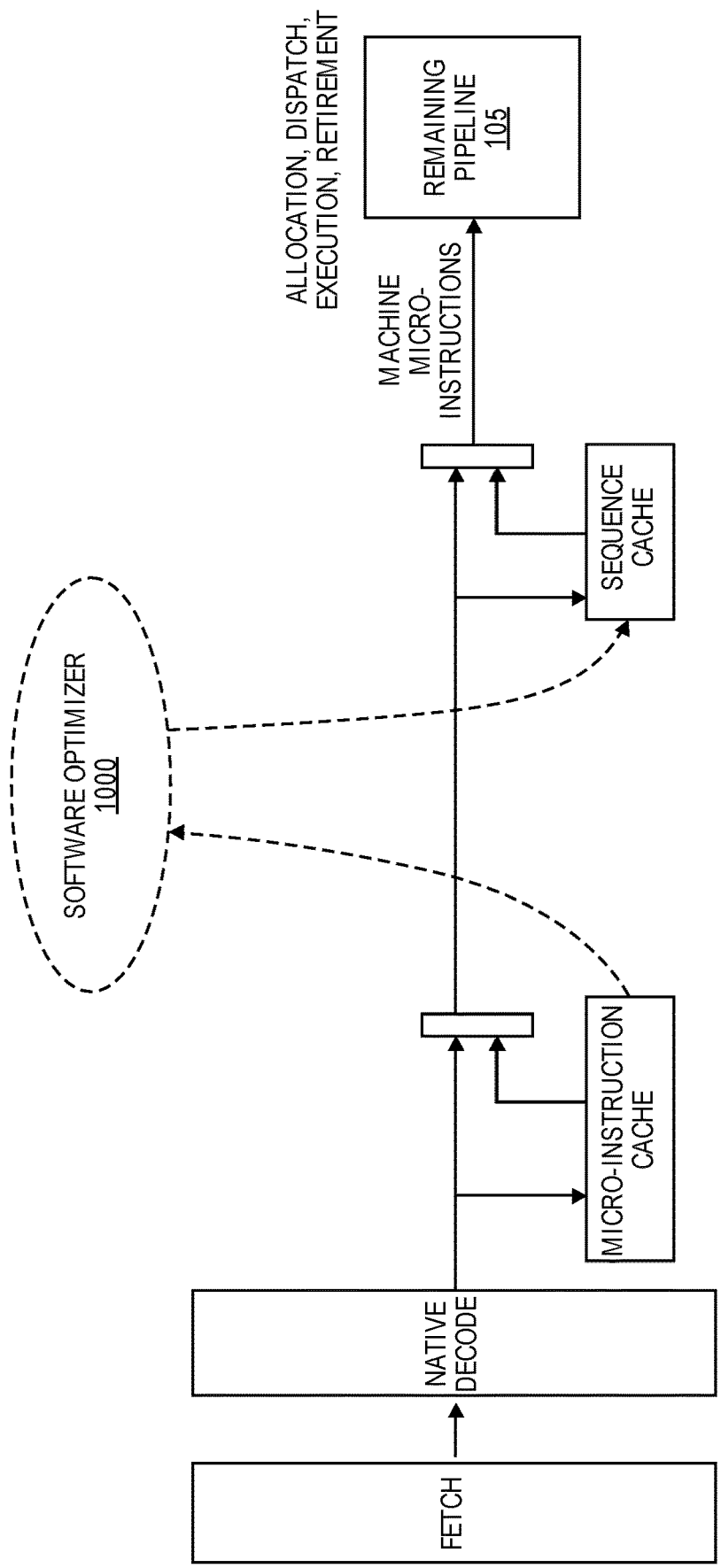
FIG. 10 shows a diagram of an exemplary software optimization process in accordance with one embodiment of the present invention.

FIG. 10 shows a diagram of an exemplary software optimization process in accordance with one embodiment of the present invention. In the FIG. 10 embodiment, the instruction scheduling and optimizer component (e.g., component 110 of FIG. 1) is replaced by a software-based optimizer 1000.

In the FIG. 10 embodiment, the software optimizer 1000 performs the optimization processing that was performed by the hardware-based instruction scheduling and optimizer component 110. The software optimizer maintains a copy of optimized sequences in the memory hierarchy (e.g., L1, L2, system memory). This allows the software optimizer to maintain a much larger collection of optimized sequences in comparison to what is stored in the sequence cache.

It should be noted that the software optimizer 1000 can comprise code residing in the memory hierarchy as both input to the optimization and output from the optimization process.

It should be noted that in one embodiment, the microinstruction cache can be omitted. In such an embodiment, only the optimized microinstruction sequences are cached.

Figure 11:
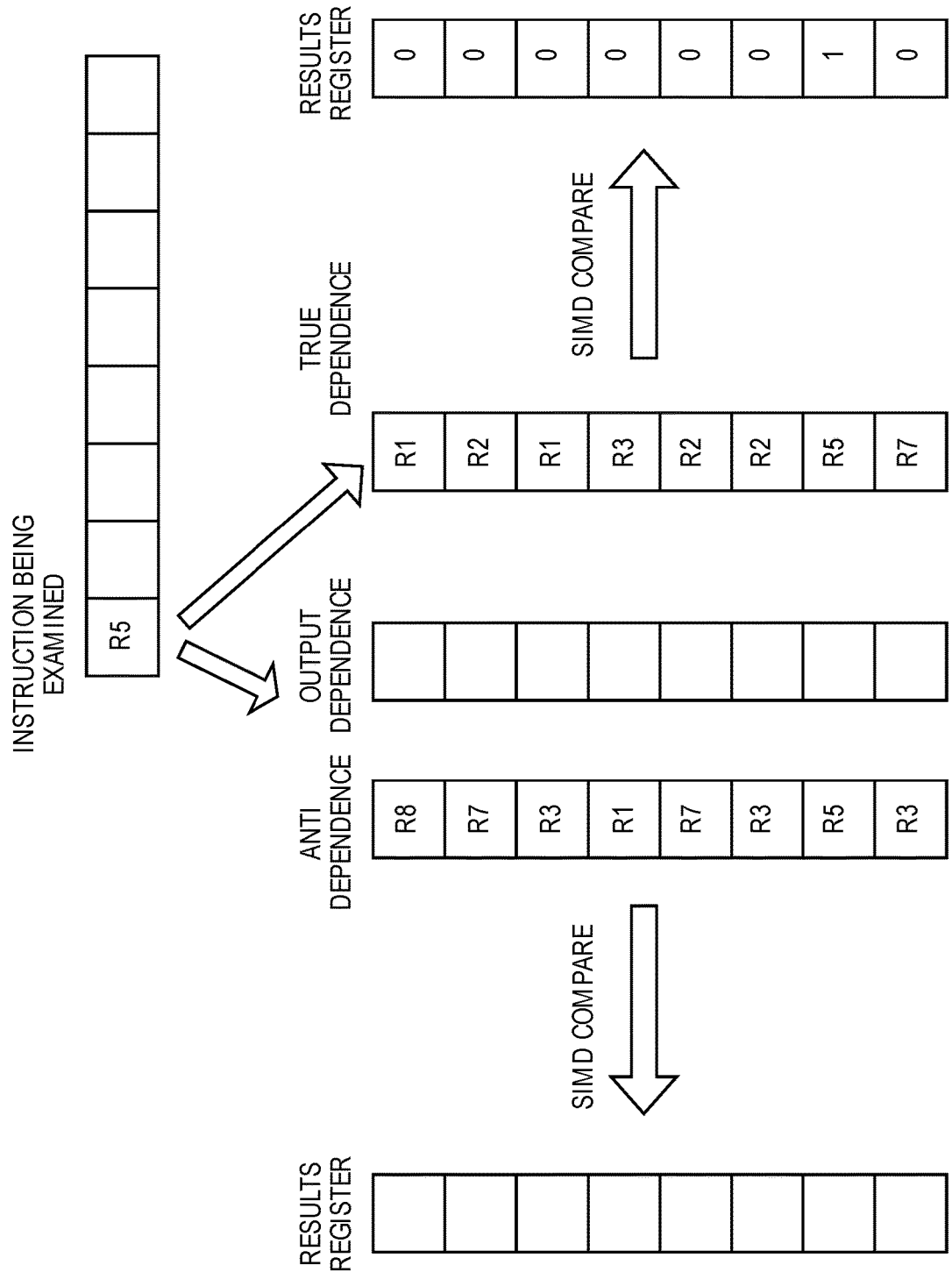
FIG. 11 shows a flow diagram of a SIMD software-based optimization process in accordance with one embodiment of the present invention.

FIG. 11 shows a flow diagram of a SIMD software-based optimization process in accordance with one embodiment of the present invention. The top of FIG. 11 shows how the software-based optimizer examines each instruction of an input instruction sequence. FIG. 11 shows how a SIMD compare can be used to match one to many (e.g., SIMD byte compare a first source "Src1" to all second source bytes "Src2"). In one embodiment, Src1 contains the destination register of any instruction and Src2 contains one source from each other subsequent instruction. Matching is done for every destination with all subsequent instruction sources (e.g., true dependence checking). This is a pairing match that indicates a desired group for the instruction. Matching is done between each destination and every subsequent instruction destination (e.g., output dependence checking). This is a blocking match that can be resolved with renaming. Matching is done between each destination and every prior instruction source (e.g., anti dependence checking). This is a blocking match that can be resolved by renaming. The results are used to populate the rows and columns of the dependency matrix.

Figure 12:
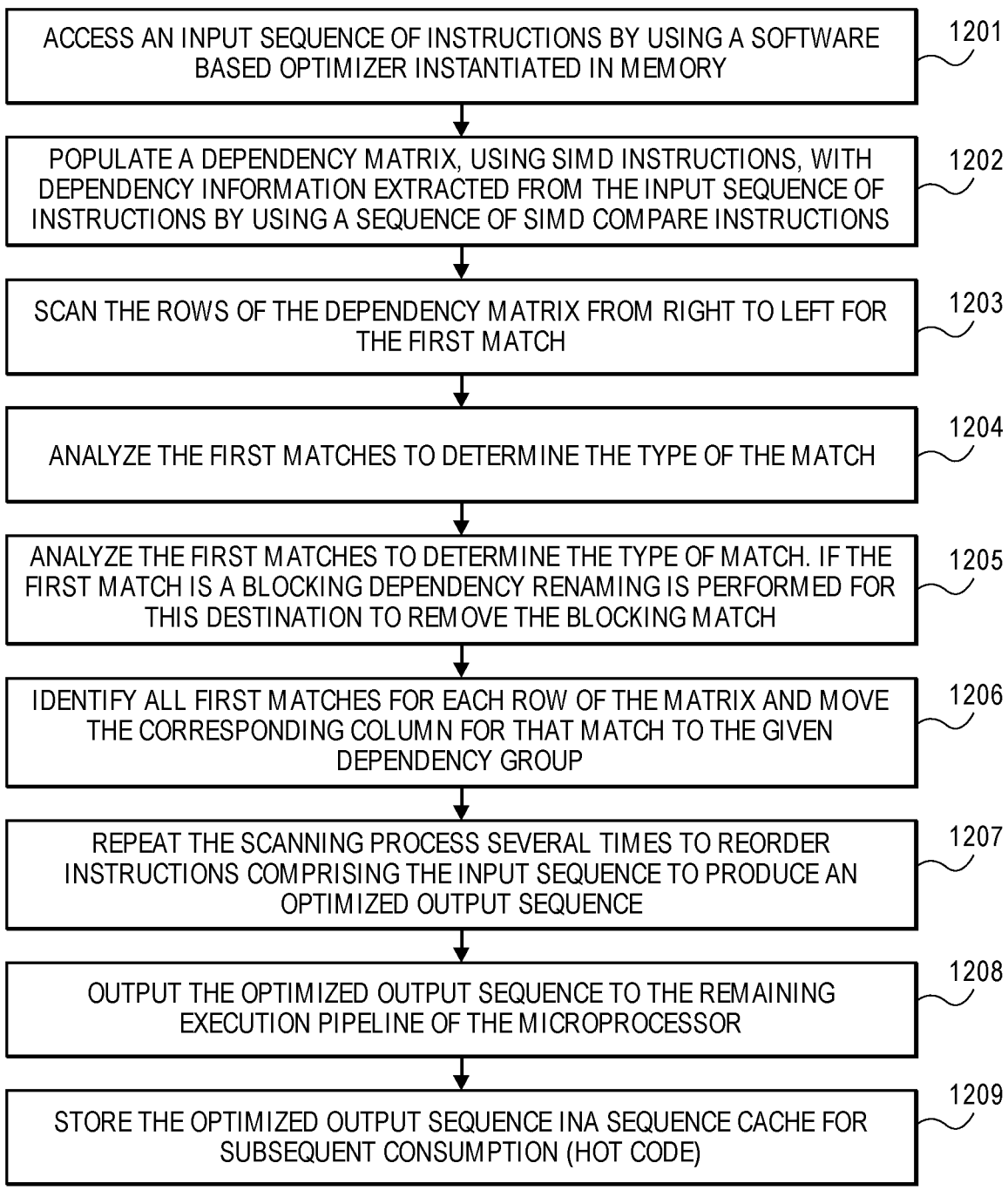
FIG. 12 shows a flowchart of the operating steps of an exemplary SIMD software-based optimization process in accordance with one embodiment of the present invention.

FIG. 12 shows a flowchart of the operating steps of an exemplary SIMD software-based optimization process 1200 in accordance with one embodiment of the present invention. Process 1200 is described in the context of the flow diagram of FIG. 9.

In step 1201, an input sequence of instructions is accessed by using a software-based optimizer instantiated memory.

In step 1202, a dependency matrix is populated, using SIMD instructions, with dependency information extracted from the input sequence of instructions by using a sequence of SIMD compare instructions.

In step 1203, the rows of the matrix are scanned from right to left for the first match (e.g., dependency mark).

In step 1204, each of the first matches are analyzed to determine the type of the match.

In step 1205, if the first marked match is a blocking dependency, renaming is done for this destination.

In step 1206, all first matches for each row of the matrix are identified and the corresponding column for that match is moved to the given dependency group.

In step 1207, the scanning process is repeated several times to reorder instructions comprising the input sequence to produce an optimized output sequence.

In step 1208, the optimized instruction sequence is output to the execution pipeline of the microprocessor for execution.

In step 1209, the optimized output sequence is stored in a sequence cache for subsequent consumption (e.g., to accelerate hot code).

It should be noted that the software optimization can be done serially with the use of SIMD instructions. For example, the optimization can be implemented by processing one instruction at a time scanning instructions' sources and destinations (e.g., from earlier instructions to subsequent instructions in a sequence). The software uses SIMD instructions to compare in parallel current instruction sources and destinations with prior instruction sources and destinations in accordance with the above described optimization algorithm and SIMD instructions (e.g. to detect true dependencies, output dependencies and anti-dependencies).

Figure 13:
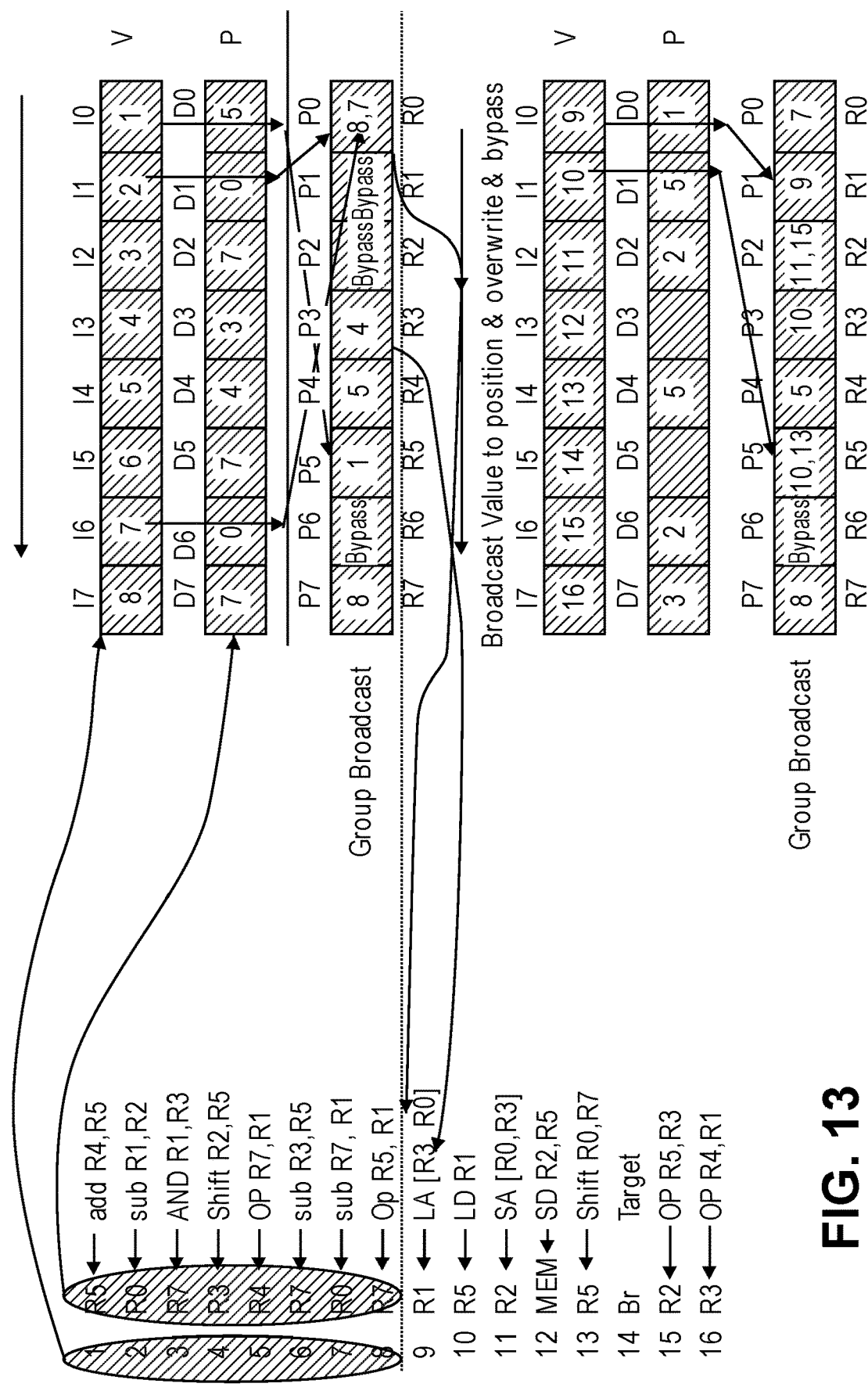
FIG. 13 shows a software based dependency broadcast process in accordance with one embodiment of the present invention.

FIG. 13 shows a software based dependency broadcast process in accordance with one embodiment of the present invention. The FIG. 13 embodiment shows a flow diagram of an exemplary software scheduling process that processes groups of instructions without the expense of a full parallel hardware implementation as described above. However, the FIG. 13 embodiment can still use SIMD to process smaller groups of instructions in parallel.

The software scheduling process of FIG. 13 proceeds as follows. First, the process initializes three registers. The process takes instruction numbers and loads them into a first register. The process then takes destination register numbers and loads them into a second register. The process then takes the values in the first register and broadcasts them to a position in the third result register in accordance with a position number in the second register. The process then over writes, going from left to right in the second register, the leftmost value will overwrite a right value in those instances where broadcast goes to the same position in the result register. Positions in the third register that have not been written to are bypassed. This information is used to populate a dependency matrix.

The FIG. 13 embodiment also shows the manner in which an input sequence of instructions can be processed as a plurality of groups. For example, a 16 instruction input sequence can be processed as a first group of 8 instructions and a second group of 8 instructions. With the first group, instruction numbers are loaded into the first register, instruction destination numbers are loaded into the second register, and the values in the first register are broadcast to positions in the third register (e.g., the result register) in accordance with the position number in the second register (e.g., a group broadcast). Positions in the third register that have not been written to are bypassed. The third register now becomes a base for the processing of the second group. For example, the result register from group 1 now becomes the result register for the processing of group two.

With the second group, instruction numbers are loaded into the first register, instruction destination numbers are loaded into the second register, and the values in the first register are broadcast to positions in the third register (e.g., the result register) in accordance with the position number in the second register. Positions in the third register can over write the result that was written during the processing of the first group. Positions in the third register that have not been written to are bypassed. In this manner, the second group updates the base from the first group, and thereby produces a new base for the processing of a third group, and so on.

Instructions in the second group can inherit dependency information generated in the processing of the first group. It should be noted that the entire second group does not have to be processed to update dependency in the result register.

For example, dependency for instruction 12 can be generated in the processing of the first group, and then processing instructions in the second group up to instruction 11. This updates the result register to a state up to instruction 12. In one embodiment, a mask can be used to prevent the updates for the remaining instructions of the second group (e.g., instructions 12 through 16). To determine dependency for instruction 12, the result register is examined for R2 and R5. R5 will be updated with instruction 1, and R2 will be updated with instruction 11. It should be noted that in a case where all of group 2 is processed, R2 will be updated with instruction 15.

Additionally, it should be noted that all the instructions of the second group (e.g., instructions 9-16) can be processed independent of one another. In such case, the instructions of the second group depend only on the result register of the first group. The instructions of the second group can be processed in parallel once the result register is updated from the processing of the first group. In this manner, groups of instructions can be processed in parallel, one after another. In one embodiment, each group is processed using a SIMD instruction (e.g., a SIMD broadcast instruction), thereby processing all instructions of said each group in parallel.

Figure 14:
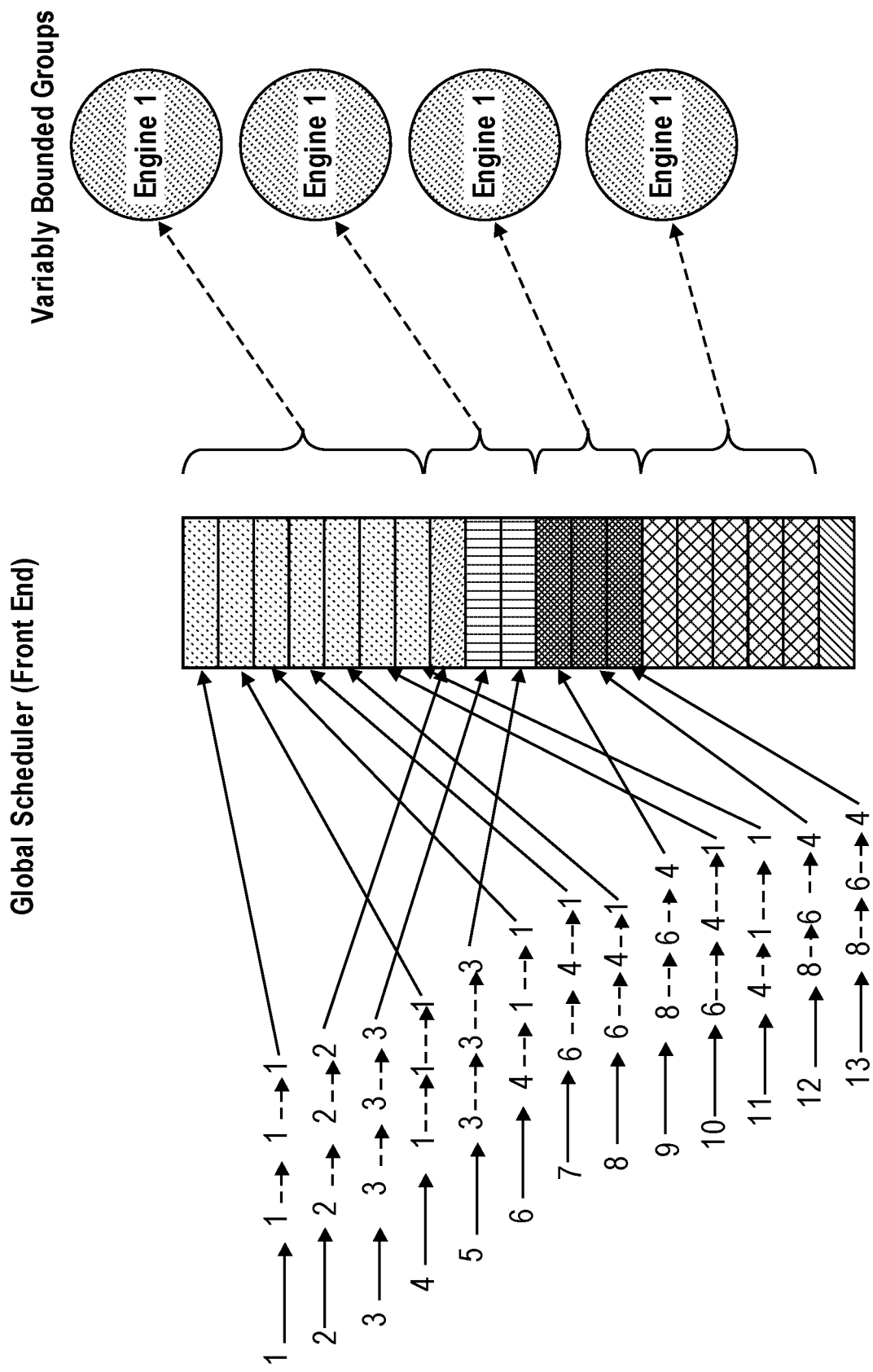
FIG. 14 shows an exemplary flow diagram that shows how the dependency grouping of instructions can be used to build variably bounded groups of dependent instructions in accordance with one embodiment of the present invention.

FIG. 14 shows an exemplary flow diagram that shows how the dependency grouping of instructions can be used to build variably bounded groups of dependent instructions in accordance with one embodiment of the present invention. In the descriptions of FIGS. 2 through 4, the group sizes were constrained, in those cases three instructions per group. FIG. 14 shows how instructions can be reordered into variably sized groups, which then can be allocated to a plurality of computing engines. For example, FIG. 14 shows 4 engines. Since the groups can be variably sized depending on their characteristics, engine 1 can be allocated a larger group than, for example, engine 2. This can occur, for example, in a case where engine 2 has an instruction that is not particularly dependent upon the other instructions in that group.

Figure 15:
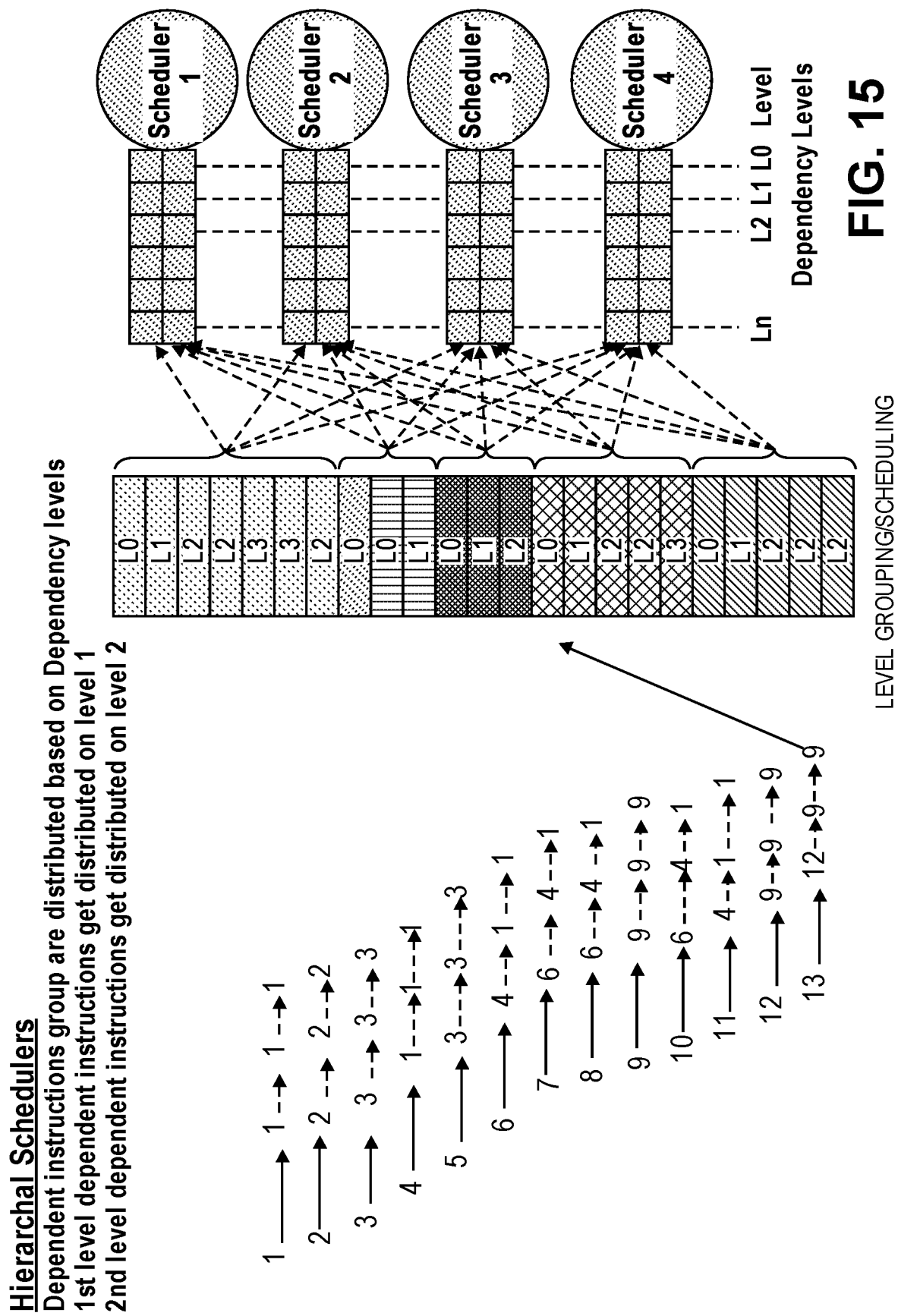
FIG. 15 shows a flow diagram depicting hierarchical scheduling of instructions in accordance with one embodiment of the present invention.

FIG. 15 shows a flow diagram depicting hierarchical scheduling of instructions in accordance with one embodiment of the present invention. As described above, dependency grouping of instructions can be used to build variably bounded groups. FIG. 15 shows the feature wherein various levels of dependency exist within a dependency group. For example, instruction 1 does not depend on any other instruction within this instruction sequence, therefore making instruction 1 an L0 dependency level. However, instruction 4 depends on instruction 1, therefore making instruction 4 an L1 dependency level. In this manner, each of the instructions of an instruction sequence is assigned a dependency level as shown.

The dependency level of each instruction is used by a second-level hierarchical scheduler to dispatch instructions in such a manner as to ensure resources are available for dependent instructions to execute. For example, in one embodiment, L0 instructions are loaded into instruction queues that are processed by the second-level schedulers 1-4. The L0 instructions are loaded such that they are in front of each of the queues, the L1 instructions are loaded such that they follow in each of the queues, L2 instructions follow them, and so on. This is shown by the dependency levels, from L0 to Ln in FIG. 15. The hierarchical scheduling of the schedulers 1-4 advantageously utilizes the locality-in-time and the instruction-to-instruction dependency to make scheduling decisions in an optimal way.

In this manner, embodiments of the present invention intimate dependency group slot allocation for the instructions of the instruction sequence. For example, to implement an out of order microarchitecture, the dispatching of the instructions of the instruction sequence is out of order. In one embodiment, on each cycle, instruction readiness is checked. An instruction is ready if all instructions that it depends upon have previously dispatched. A scheduler structure functions by checking those dependencies. In one embodiment, the scheduler is a unified scheduler and all dependency checking is performed in the unified scheduler structure. In another embodiment, the scheduler functionality is distributed across the dispatch queues of execution units of a plurality of engines. Hence, in one embodiment the scheduler is unified while in another embodiment the scheduler is distributed. With both of these solutions, each instruction source is checked against the dispatch instructions' destination every cycle.

Thus, FIG. 15 shows the hierarchical scheduling as performed by embodiments of the present invention. As described above, instructions are first grouped to form dependency chains (e.g., dependency groups). The formation of these dependency chains can be done statically or dynamically by software or hardware. Once these dependency chains have been formed, they can be distributed/dispatched to an engine. In this manner, grouping by dependency allows for out of order scheduling of in order formed groups. Grouping by dependency also distributes entire dependency groups onto a plurality of engines (e.g., cores or threads). Grouping by dependency also facilitates hierarchical scheduling as described above, where dependent instructions are grouped in a first step and then scheduled in a second step.

Figure 22:
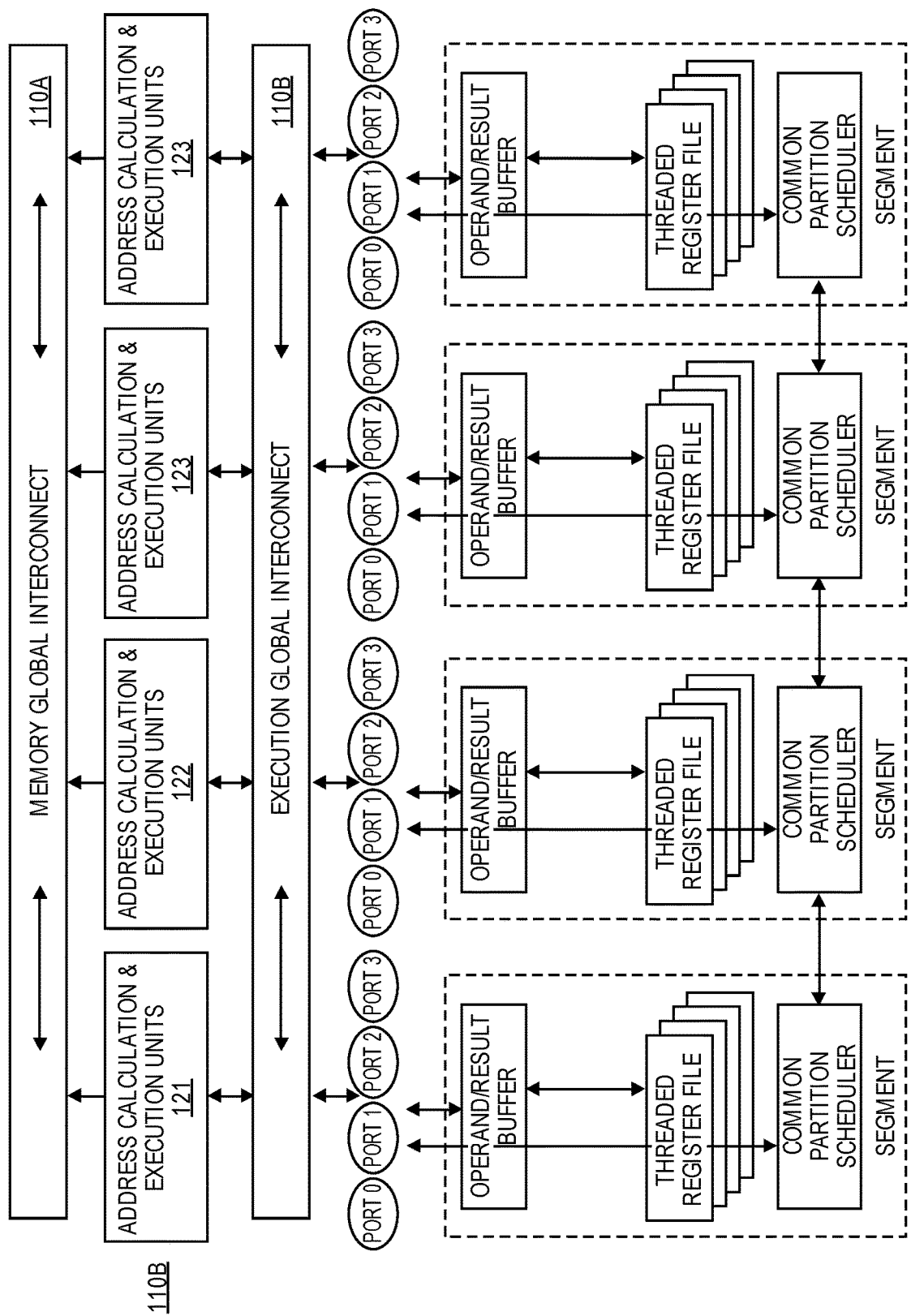
FIG. 22 shows a plurality of segments, a plurality of segmented common partition schedulers and the interconnect and the ports into the segments in accordance with one embodiment of the present invention.

It should be noted that the functionality diagrammed in the FIGS. 14-19 can function independently from any method by which instructions are grouped (e.g., whether the grouping functionality is implemented in hardware, software, etc.). Additionally, the dependency groups shown in FIGS. 14-19 can comprise a matrix of independent groups, where each group further comprises dependent instructions. Additionally, it should be noted that the schedulers can also be engines. In such embodiment, each of the schedulers 1-4 can be incorporated within its respective engine (e.g., as shown in FIG. 22 where each segment includes a common partition scheduler).

Figure 16:
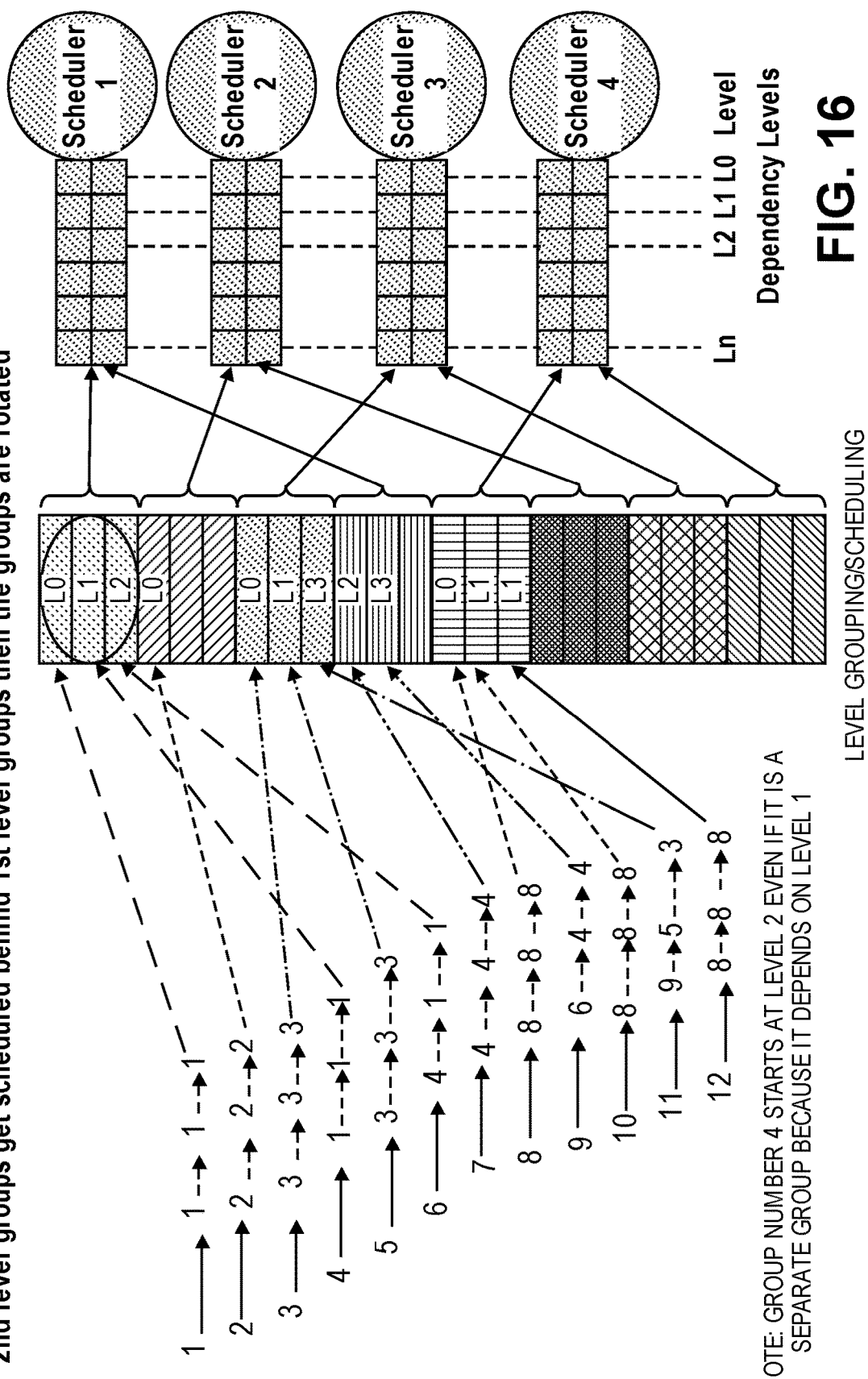
FIG. 16 shows a flow diagram depicting hierarchical scheduling of three slot dependency group instructions in accordance with one embodiment of the present invention.

FIG. 16 shows a flow diagram depicting hierarchical scheduling of three slot dependency group instructions in accordance with one embodiment of the present invention. As described above, dependency grouping of instructions can be used to build variably bounded groups. In this embodiment, the dependency groups comprise three slots. FIG. 16 shows the various levels of dependency even within a three slot dependency group. As described above, instruction 1 does not depend on any other instruction within this instruction sequence, therefore making instruction 1 an L0 dependency level. However, instruction 4 depends on instruction 1, therefore making instruction 4 an L1 dependency level. In this manner, each of the instructions of an instruction sequence is assigned a dependency level as shown.

As described above, the dependency level of each instruction is used by a second-level hierarchical scheduler to dispatch instructions in such a manner as to ensure resources are available for dependent instructions to execute. L0 instructions are loaded into instruction queues that are processed by the second-level schedulers 1-4. The L0 instructions are loaded such that they are in front of each of the queues, the L1 instructions are loaded such that they follow in each of the queues, L2 instructions follow them, and so on, as shown by the dependency levels, from L0 to Ln in FIG. 16. It should be noted that group number four (e.g., the fourth group from the top) begins at L2 even though it is a separate group. This is because instruction 7 depends from instruction 4, which depends from instruction 1, thereby giving instructions 7 an L2 dependency.

In this manner, FIG. 16 shows how every three dependent instructions are scheduled together on a given one of the schedulers 1-4. The second-level groups it scheduled behind the first level groups, then the groups are rotated.

Figure 17:
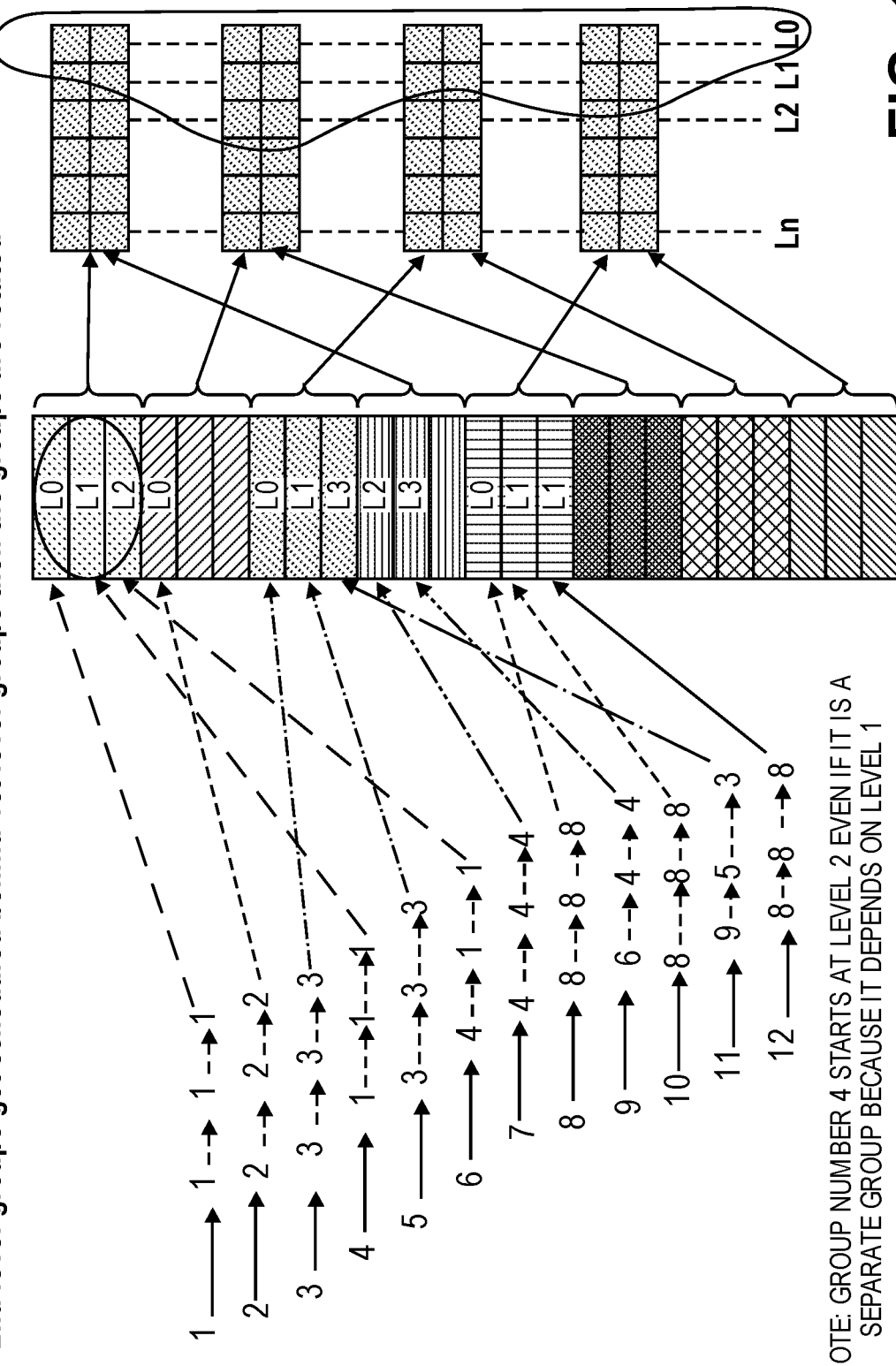
FIG. 17 shows a flow diagram depicting hierarchical moving window scheduling of three slot dependency group instructions in accordance with one embodiment of the present invention.

FIG. 17 shows a flow diagram depicting hierarchical moving window scheduling of three slot dependency group instructions in accordance with one embodiment of the present invention. In this embodiment, the hierarchical scheduling for the three slot dependency groups is implemented via a unified moving window scheduler. A moving window scheduler processes the instructions in the queues to dispatch instructions in such a manner as to ensure resources are available for dependent instructions to execute. As described above, L0 instructions are loaded into instruction queues that are processed by the second-level schedulers 1-4. The L0 instructions are loaded such that they are in front of each of the queues, the L1 instructions are loaded such that they follow in each of the queues, L2 instructions follow them, and so on, as shown by the dependency levels, from L0 to Ln in FIG. 17. The moving window illustrates how L0 instructions can be dispatched from each of the queues even though they may be more in one queue than another. In this manner, the moving window scheduler dispatches instructions as the queues flow from left to right as illustrated in FIG. 17.

Figure 18:
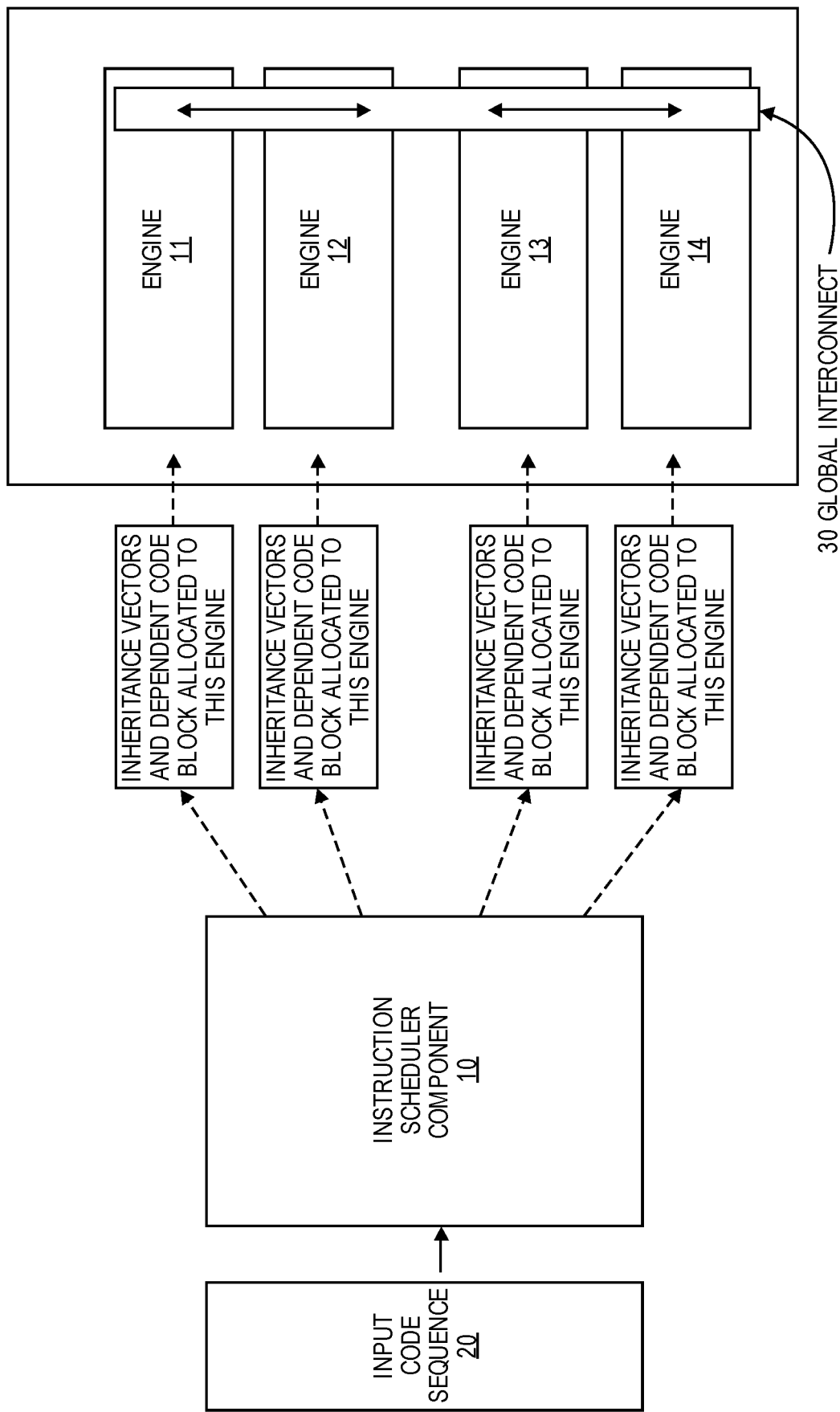
FIG. 18 shows how the variably sized dependent chains (e.g., variably bounded groups) of instructions are allocated to a plurality of computing engines in accordance with one embodiment of the present invention.

FIG. 18 shows how the variably sized dependent chains (e.g., variably bounded groups) of instructions are allocated to a plurality of computing engines in accordance with one embodiment of the present invention.

As depicted in FIG. 18, the processor includes an instruction scheduler component 10 and a plurality of engines 11-14. The instruction scheduler component generates code blocks and inheritance vectors to support the execution of dependent code block (e.g., variably bound group) on their respective engines. Each of the dependent code blocks can belong to the same logical core/thread or to different logical cores/threads. The instruction scheduler component will process the dependent code blocks to generate and respective inheritance vectors. These dependent code blocks and respective inheritance vectors are allocated to the particular engines 11-14 as shown. A global interconnect 30 supports a necessary communication across each of the engines 11-14. It should be noted that the functionality for the dependency grouping of instructions to build variably bounded groups of dependent instructions as described above in the discussion FIG. 14 is implemented by the instruction scheduler component 10 of the FIG. 18 embodiment.

Figure 19:
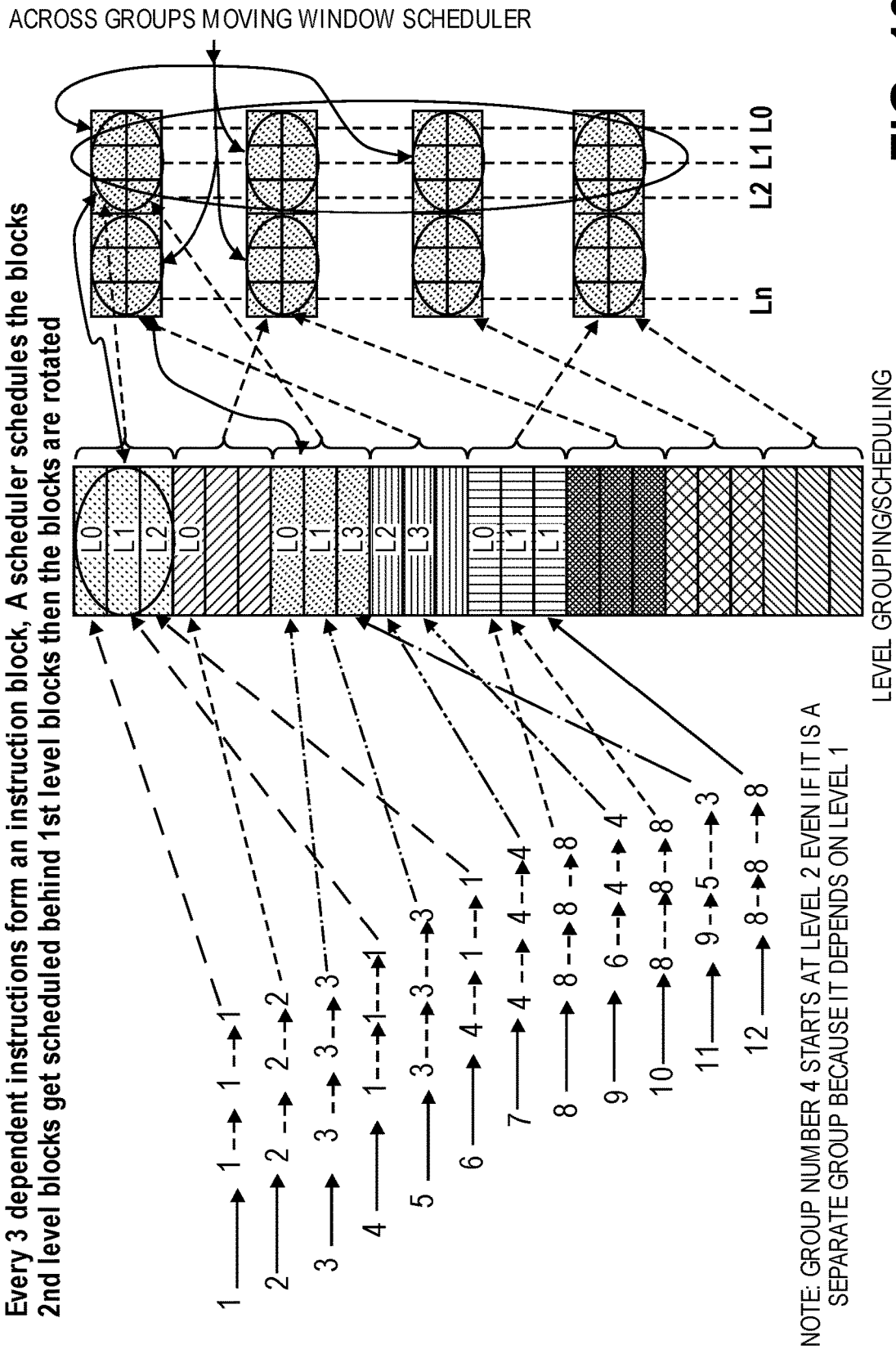
FIG. 19 shows a flow diagram depicting block allocation to the scheduling queues and the hierarchical moving window scheduling of three slot dependency group instructions in accordance with one embodiment of the present invention.

FIG. 19 shows a flow diagram depicting block allocation to the scheduling queues and the hierarchical moving window scheduling of three slot dependency group instructions in accordance with one embodiment of the present invention. As described above, the hierarchical scheduling for the three slot dependency groups can be implemented via a unified moving window scheduler. FIG. 19 shows how dependency groups become blocks that are loaded into the scheduling queues. In FIG. 19 embodiment, two independent groups can be loaded in each queue as half blocks. This is shown at the top of FIG. 19 where group 1 forms one half block and group 4 forms another half block that is loaded into the first scheduling queue.

As described above, moving window scheduler processes the instructions in the queues to dispatch instructions in such a manner as to ensure resources are available for dependent instructions to execute. The bottom of FIG. 19 shows how L0 instructions are loaded into instruction queues that are processed by the second-level schedulers.

Figure 20:
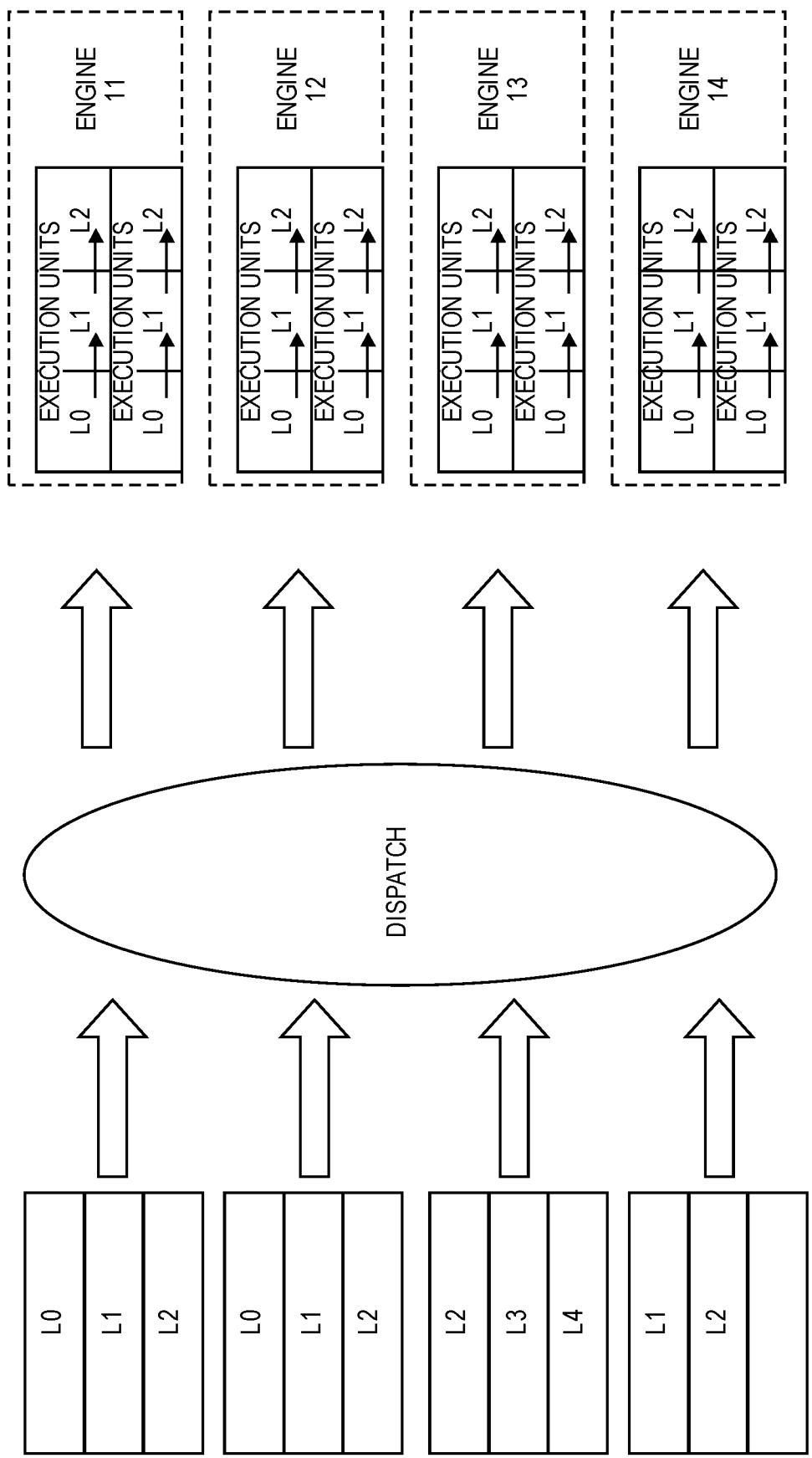
FIG. 20 shows how the dependent code blocks (e.g., dependency groups or dependency chains) are executed on the engines in accordance with one embodiment of the present invention.

FIG. 20 shows how the dependent code blocks (e.g., dependency groups or dependency chains) are executed on the engines 11-14 in accordance with one embodiment of the present invention. As described above, instruction scheduler component generates code blocks and inheritance vectors to support the execution of dependent code blocks (e.g., variably bound group, three slot group, etc.) on their respective engines. As described above in FIG. 19, FIG. 20 further shows how two independent groups can be loaded into each engine as code blocks. FIG. 20 shows how these code blocks are dispatched to the engines 11-14, where the dependent instructions execute on the stacked (e.g., serially connected) execution units of each engine. For example, in the first dependency group, or code block, on the top left of FIG. 20, the instructions are dispatched to the engine 11 wherein they are stacked on the execution unit in order of their dependency such that L0 is stacked on top of L1 which is further stacked on L2. In so doing, the results of L0 to flow to the execution unit of L1 which can then flow to the execution of L2.

In this manner, the dependency groups shown in FIG. 20 can comprise a matrix of independent groups, where each group further comprises dependent instructions. The benefit of the groups being independent is the ability to dispatch and execute them in parallel and the attribute whereby the need for communication across the interconnect between the engines is minimized. Additionally, it should be noted that the execution units shown in the engines 11-14 can comprise a CPU or a GPU.

In accordance with embodiments of the present invention, it should be appreciated that instructions are abstracted into dependency groups or blocks or instruction matrices in accordance with their dependencies. Grouping instructions in accordance with their dependencies facilitates a more simplified scheduling process with a larger window of instructions (e.g., a larger input sequence of instructions). The grouping as described above removes the instruction variation and abstracts such variation uniformly, thereby allowing the implementation of simple, homogenous and uniform scheduling decision-making. The above described grouping functionality increases the throughput of the scheduler without increasing the complexity of the scheduler. For example, in a scheduler for four engines, the scheduler can dispatch four groups where each group has three instructions. In so doing, the scheduler only handles four lanes of super scaler complexity while dispatching 12 instructions. Furthermore, each block can contain parallel independent groups which further increase the number of dispatched instructions.

Figure 21:
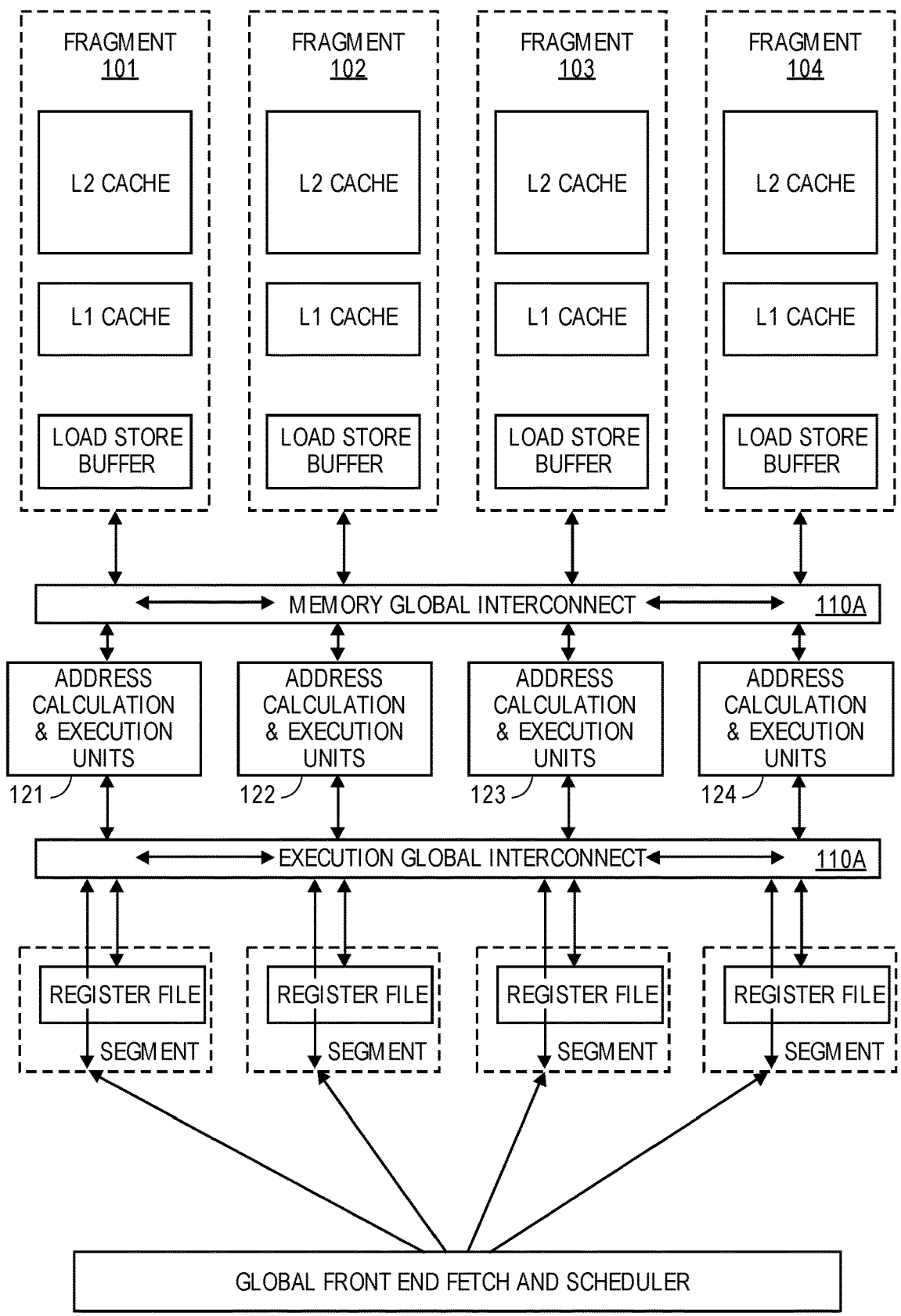
FIG. 21 shows an overview diagram of a plurality of engines and their components, including a global front end fetch & scheduler and register files, global interconnects and a fragmented memory subsystem for a multicore processor in accordance with one embodiment of the present invention.

FIG. 21 shows an overview diagram of a plurality of engines and their components, including a global front end fetch & scheduler and register files, global interconnects and a fragmented memory subsystem for a multicore processor in accordance with one embodiment of the present invention. As depicted in FIG. 21, four memory fragments 101-104 are shown. The memory fragmentation hierarchy is the same across each cache hierarchy (e.g., L1 cache, L2 cache, and the load store buffer). Data can be exchanged between each of the L1 caches, each of the L2 caches and each of the load store buffers through the memory global interconnect 110a.

The memory global interconnect comprises a routing matrix that allows a plurality of cores (e.g., the address calculation and execution units 121-124) to access data that may be stored at any point in the fragmented cache hierarchy (e.g., L1 cache, load store buffer and L2 cache). FIG. 21 also depicts the manner whereby each of the fragments 101-104 can be accessed by address calculation and execution units 121-124 through the memory global interconnect 110*a*.

The execution global interconnect 110*b* similarly comprises a routing matrix allows the plurality of cores (e.g., the address calculation and execution units 121-124) to access data that may be stored at any of the segmented register files. Thus, the cores have access to data stored in any of the fragments and to data stored in any of the segments through the memory global interconnect 110*a* or the execution global interconnect 110*b*.

FIG. 21 further shows a global front end fetch & scheduler which has a view of the entire machine and which manages the utilization of the register files segments and the fragmented memory subsystem. Address generation comprises the basis for fragment definition. The global front end Fetch & scheduler functions by allocating instruction sequences to each segment.

FIG. 22 shows a plurality of segments, a plurality of segmented common partition schedulers and the interconnect and the ports into the segments in accordance with one embodiment of the present invention. As depicted in FIG. 22, each segment is shown with a common partition scheduler. The common partition scheduler functions by scheduling instructions within its respective segment. These instructions were in turn received from the global front end fetch and scheduler. In this embodiment, the common partition scheduler is configured to function in cooperation with the global front end fetch and scheduler. The segments are also shown with 4 read write ports that provide read/write access to the operand/result buffer, threaded register file, and common partition or scheduler.

In one embodiment, a non-centralized access process is implemented for using the interconnects and the local interconnects employ the reservation adder and a threshold limiter control access to each contested resource, in this case, the ports into each segment. In such an embodiment, to access a resource, a core needs to reserve the necessary bus and reserve the necessary port.

Figure 23:
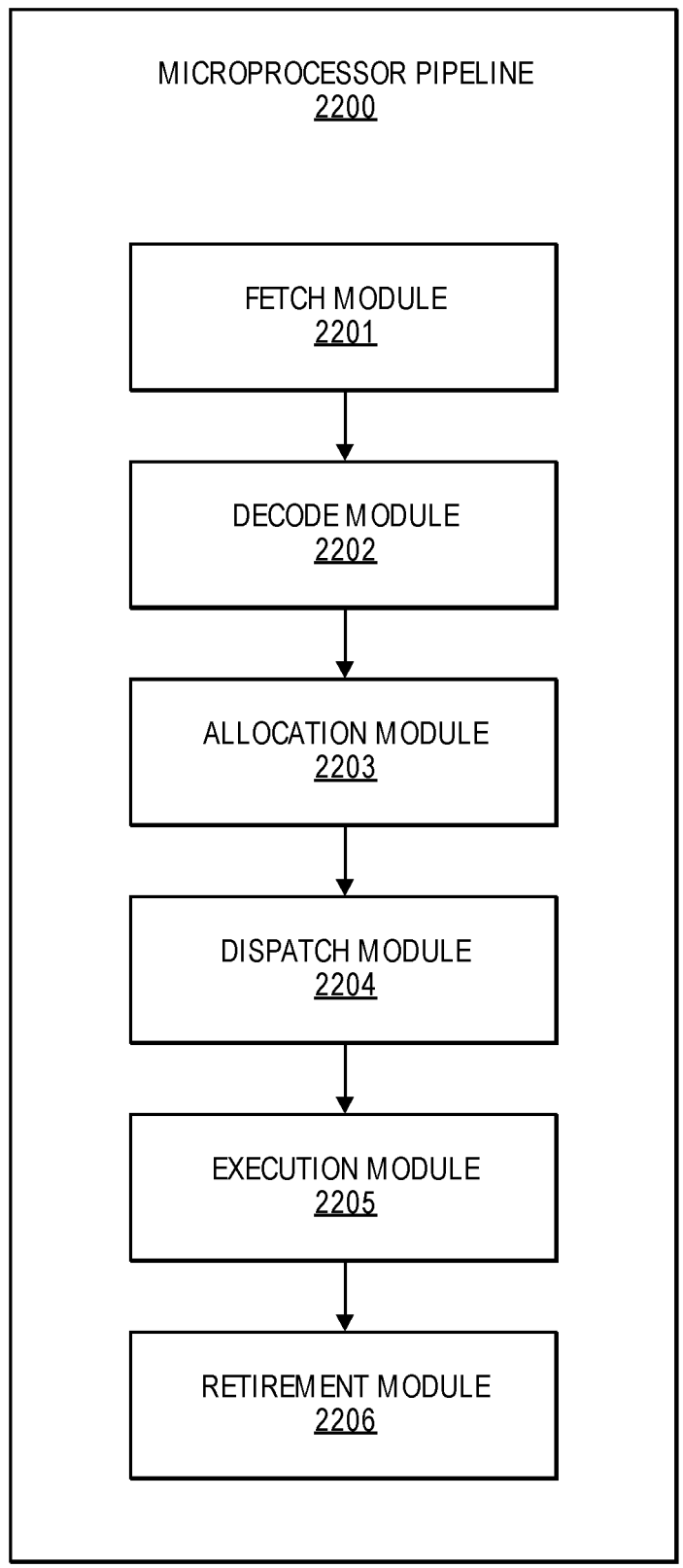
FIG. 23 shows a diagram of an exemplary microprocessor pipeline in accordance with one embodiment of the present invention.

FIG. 23 shows a diagram of an exemplary microprocessor pipeline 2300 in accordance with one embodiment of the present invention. The microprocessor pipeline 2300 includes a fetch module 2301 that implements the functionality of the process for identifying and extracting the instructions comprising an execution, as described above. In the FIG. 23 embodiment, the fetch module is followed by a decode module 2302, an allocation module 2303, a dispatch module 2304, an execution module 2305 and a retirement module 2306. It should be noted that the microprocessor pipeline 2300 is just one example of the pipeline that implements the functionality of embodiments of the present invention described above. One skilled in the art would recognize that other microprocessor pipelines can be implemented that include the functionality of the decode module described above.

For purposes of explanation, the foregoing description refers to specific embodiments that are not intended to be exhaustive or to limit the current invention. Many modifications and variations are possible consistent with the above teachings. Embodiments were chosen and described in order to best explain the principles of the invention and its practical applications, so as to enable others skilled in the art to best utilize the invention and its various embodiments with various modifications as may be suited to their particular uses.

What is claimed is:

1. In a microprocessor, a method for accelerating code optimization, the method comprising:
    accessing an input microinstruction sequence by using an optimizer instantiated in memory;
    executing a plurality of single instruction multiple data (SIMD) compare instructions to compare registers used by instructions in the input microinstruction sequence in parallel;
    using a result of executing the plurality of SIMD compare instructions to populate a dependency matrix with dependency information extracted from the input microinstruction sequence;
    scanning a plurality of rows of the dependency matrix to perform instruction processing by reordering the input microinstruction sequence into an enhanced microinstruction sequence comprising a plurality of dependent code groups;
    outputting the enhanced microinstruction sequence to a microprocessor pipeline for execution; and
    storing a copy of the enhanced microinstruction sequence into a sequence cache for subsequent use upon a subsequent hit to the enhanced microinstruction sequence.

2. The method of claim 1, wherein the instruction processing further comprises scanning the plurality of rows of the dependency matrix to identify matching instructions.

3. The method of claim 2, wherein the instruction processing further comprises analyzing the matching instructions to determine whether the matching instructions comprise a blocking dependency, and wherein renaming is performed to remove the blocking dependency.

4. The method of claim 3, wherein instructions corresponding to first matches of each row of the dependency matrix are moved into a corresponding dependency group.

5. The method of claim 1, wherein copies of enhanced microinstruction sequences are stored in a memory hierarchy of the microprocessor.

6. The method of claim 5, wherein the memory hierarchy comprises an L1 cache and an L2 cache.

7. The method of claim 1, wherein the executing the plurality of SIMD compare instructions comprises:
    performing a pairing match to determine the dependency information.

8. The method of claim 1, wherein the executing the plurality of SIMD compare instructions comprises:
    performing a blocking match to determine the dependency information.

9. The method of claim 8, wherein the blocking match is resolved by register renaming.

10. A microprocessor comprising:
    an instruction fetch component for fetching an incoming macroinstruction sequence;
    a decoding component coupled to the instruction fetch component operable to receive and decode the incoming macroinstruction sequence into a microinstruction sequence;
    an optimizer operable to be instantiated in memory for accessing the microinstruction sequence and executing a plurality of single instruction multiple data (SIMD) compare instructions to compare registers used by instructions in the microinstruction sequence in parallel;

a dependency matrix operable to be populated with dependency information extracted from the microinstruction sequence using a result of executing the plurality of SIMD compare instructions, wherein a plurality of rows of the dependency matrix are scanned to perform instruction processing using the optimizer by reordering the microinstruction sequence into an updated microinstruction sequence comprising a plurality of dependent code groups; and a sequence cache operable to receive and store a copy of the updated microinstruction sequence for subsequent use upon a subsequent hit on the updated microinstruction sequence.

11. The microprocessor of claim 10, wherein the instruction processing further comprises scanning the plurality of rows of the dependency matrix to identify matching instructions.

12. The microprocessor of claim 11, wherein the instruction processing further includes analyzing the matching instructions to determine whether the matching instructions comprise a blocking dependency, and wherein renaming is performed to remove the blocking dependency.

13. The microprocessor of claim 12, wherein instructions corresponding to first matches of each row of the dependency matrix are moved into a corresponding dependency group.

14. In a microprocessor, a method for accelerating code optimization, the method comprising:

accessing an input microinstruction sequence by using an optimizer instantiated in memory, wherein the optimizer is a software-based optimizer;

executing a plurality of single instruction multiple data (SIMD) compare instructions to compare registers used by instructions in the input microinstruction sequence in parallel;

using a result of executing the plurality of SIMD compare instructions to populate a dependency matrix with dependency information extracted from the input microinstruction sequence;

scanning a plurality of rows of the dependency matrix to perform instruction processing by reordering the input microinstruction sequence into an enhanced microinstruction sequence comprising a plurality of dependent code groups;

outputting the enhanced microinstruction sequence to a microprocessor pipeline for execution; and storing a copy of the enhanced microinstruction sequence in a memory hierarchy.

15. The method of claim 14, wherein the instruction processing further comprises scanning the plurality of rows of the dependency matrix to identify matching instructions.

16. The method of claim 15, wherein the instruction processing further comprises analyzing the matching instructions to determine whether the matching instructions comprise a blocking dependency, and wherein renaming is performed to remove the blocking dependency.

17. The method of claim 16, wherein instructions corresponding to first matches of each row of the dependency matrix are moved into a corresponding dependency group.

18. The method of claim 14, wherein the executing the plurality of SIMD compare instructions comprises:

performing a pairing match to determine the dependency information.

19. The method of claim 14, wherein the executing the plurality of SIMD compare instructions comprises:

performing a blocking match to determine the dependency information.

20. The method of claim 19, wherein the blocking match can be resolved by register renaming.

* * * * *